United States Patent
Maeda et al.

(10) Patent No.: US 6,874,864 B1
(45) Date of Patent: Apr. 5, 2005

(54) INK JET PRINTING APPARATUS AND INK JET PRINTING METHOD FOR FORMING AN IMAGE ON A PRINT MEDIUM

(75) Inventors: Tetsuhiro Maeda, Kawasaki (JP); Hiroshi Tajika, Yokohama (JP); Atsushi Ushiroda, Kawasaki (JP); Miyuki Fujita, Tokyo (JP); Yuji Konno, Kawasaki (JP); Norihiro Kawatoko, Kawasaki (JP); Takayuki Ogasahara, Kawasaki (JP); Tetsuya Edamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 09/629,093

(22) Filed: Jul. 31, 2000

(30) Foreign Application Priority Data

Aug. 24, 1999 (JP) .......................................... 11-237325
Jul. 17, 2000 (JP) ....................................... 2000-216687

(51) Int. Cl.[7] .................................................. B41J 2/15
(52) U.S. Cl. .......................................... 347/41; 347/16
(58) Field of Search .............................. 347/41, 40, 12, 347/15, 43, 16; 358/1.3, 502

(56) References Cited

U.S. PATENT DOCUMENTS

| | | | |
|---|---|---|---|
| 5,384,587 A | * 1/1995 | Takagi et al. ................ | 347/41 |
| 5,696,542 A | 12/1997 | Matsubara et al. ............ | 347/12 |
| 6,003,970 A | 12/1999 | Fujita et al. ................. | 347/41 |
| 6,020,976 A | 2/2000 | Fujita et al. ................. | 358/1.3 |
| 6,102,537 A | 8/2000 | Kato et al. .................. | 347/101 |
| 6,164,756 A | * 12/2000 | Takahashi et al. ............ | 347/43 |

FOREIGN PATENT DOCUMENTS

| | | | |
|---|---|---|---|
| EP | 0597714 | 5/1994 | |
| EP | 0646460 | 4/1995 | |
| EP | 0845356 | 6/1998 | |
| JP | 7052465 | 2/1995 | .............. B41J/3/10 |
| JP | 8025693 | 1/1996 | .............. B41J/3/12 |

* cited by examiner

*Primary Examiner*—Lamson Nguyen
(74) *Attorney, Agent, or Firm*—Fitzpatrick, Cella, Harper & Scinto

(57) ABSTRACT

An apparatus and method are provided to enable high speed printing of an image with high resolution while suppressing degradation of image quality due to white stripes and density variations. In an ink jet printing apparatus using a multi-pass printing system, the same scan print area is divided at a predetermined pitch and the printing duties of the divided areas determined by the thinning out mask pattern are set to different values. In regard to the same scan print area formed by a plurality of the main scans, the divided areas corresponding to the ends of the print head have their printing duties set smaller than those of the divided areas on the inner side of the ends of the print head.

42 Claims, 43 Drawing Sheets

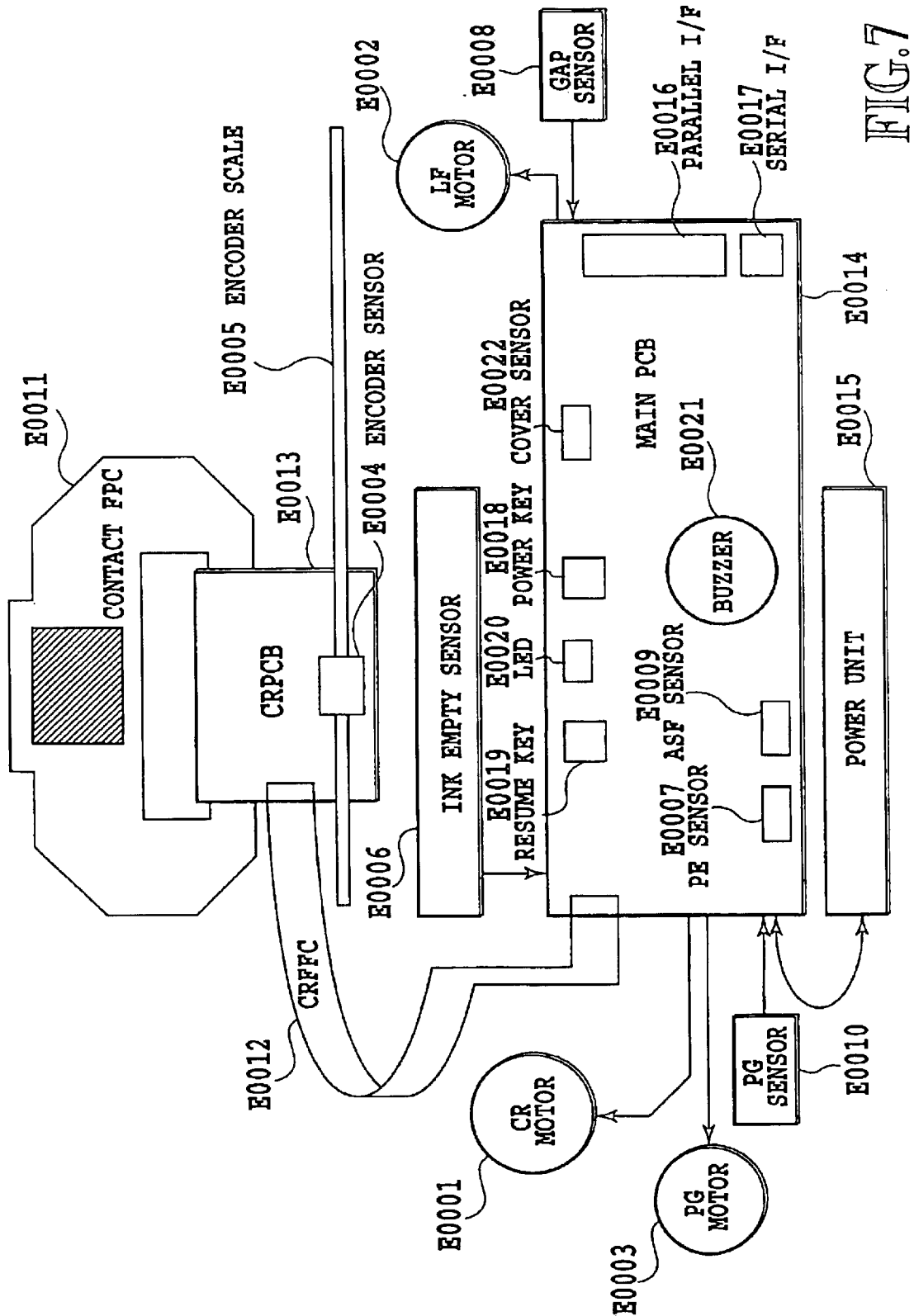

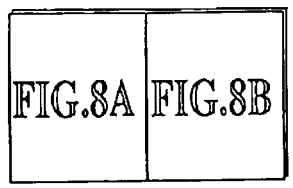
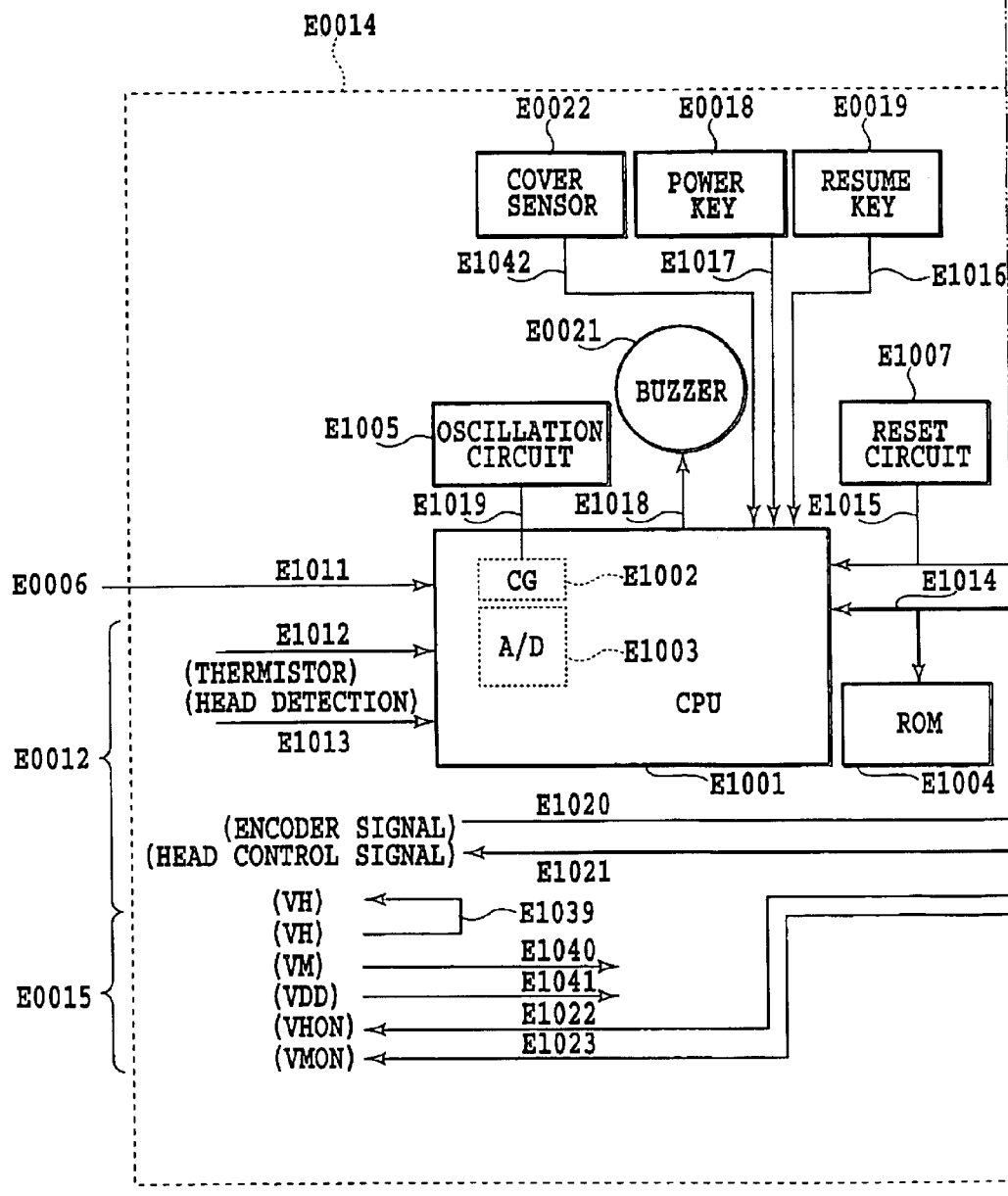
FIG.8A

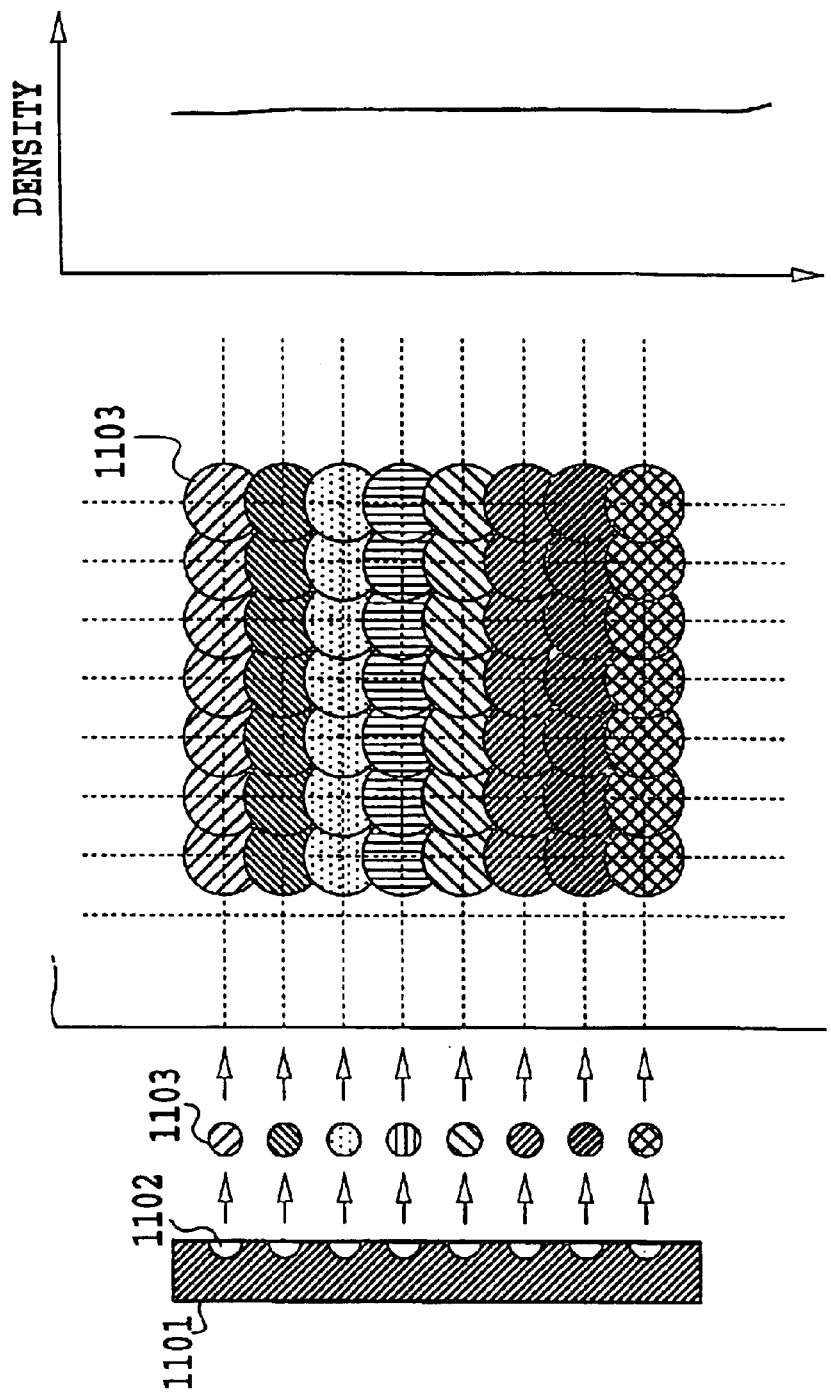

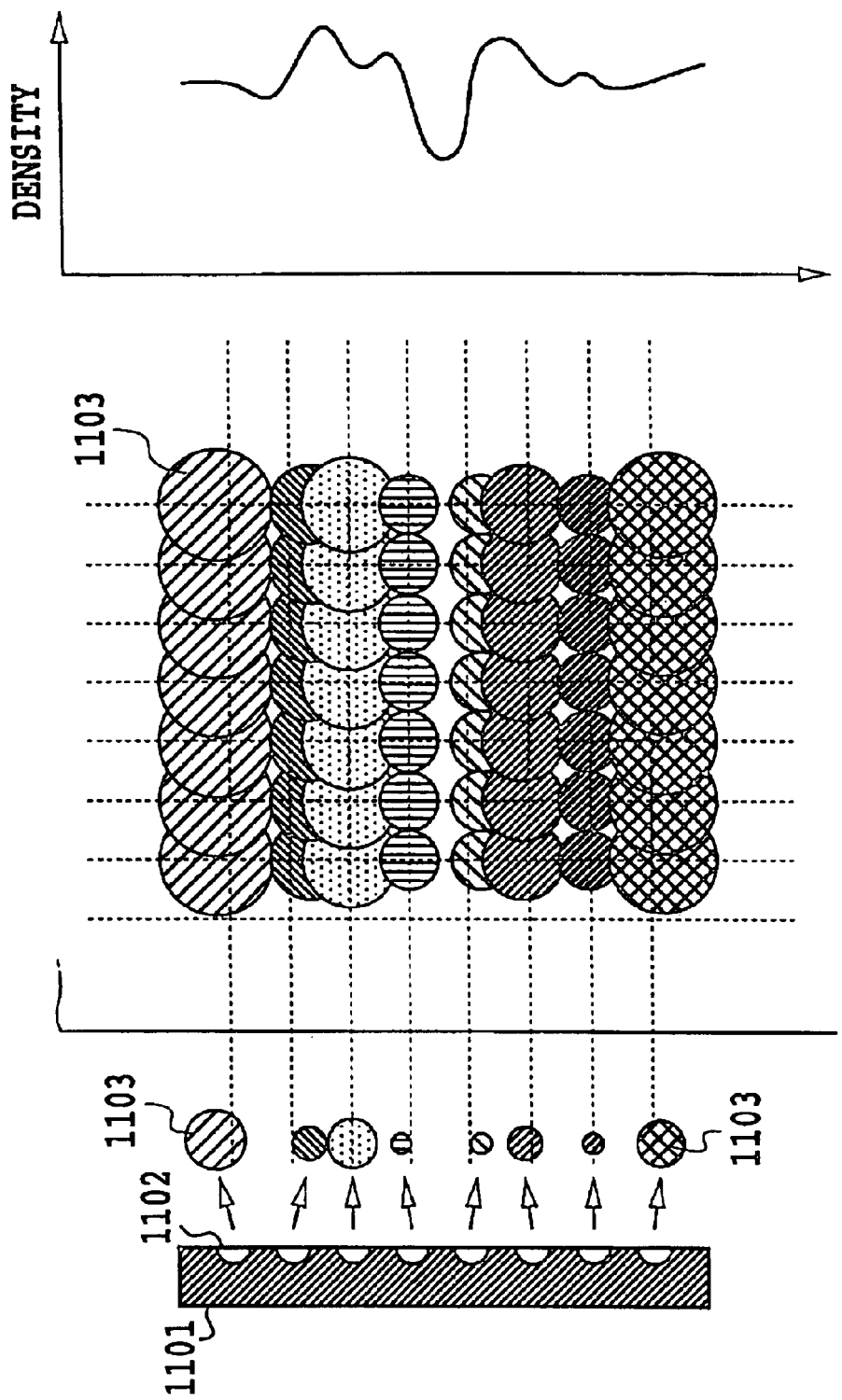

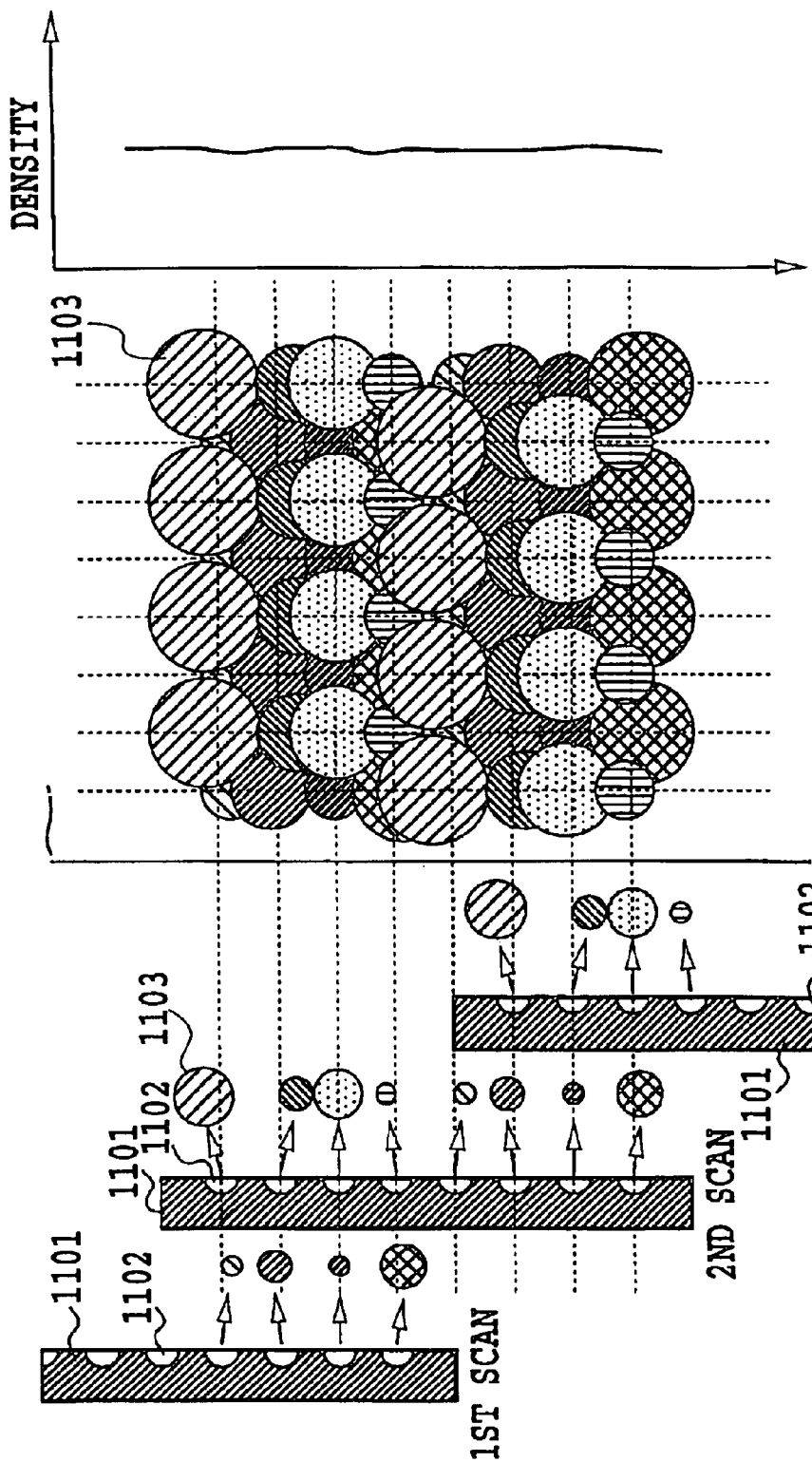

INK JET PRINTING APPARATUS AND INK JET PRINTING METHOD FOR FORMING AN IMAGE ON A PRINT MEDIUM

This application is based on Japanese Patent Application Nos. 11-237325 (1999) filed Aug. 24, 1999, and 2000-216687 filed Jul. 17, 2000, the contents of which are incorporated hereinto by reference.

BACKGROUND OF THE INVENTION

1. Field of the Invention

The present invention relates to an ink jet printing apparatus that ejects ink from nozzles for printing, and more particularly to a printing apparatus of a so-called multipass system which uses a print head having a plurality of nozzle groups each consisting of a plurality of nozzles and performs a plurality of main scans over the same main scan print area of a predetermined print medium by using different nozzle groups to form different thinned out images during the main scans according to thinned out mask patterns associated with the respective scans to complete an image. More specifically, the present invention concerns a reduction in image degrading factors such as density variations and white stripes.

In addition to general printing apparatus, the present invention can be applied to copying machines, facsimiles with a communications system, word processors with a printing unit, and industrial printing apparatus combined with a variety of processing devices as well as to press-dying apparatus and etching processing apparatus.

2. Description of the Related Art

The printing apparatus, such as printers, copying machines and facsimiles, form an image made up of dot patterns on a print medium, such as paper and thin plastic plate, according to image information. These printing apparatus can be classified into an ink jet system, a wire dot system, a thermal system and a laser beam system by the printing method. A printing apparatus using the ink jet system (ink jet printing apparatus ) ejects ink (print liquid) droplets from orifices of nozzles of the print head onto a print medium to which the ink droplets adhere, thus forming an image.

With a large number of printing apparatus in use in recent years, a variety of demands are being placed on the printing apparatus, including fast printing, high resolution, high image quality and low noise. Of these, the ink jet printing apparatus can be chosen as being able to meet these requirements. The ink jet printing apparatus, because it ejects ink from the print head, must stabilize the direction of ink ejection and the amount of ink ejected to meet the above requirements.

Although the ink jet printing apparatus has made a variety of improvements on the printing apparatus body side, such as the provision of an ejection performance recovery device, the stability of the ink ejection amount largely depends on the performance of each print head. In other words, the ink ejection amount and the ink ejection direction are greatly influenced by small errors produced during the print head manufacturing process, which include variations in the shape of orifices of the print head, in the electrothermal transducers (ink ejection heater) that generate energy for ejecting ink, and in electromechanical transducers (piezoelectric elements). This in turn results in density variations in the image formed, degrading the image quality.

An example of this phenomenon is shown in FIGS. 36A, 36B and 36C.

In FIG. 36A, reference number 1101 denotes a multi-nozzle head which, for simplicity of explanation, has eight nozzles 1102 (each of which, unless otherwise noted, generally includes an orifice, a liquid path communicating with the orifice, and an element for generating energy used to eject ink). Denoted 1103 are ink droplets from the nozzles 1102 which should ideally be ejected in the same amounts and in the same directions. When ejected in this ideal conditions, the ink droplets land on the paper, as shown in FIG. 36A, to form dots of equal sizes which in turn form an overall uniform image with no density variations, as shown in FIG. 36C.

In reality, however, the nozzles each have characteristic variations and when the printing is done as described above, the sizes and directions of ink droplet 1103 ejected from the nozzles 1102 will vary among the nozzles, as shown in FIG. 37A, forming the dots as shown in FIG. 37B. The figure shows that blank portions appear periodically in the head main scan direction, that there are portions where dots overlap excessively, or that a white stripe is formed as shown at the center of this figure. A collection of dots printed in this condition has a density distribution in the direction of nozzle array as shown in FIG. 37C which, when viewed by human eye, is perceived as density variations.

To deal with the density variation, the following method has been proposed. This method will be explained by referring to FIGS. 38A, 38B and 38C and FIGS. 39A, 39B and 39C.

This method performs three scans (main print scans) by a print head 2001, as shown in FIGS. 38A, 38B and 38C and FIGS. 39A, 39B and 39C to complete the printing in the print area shown in FIG. 36B. A four-pixel unit scan area measuring in the vertical direction of the figures one-half of the eight pixels of the head is completed by two scans (two passes). The eight nozzles of the print head 2001 is divided into a group of upper four nozzles (upper nozzle group) and a group of lower four nozzles (lower nozzle group). The dots printed in one scan by each nozzle are produced by thinning out image data to one-half according to a predetermined image data arrangement. During the second scan the remaining half of dots are embedded in the previously formed thinned out image to complete the printing of the four-pixel unit scan area. This printing method is referred to as a multipass printing method. This method reduces by half the influences of the nozzle characteristics on the printed image even when the print head has nozzles with variations in the ink ejection amount and direction as shown in FIG. 37A. So, the printed image will be as shown in FIG. 38B, rendering black and white stripes such as those shown in FIG. 37B less noticeable. The density variations therefore are alleviated significantly from FIG. 38C to FIG. 38C.

However, even with this multipass printing method it has been confirmed that the density variations may fail to be eliminated at all depending on a print duty of each main scan and that in a half-tone printing additional density variations occur. To deal with this problem, Japanese Patent Application Laid-Open No. 7-52465 (1995) proposes to set the pitch of each print area variable by randomly setting the amount of paper feed during the multipass printing. This randomizes the period of striped density variations to make them less conspicuous, thereby realizing a high quality image formation.

Further, Japanese Patent Application Laid-Open No. 8-25693 (1996) discloses a printing technique whereby images formed by two successive scans of the print head are partly overlapped. That is, of image data printed by the first scan, data printed in an area that is overlapped by the next scan is masked with a random mask pattern. Further, of image data printed by the second scan, data printed in an area that overlaps the area of the previous scan is masked with an inverted pattern of the random mask pattern. The image data thus obtained is used for printing.

Today, a quality of printed images has achieved a significant improvement thanks to an ever-increasing image resolution and a continuing advance of color printing technology. A technique being proposed and implemented to make further improvements in the image resolution involves reducing the amount of ink ejected per dot. Another proposed technique to realize an image quality that would match a silver salt picture involves simultaneously using light-colored inks with reduced densities in addition to the four basic color inks (cyan, magenta, yellow and black). It is, however, feared that reducing the amount of ink ejected per dot may cause problems (deviation of dot landing positions and ink ejection instability).

For example, when an image is formed by a print head having 256 nozzles at a 1200-dpi pitch, each with an ejection amount of 4 pl, an undesired phenomenon occurs in which the ink droplets ejected from the nozzles at the ends of the print head land on positions greatly deviated from where they are intended to land (this phenomenon is referred to as an end nozzle dot deflection). FIG. 40 shows a state in which the landing positions of ink droplets are greatly deviated at a paper feed boundary. With the print head with a 1200-dpi nozzle pitch and an ink ejection amount of 4 pl, the landing positions of several dots at the beginning of the printing are not deviated, as shown. As the carriage accelerates, however, the dot position begins to deflect, by about 50 μm.

FIG. 41 schematically shows the tendency of ink ejection from the print head 1101 as seen from the carriage when the droplets ejected from the ends of the print head 1101 have already begun to deviate. It is known that several nozzles 1102 at the ends of the print head tend to eject ink droplets somewhat inwardly, as shown in the figure. This tendency becomes conspicuous when an image is formed with minute droplets as small as 4 pl. The deflection of the droplets results in the formation of what is visually perceived as a white stripe. It is therefore conventional practice to increase the number of passes to make the white stripe visually less noticeable.

The above conventional technologies, however, have the following points to be further improved.

That is, in the technique described in the Japanese Patent Application Laid-Open No. 7-52465 (1995), although the random setting of the feed of the print medium randomizes the frequency of occurrence of the white stripes, it is desired to be further improved in reducing the occurrence of the white stripes.

In the Japanese Patent Application Laid-Open No. 8-25693 (1996), because the image area on the print medium printed by one scan and the image area printed by the next scan partly overlap with each other, the occurrence of the striped density variations is alleviated. However, when the precision of the landing positions of the ink droplets from the end nozzles of the print head degrades substantially as shown in FIGS. 31 and 32, the landing position deviation is visually perceived as a white stripe.

Further, in the techniques described in the above official gazettes, because the paper feed is controlled at variable pitches, as opposed to a normal constant pitch, it is feared that the throughput may deteriorate.

The throughput is also lowered when the number of passes is increased to make the white stripes less conspicuous as described above. The reduction in throughput is among the factors standing in the way to a faster printing speed required of the printing apparatus of recent years.

SUMMARY OF THE INVENTION

The present invention has been accomplished to overcome the problems experienced with the conventional techniques described above and to provide a printing apparatus and a printing method capable of forming a high-resolution image at high speed while preventing a degradation of image quality due to white stripes and density variations.

In the first aspect of the present invention, there is provided an ink jet printing apparatus for forming an image on a print medium by using a print head, the print head having a plurality of nozzle groups, each having a plurality of nozzles, the ink jet printing apparatus comprising:

means for performing a plurality of main scans on one and the same main scan print area of the print medium using different nozzle groups and for forming a thinned out image according to a thinning out mask pattern in each of the plurality of main scans to complete an image; and printing duty setting means for dividing the same main scan print area at a predetermined pitch in a subscan direction different from a main scan direction and for setting printing duties of the divided areas determined by the thinning out mask pattern to different values.

In the second aspect of the present invention, there is provided an ink jet printing method for forming an image on a print medium by using a print head, the print head having a plurality of nozzle groups, each having a plurality of nozzles, the ink jet printing method comprising the steps of:

performing a plurality of main scans on one and the same main scan print area of the print medium using different nozzle groups and forming a thinned out image according to a thinning out mask pattern in each of the plurality of main scans; and dividing the same main scan print area at a predetermined pitch in a subscan direction different from a main scan direction and setting printing duties of the divided areas determined by the thinning out mask pattern to different values.

In the third aspect of the present invention, there is provided a printing control method for an ink jet printing apparatus, the ink jet printing apparatus having a plurality of nozzle groups, each having a plurality of nozzles, the printing control method comprising the steps of:

providing the printing apparatus;

performing a plurality of main scans on one and the same main scan print area of the print medium using different nozzle groups and forming a thinned out image according to a thinning out mask pattern in each of the plurality of main scans; and dividing the same main scan print area at a predetermined pitch in a subscan direction different from a main scan direction and setting printing duties of the divided areas determined by the thinning out mask pattern to different values.

BRIEF DESCRIPTION OF THE DRAWINGS

FIG. 7 is a block diagram schematically showing the overall configuration of an electric circuitry of the printer according to one embodiment of the present invention;

FIG. 36A is a schematic diagram showing ink droplets being ejected from the print head in an appropriate condition;

FIG. 36B is a schematic diagram showing an image with no density variations that is formed with the ejected ink droplets of FIG. 36A;

FIG. 36C is a line diagram showing a density distribution of the image of FIG. 36B;

FIG. 37A is a schematic diagram showing ink droplets being ejected from the print head in an uncontrolled condition;

FIG. 37B is a schematic diagram showing an image with density variations that is formed with the ejected ink droplets of FIG. 28A;

FIG. 37C is a line diagram showing a density distribution of the image of FIG. 37B;

FIG. 38A is a schematic diagram showing ink droplets being ejected from the print head during a multipass printing (2-pass printing);

FIG. 38B is a schematic diagram showing an image with density variations that is formed with the ejected ink droplets of FIG. 38A;

FIG. 38C is a line diagram showing a density distribution of the image of FIG. 38B;

DETAILED DESCRIPTION OF PREFERRED EMBODIMENTS

Embodiments of the printing apparatus according to the present invention will be described by referring to the accompanying drawings.

In the following description we take up as an example a printing apparatus using an ink jet printing system.

In this specification, a word "print" (or "record") refers to not only forming significant information, such as characters and figures, but also forming images, designs or patterns on printing medium and processing media, whether the information is significant or insignificant or whether it is visible so as to be perceived by humans.

The word "print medium" or "print sheet" include not only paper used in common printing apparatus, but cloth, plastic films, metal plates, glass, ceramics, wood, leather or any other material that can receive ink. This word will be also referred to "paper".

Further, the word "ink" (or "liquid") should be interpreted in its wide sense as with the word "print" and refers to liquid that is applied to the printing medium to form images, designs or patterns, process the printing medium or process ink (for example, coagulate or make insoluble a colorant in the ink applied to the printing medium).

1. Apparatus Body

Figure 1:
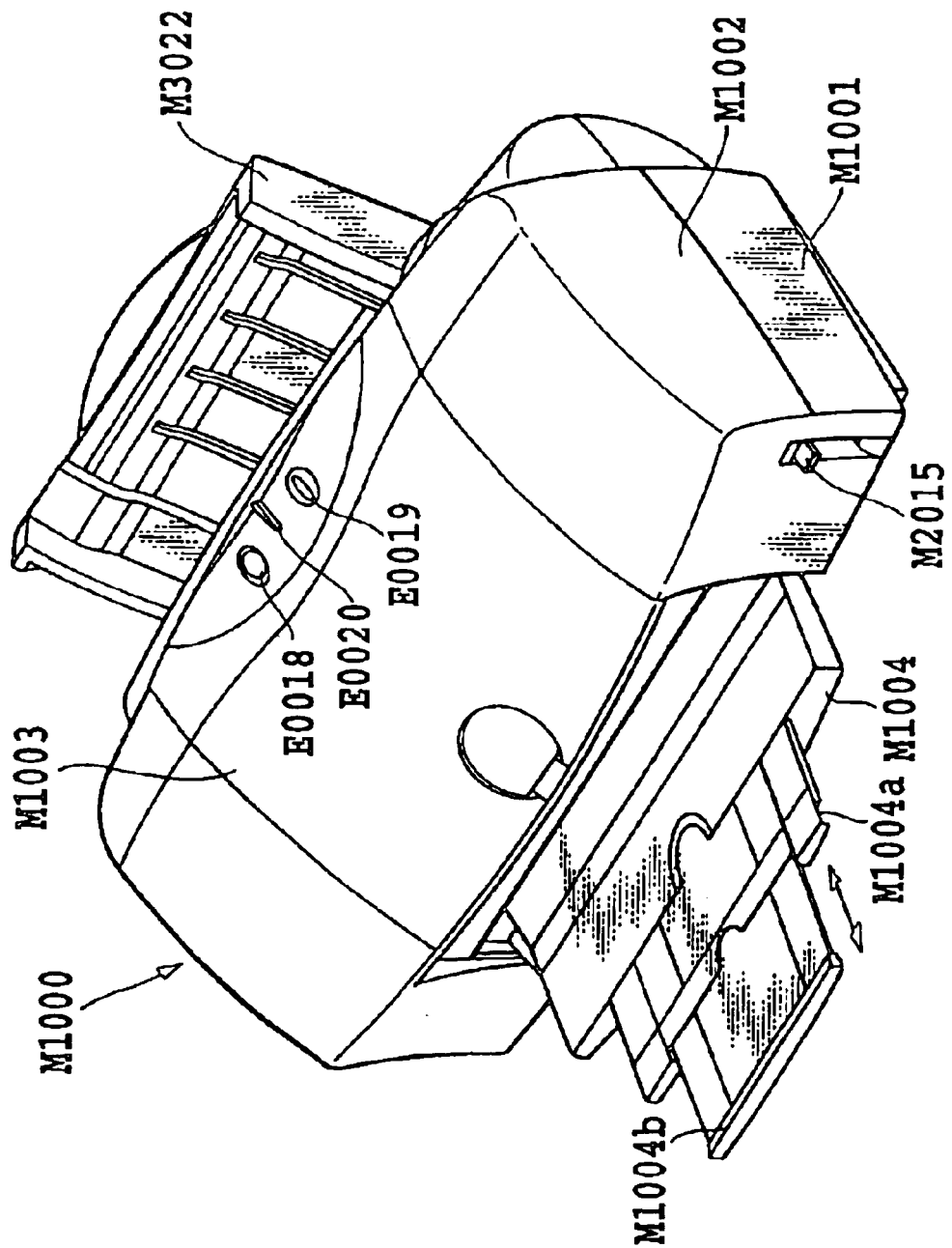
FIG. 1 is a perspective view showing an external construction of an ink jet printer as one embodiment of the present invention.
Figure 2:
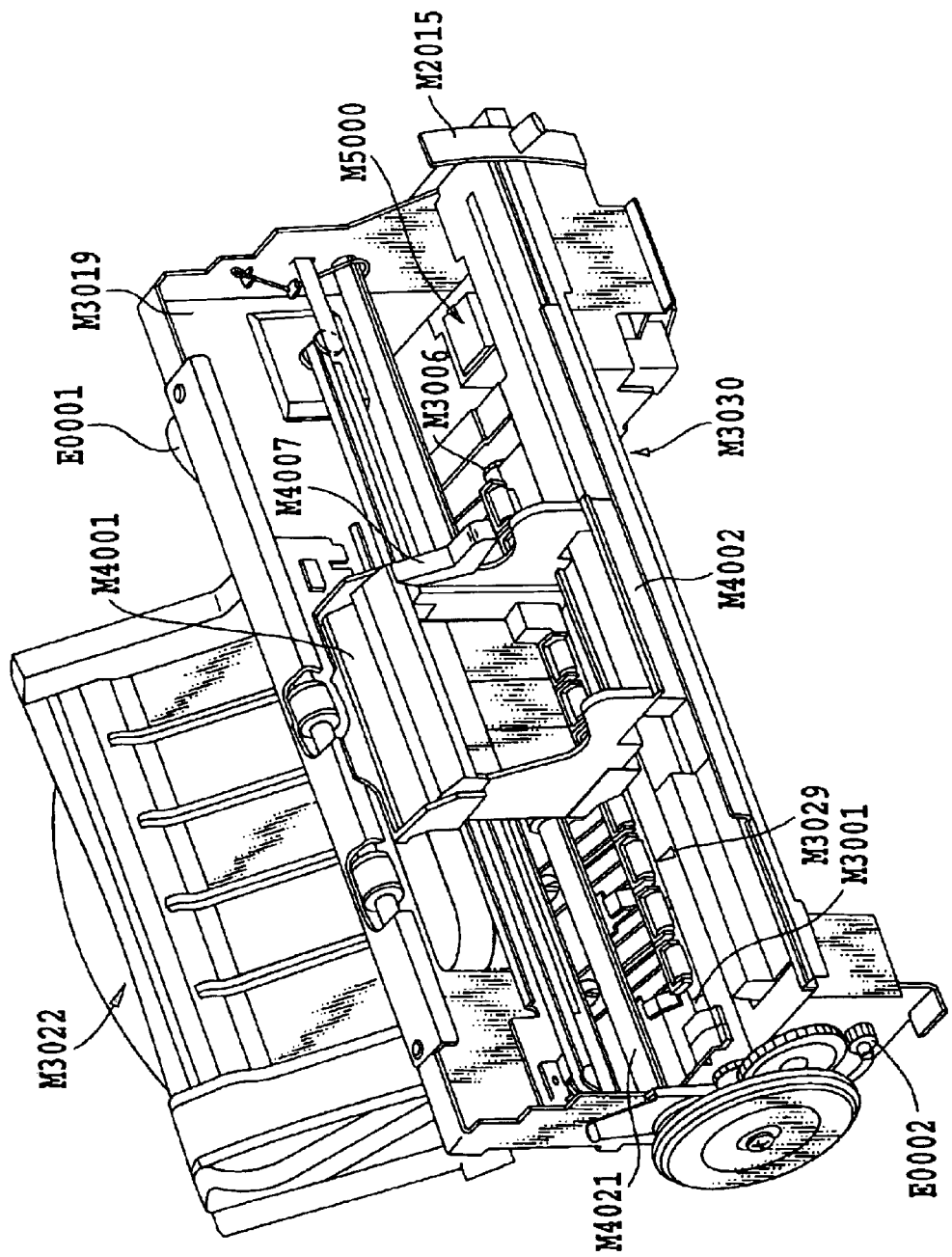
FIG. 2 is a perspective view showing the printer of FIG. 1 with an enclosure member removed.

FIGS. 1 and 2 show an outline construction of a printer using an ink jet printing system. In FIG. 1, a housing of a printer body M1000 of this embodiment has an enclosure member, including a lower case M1001, an upper case M1002, an access cover M1003 and a discharge tray M1004, and a chassis M3019 (see FIG. 2) accommodated in the enclosure member.

The chamois M3019 is made of a plurality of plate-like metal members with a predetermined rigidity to form a skeleton of the printing apparatus and hold various printing operation mechanisms described later The lower case M1001 forms roughly a lower half of the housing of the printer body M1000 and the upper case M1002 forms roughly an upper half of the printer body M1000. These upper and lower cases, when combined, form a hollow structure having an accommodation space therein to accommodate various mechanisms described later. The printer body M1000 has an opening in its top portion and front portion.

The discharge tray M1004 has one end portion thereof rotatably supported on the lower case M1001. The discharge tray M1004, when rotated, opens or closes an opening formed in the front portion of the lower case M1001. When the print operation is to be performed, the discharge tray M1004 is rotated forwardly to open the opening so that printed sheets can be discharged and successively stacked. The discharge trap M1004 accommodates two auxiliary trays M1004a, M1004b. These auxiliary trays can be drawn out forwardly as required to expand or reduce the paper support area in three steps.

The access cover M1003 has one end portion thereof rotatably supported on the upper case M1002 and opens or closes an opening formed in the upper surface of the upper case M1002. By opening the access cover M1003, a print head cartridge H1000 or an ink tank H1900 installed in the body can be replaced. When the access cover M1003 is opened or closed, a projection formed at the back of the access cover, not shown here, pivots a cover open/close lever. Detecting the pivotal position of the lever as by a micro-switch and so on can determine whether the access cover is open or closed.

At the upper rear surface of the upper case M1002 a power key E0018, a resume key E0019 and an LED E0020 are provided. When the power key E0018 is pressed, the LED E0020 lights up indicating to an operator that the apparatus is ready to print. The LED E0020 has a variety of display functions, such, as alerting the operator to printer troubles as by changing its blinking intervals and color. Further, a buzzer E0021 (FIG. 7) may be sounded. When the trouble is eliminated, the resume key E0019 is pressed to resume the printing.

2. Printing Operation Mechanism

Next, a printing operation mechanism installed and held in the printer body M1000 according to this embodiment will be explained.

The printing operation mechanism in this embodiment comprises an automatic sheet feed unit M3022 to automatically feed a print sheet into the printer body; a sheet transport unit M3029 to guide the print sheets, fed one at a time from the automatic sheet feed unit, to a predetermined print position and to guide the print sheet from the print position to a discharge unit M3030; a print unit to perform a desired printing on the print sheet carried to the print position; and an ejection performance recovery unit M5000 to recover the ink ejection performance of the print unit.

Here, the print unit will be described. The print unit comprises a carriage M4001 movably supported on a carriage chart M4021 and a print head cartridge H1000 removably mounted on the carriage M4001.

2.1 Print Bead Cartridge

First, the print head cartridge used in the print unit will be described with reference to FIGS. 3 to 5.

Figure 3:
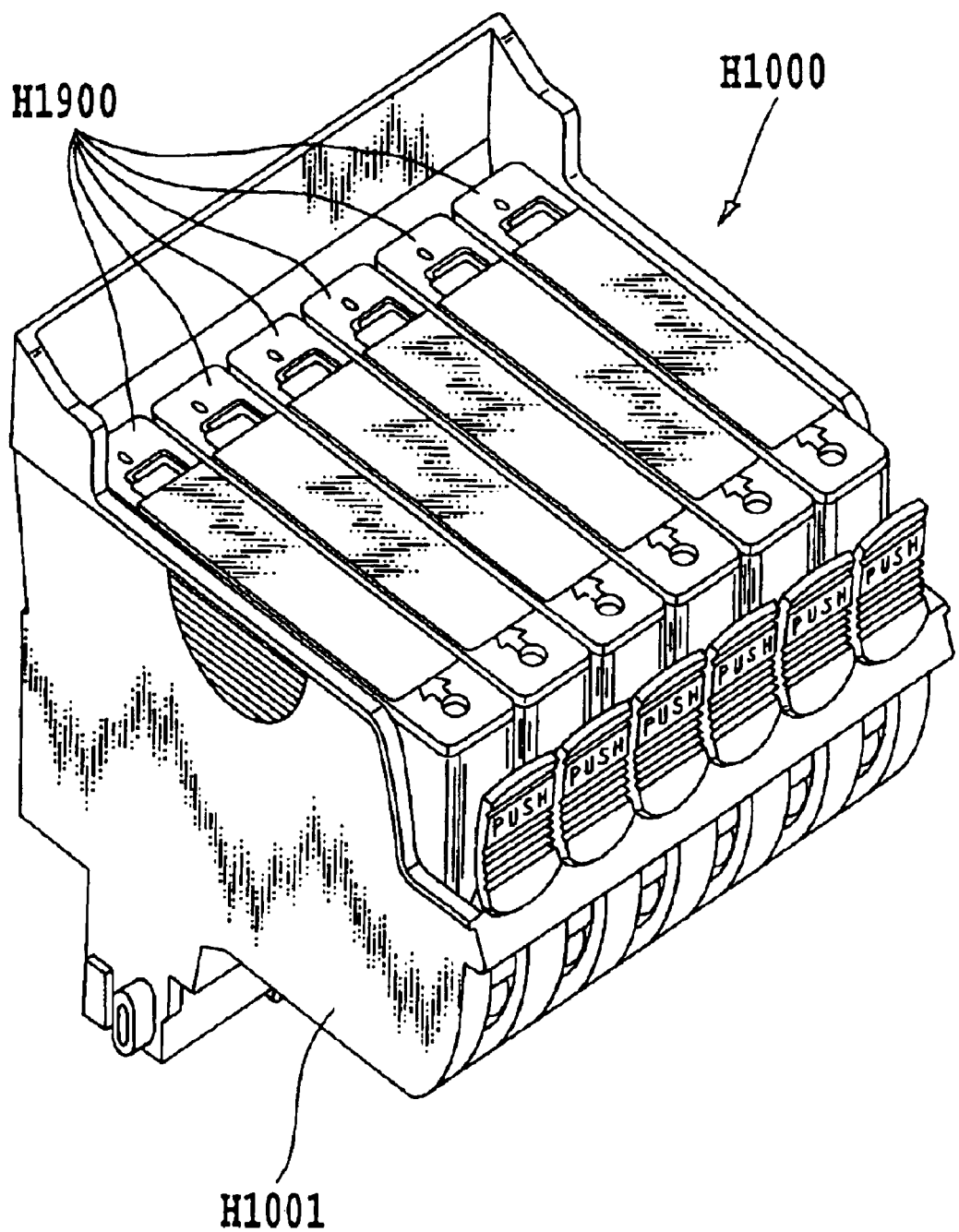
FIG. 3 is a perspective view showing an assembled print head cartridge used in the printer of one embodiment of the present invention.
Figure 4:
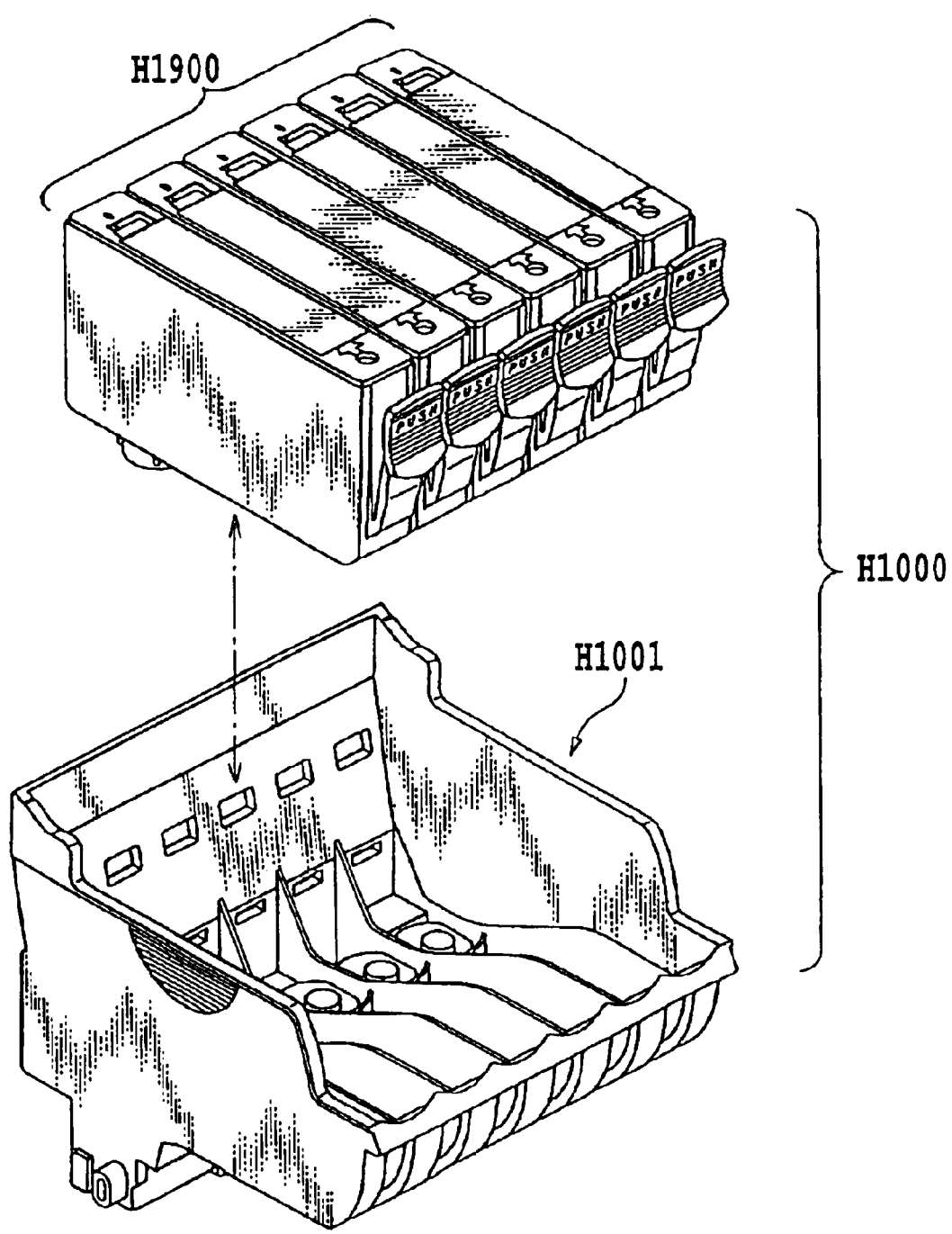
FIG. 4 is an exploded perspective view showing the print head cartridge of FIG. 3.

The print head cartridge H1000 in this embodiment, as shown in FIG. 3, has an ink tank H1900 containing inks and a print head H1001 for ejecting ink supplied from the ink tank H1900 out through nozzles according to print information. The print head H1001 is of a so-called cartridge type in which it is removably mounted to the carriage M4001 described later.

The ink tank for this print head cartridge H1000 consists of separate ink tanks H1900 of, for example, black, light cyan, light magenta, cyan, magenta and yellow to enable color printing with as high an image quality as photograph. As shown in FIG. 4, these individual ink tanks are removably mounted to the print head H1001.

Figure 5:
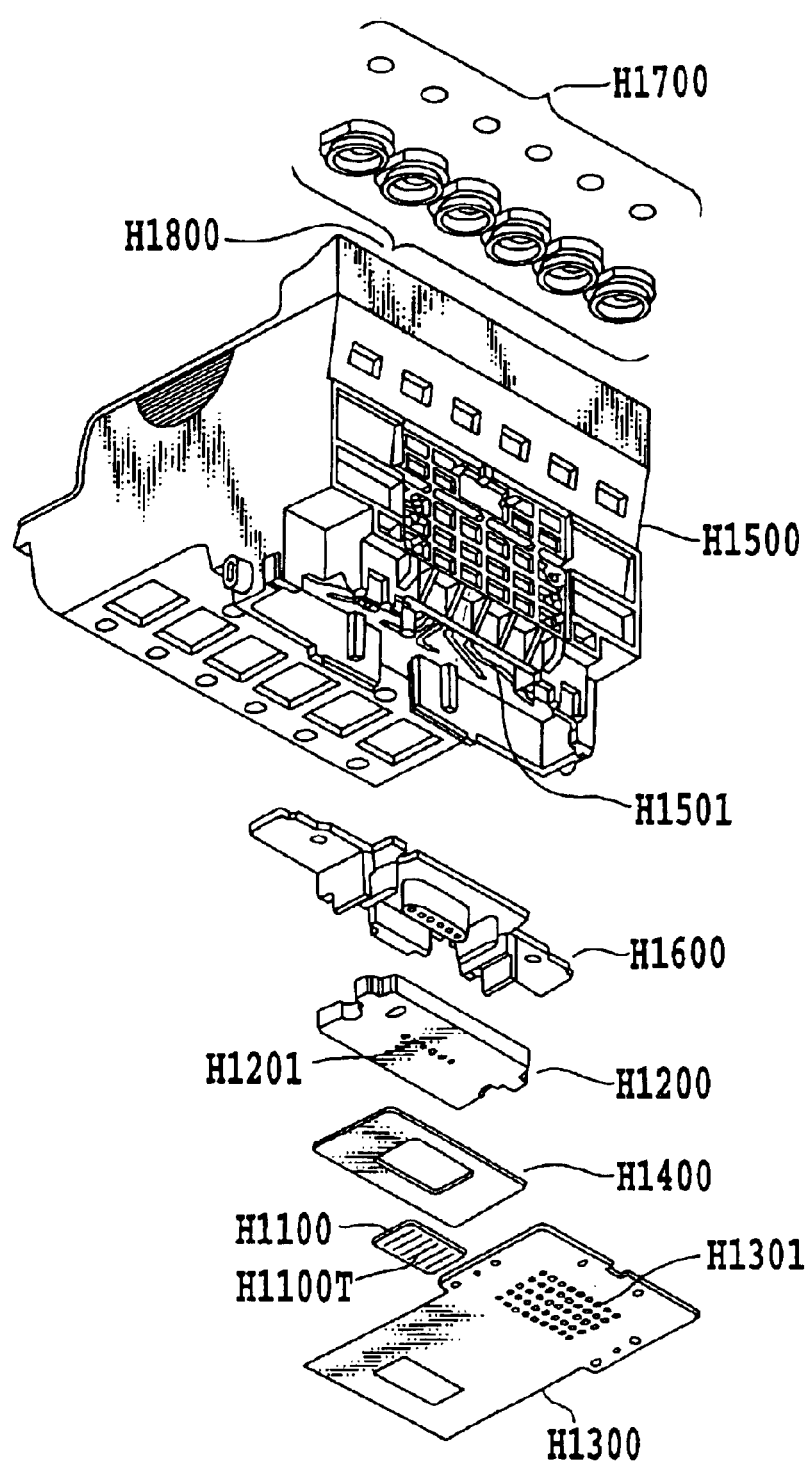
FIG. 5 is an exploded perspective view of the print head of FIG. 4 as seen diagonally below.

Then, the print head H1001, as shown in the perspective view of FIG. 5, comprises a print element substrate H1100, a first plate H1200, an electric wiring board H1300, a second plate H1400, a tank holder H1500, a flow passage forming member H1600, a filter H1700 and a seal rubber H1800.

The print element silicon substrate H1100 has formed in one of its surfaces, by the film deposition technology, a plurality of print elements to produce energy for ejecting ink end electric wires, such as aluminum, for supplying electricity to individual print elements. A plurality of ink passages and a plurality of nozzles H1100T, both corresponding to the print elements, are also formed by the photolithography technology. In the back of the print element substrate A1100, there are formed ink supply ports for supplying ink to the plurality of ink passages. The print element substrate H1100 is securely bonded to the first plate H1200 which is formed with ink supply ports H1201 for supplying ink to the print element substrate H1100. The first plate H1200 is securely bonded with the second plate H1400 having an opening. The second plate H1400 holds the electric wiring board H1300 to electrically connect the electric wiring board H1300 with the print element substrate H1100. The electric wiring board H1300 is to apply electric signals for ejecting ink to the print element substrate H1100, and has electric wires associated with the print element substrate H1100 and external signal input terminals H1301 situated at electric wires' ends for receiving electric signals from the printer body. The external signal input terminals 51301 are positioned and fixed at the back of a tank holder H1500 described later.

The tank holder H1500 that removably holds the ink tank H1900 is securely attached, as by ultrasonic fusing, with the flow passage forming member H1600 to form an ink passage H1501 from the ink tank H1900 to the first plate H1200. At the ink tank aide end of the ink passage H1501 that engages with the ink tank H1900, a filter H1700 is provided to prevent external dust from entering. A seal rubber H1800 is provided at a portion where the filter H1700 engages the ink tank H1900, to prevent evaporation of the ink from the engagement portion.

As described above, the tank holder unit, which includes the tank holder H1500, the flow passage forming member H1600, the filter H1700 and the seal rubber H1800, and the print element unit, which includes the print element substrate H1100, the first plate H1200, the electric wiring board H1300 and the second plate H1400, are combined by adhesives to form the print head H1001.

2.2 Carriage

Next, by referring to FIG. 2, the carriage M4001 carrying the print head cartridge H1000 will be explained.

As shown in FIG. 2, the carriage M4001 has a carriage cover M4002 for guiding the print head H1001 to a predetermined mounting position on the carriage M4001, and a head set lever M4007 that engages and presses against the tank holder H1500 of the print head H1001 to got the print head H1001 at a predetermined mounting position.

That is, the head set lever M4007 is provided at the upper part of the carriage M4001 so as to be pivotable about a head set lever shaft. There is a spring-loaded head set plate (not shown) at an engagement portion where the carriage M4001 engages the print head H1001. With the spring force, the head set lever M4007 presses against the print head H1001 to mount it on the carriage M4001.

At another engagement portion of the carriage M4001 with the print head H1001, there is provided a contact flexible printed cable (see FIG. 7: simply referred to as a contact PPC hereinafter) E0011 whose contact portion electrically contacts a contact portion (external signal input terminals) H1301 provided in the print head H1001 to transfer various information for printing and supply electricity to the print head H1001.

Between the contract portion of the contact FPC E0011 and the carriage M4001 there is an elastic member not shown, such as rubber. The elastic force of the elastic member and the pressing force of the head set lever spring combine to ensure a reliable contact between the contact portion of the contact FPC E0011 and the carriage M4001. Further, the contact FPC E0011 is connected to a carriage substrate E0013 mounted at the back of the carriage M4001 (see FIG. 7).

3. Scanner

The printer of this embodiment can mount a scanner in the carriage M4001 in place of the print head cartridge H1000 and be used as a reading device.

The scanner moves together with the carriage M4001 in the main scan direction, and reads an image on a document fed instead of the printing medium as the scanner moves in the main scan direction. Alternating the scanner reading operation in the main scan direction and the document feed in the sub-scan direction enables one page of document image information to be read.

Figure 6B:
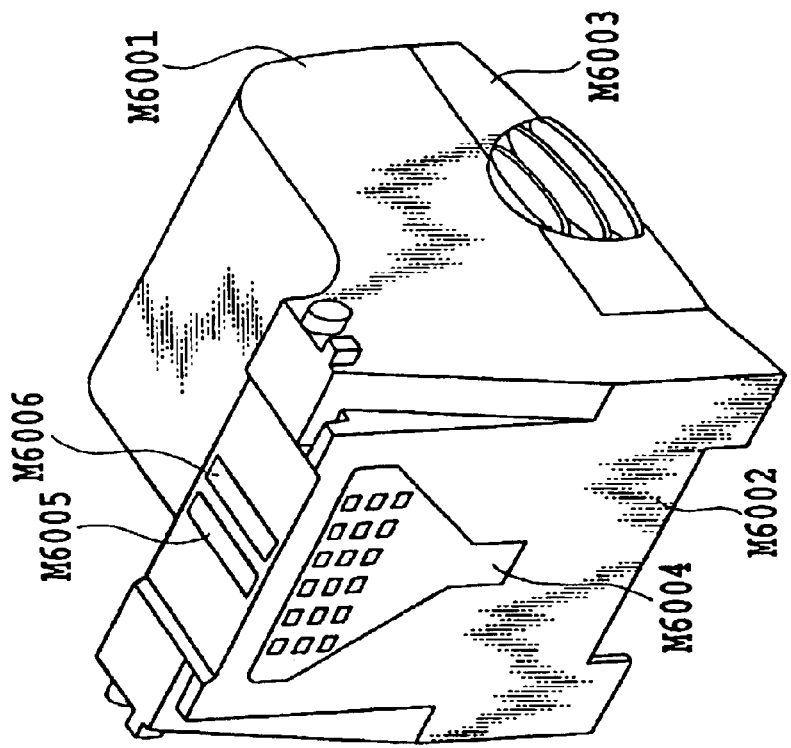
FIGS. 6A and 6B are perspective views showing a construction of a scanner cartridge upside down which can be mounted in the printer of one embodiment of the present invention instead of the print head cartridge of FIG. 3.
Figure 6A:
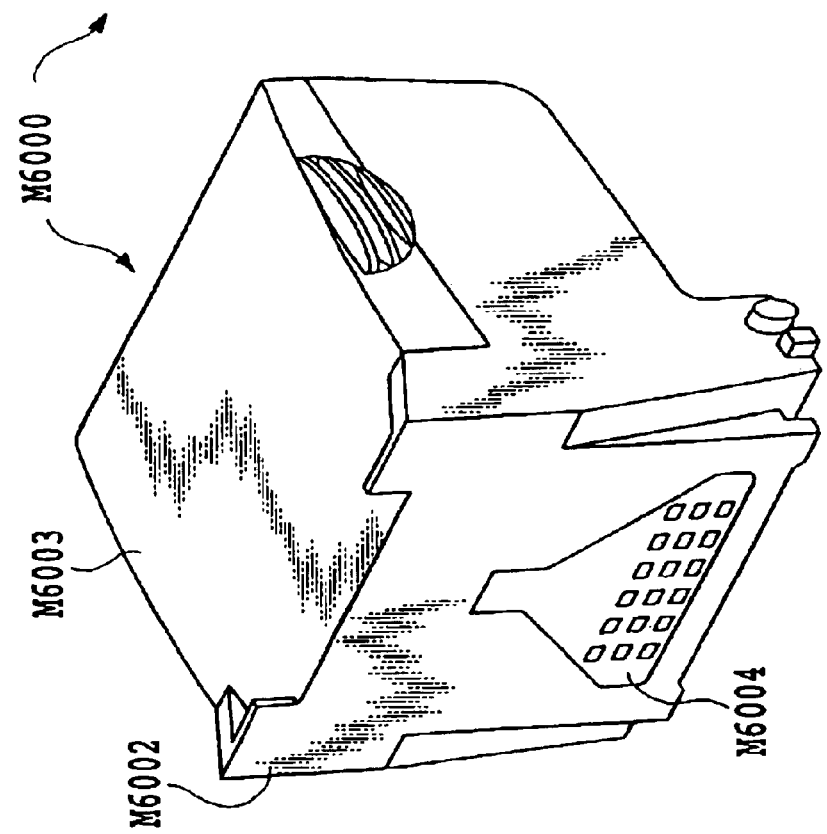

FIGS. 6A and 6B show the scanner M6000 upside down to explain its construction.

As shown in the figure, a scanner holder M6001 is shaped like a box and contains an optical system and a processing circuit necessary for reading. A reading lens M6006 is provided at a portion that faces the outface of a document when the scanner M6000 is mounted on the carriage M4001. The lens M6006 focuses light reflected from the document surface onto a reading unit inside the scanner to read the document image. An illumination lens M6005 has a light source not shown inside the scanner. The light emitted from the light source is radiated onto the document through the lens M6005.

The scanner cover M6003 secured to the bottom of the scanner holder M6001 shields the interior of the scanner holder M6001 from light. Louver-like grip portions are provided at the sides to improve the ease with which the scanner can be mounted to and dismounted from the carriage M4001. The external shape of the scanner holder M6001 is almost similar to that of the print head H1001, and the scanner can be mounted to or dismounted from the carriage M4001 in a manner similar to that of the print head H1001.

The scanner holder M6001 accommodates a substrate having a reading circuit, and a scanner contact PCB M6004 connected to this substrate is exposed outside. When the Scanner M6000 is mounted on the carriage M4001, the scanner contact PCS M6004 contacts the contact FPC E0011 of the carriage M4001 to electrically connect the substrate to a control system on the printer body side through the carriage M4001.

4. Example Configuration of Printer Electric Circuit

Next, an electric circuit configuration in this embodiment of the invention will be explained.

FIG. 7 schematically shows the overall configuration of the electric circuit in this embodiment.

The electric circuit in this embodiment comprises mainly a carriage substrate (MCB) E0013, a main PCB (printed circuit board) E0014 and a power supply unit E0015.

The power supply unit E0015 is connected to the main PCB E0014 to supply a variety of drive power.

The carriage substrate E0013 is a printed circuit board unit mounted on the carriage M4001 (FIG. 2) and functions as an interface for transferring signals to and from the print head through the contact FPC E0011. In addition, based on a pulse signal output from an encoder sensor E0004 an the carriage M4001 moves, the carriage substrate E0013 detects a change in the positional relation between an encoder scale E0005 and the encoder sensor E0004 and sends its output signal to the main PCB E0014 through a flexible flat cable (CRFFC) E0012.

Further, the main PCS E0014 is a printed circuit board unit that controls the operation of various parts of the ink jet printing apparatus in this embodiment, and has I/O ports for a paper end sensor (PE sensor) E0007, an automatic sheet feeder (ASF) sensor E0009, a cover sensor E0022, a parallel interface (parallel I/F) E0016, a serial interface (Serial I/F) E0017, a resume key E0019, an LED E0020. a power key E0018 and a buzzer E0021. The main PCB E0014 is connected to and controls a motor (CR motor) E0001 that constitutes a drive source for moving the carriage M4001 in the main scan direction; a motor (LF motor) E0002 that constitutes a drive source for transporting the printing medium; and a motor (PG motor) E0003 that performs the functions of recovering the ejection performance of the print head and feeding the printing medium. The main PCB E0014 also has connection interfaces with an ink empty sensor E0006, a gap sensor E0008, a PG sensor E0010, the CRFFC E0012 and the power supply unit E0015.

Figure 8B:
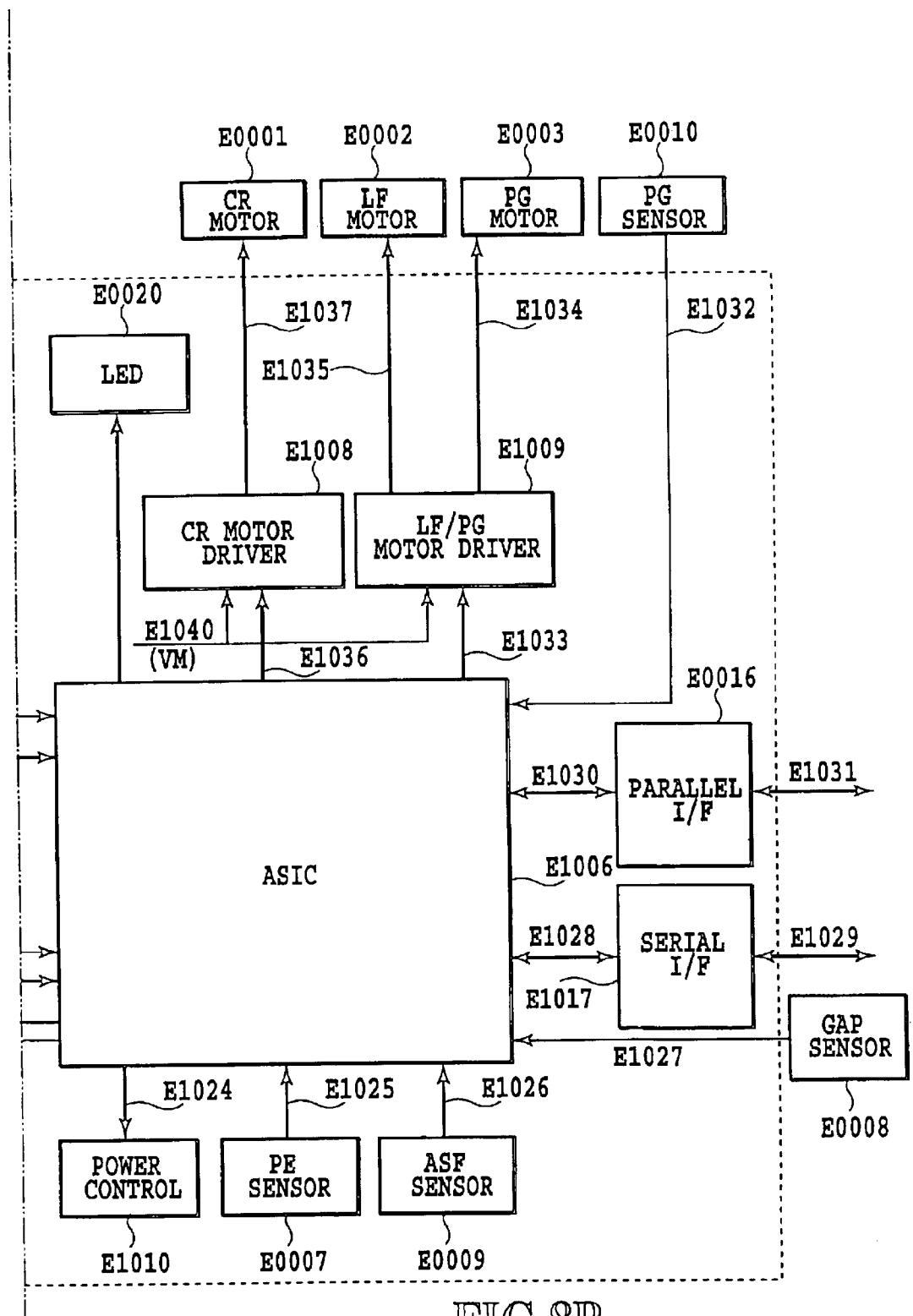
FIG. 8 is a diagram showing the relation between FIGS. 8A and 8B, FIGS. 8A and 8B being block diagrams representing an example inner configuration of a main printed circuit board (PCB) in the electric circuitry of FIG. 7.

FIG. 8 is a diagram showing the relation between FIGS. 8A and 8B, and FIGS. 8A and 8B are block diagrams showing an inner configuration of the main PCB E0014.

Reference number E1001 represents a CPU, which has a clock generator (CG) E1002 connected to an oscillation circuit E1005 to generate a system clock based on an output signal E1019 of the oscillation circuit E1005. The CPU E1001 is connected to an ASIC (application specific integrated circuit) and a ROM E1004 through a control bus E1014. According to a program stored in the ROM E1004, the CPU E1001 controls the ASIC E1006, checks the status of an input signal E1017 from the power key, an input signal E1016 from the resume key, a cover detection signal E1042 and a head detection signal (HSENS) E1013, drives the buzzer E0021 according to a buzzer signal. (BUZ) E1018, and checks the status of an ink empty detection signal (INKS) E1011 connected to a built-in A/D converter E1003 and of a temperature detection signal (TH) E1012 from a thermistor. The CPU E1001 also performs various other logic operations and makes conditional decisions to control the operation of the ink jet printing apparatus.

The head detection signal E1013 is a head mount detection signal entered from the print head cartridge H1000 through the flexible flat cable E0012, the carriage substrate E0013 and the contact FPC E0011. The ink empty detection signal E1011 is an analog signal output from the ink empty sensor E0006. The temperature detection signal E1012 is an analog signal from the thermistor (not shown) provided on the carriage substrate E0013.

Designated E1008 is a CR motor driver that uses a motor power supply (VM) E1040 to generate a CR motor drive signal E1037 according to a CR motor control signal E1036 from the ASIC E1006 to drive the CR motor E0001. E1009 designates an LF/PG motor driver which uses the motor power supply E1040 to generate an LF motor drive signal E1035 according to a pulse motor control signal (PM control signal) E1033 from the ASIC E1006 to drive the LF motor. The LF/PG motor driver E1009 also generates a PG motor drive signal E1034 to drive the PG motor.

Designated E1014 is a power supply control circuit which controls the supply of electricity to respective sensors with light emitting elements according to a power supply control signal E1024 from the ASIC E1006. The parallel I/F E0016 transfers a parallel I/F signal E1030 from the ASIC E1006 to a parallel I/F cable E1031 connected to external circuits and also transfers a signal of the parallel I/F cable E1031 to the ASIC E2006. The serial I/F E0017 transfers a serial I/F signal E1028 from the ASIC E1006 to a serial. I/F cable E1029 connected to external circuits, and also transfers a signal from the serial I/F cable E1029 to the ASIC E1006.

The power supply unit E0015 provides a head power signal (VH) E1039, a motor power signal (VM) E1040 and a logic power signal (VDD) E1041. A head power ON signal (VHON) E1022 and a motor power ON signal (VMON) E1023 are sent from the ASIC E1006 to the power supply unit E0015 to perform the ON/OFF control of the head power signal E1039 and the motor power signal E1040. The logic power signal (VDD) E1041 supplied from the power supply unit E0015 is voltage-converted as required and given to various parts inside or outside the main PCB E0014.

The head power signal E1039 is smoothed by a circuit of the main PCB E0014 and then sent out to the flexible flat cable E0011 to be used for driving the print head cartridge H1000. E1007 denotes a reset circuit which detects a reduction in the logic power signal E1041 and sands a reset signal (RESET) to the CPU E1001 and the ASIC E1006 to initialize them.

The ASIC E1006 is a single-chip semiconductor integrated circuit and is controlled by the CPU E1001 through the control bus E1014 to output the CR motor control signal E1036, the PM control signal E1033, the power supply control signal E1024, the head power ON signal E1022 and the motor power ON signal E1023. It also transfers signals to and from the parallel interface E0016 and the serial interface E0017. In addition the ASIC E1006 detects the status of a PE detection signal (PBS) E1025 from the PE sensor E0007, an ASP detection signal (ASPS) E1026 from the ASF sensor E0009, a gap detection signal (GAPS) E1027 from the GAP sensor E0008 for detecting a gap between the print head and the printing medium, and a PG detection signal (PGS) E1032 from the PG sensor E0010, and sends data representing the statuses of these signals to the CPU E1001 through the control bus E1014. Based on the data received, the CPU E1001 controls the operation of an LED drive signal E1038 to turn on or oft the LED E0020.

Further, the ASIC E1006 checks the status of an encoder signal (ENC) E1020, generates a timing signal, interfaces with the print head cartridge H1000 and controls the print operation by a head control signal E1021. The encoder signal (ENC) E1020 is an output signal of the CR encoder sensor E0004 received through the flexible flat cable E0012. The head control signal E1021 is sent to the print head H1001 through the flexible flat cable E0012, carriage substrate E0013 and contact FPC E0011.

Figure 9A:
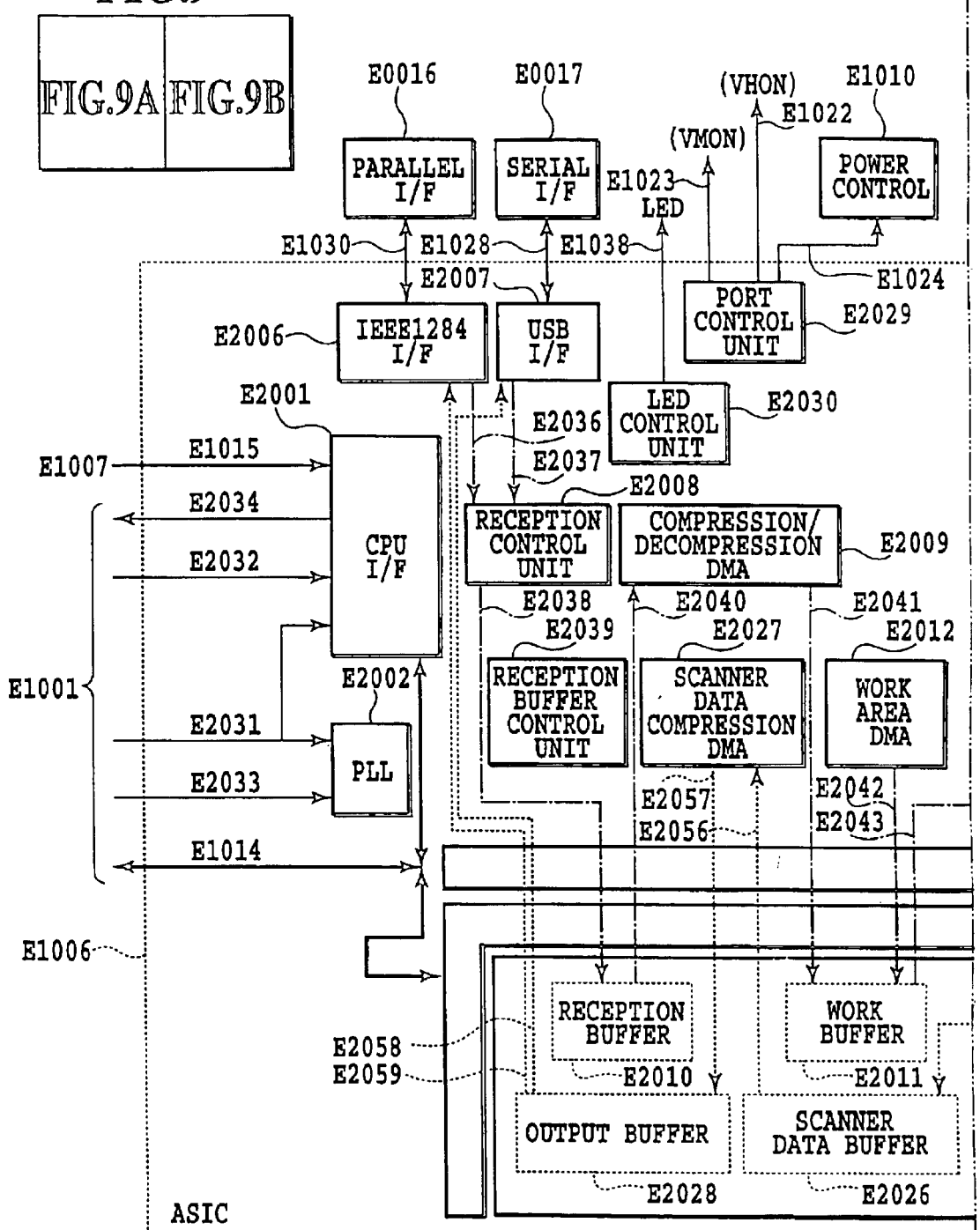
FIG. 9 is a diagram showing the relation between FIGS. 9A and 9B, FIGS. 9A and 9B being block diagrams representing an example inner configuration of an application specific integrated circuit (ASIC) in the main PCB of FIGS. 8A and 8B.
Figure 9B:
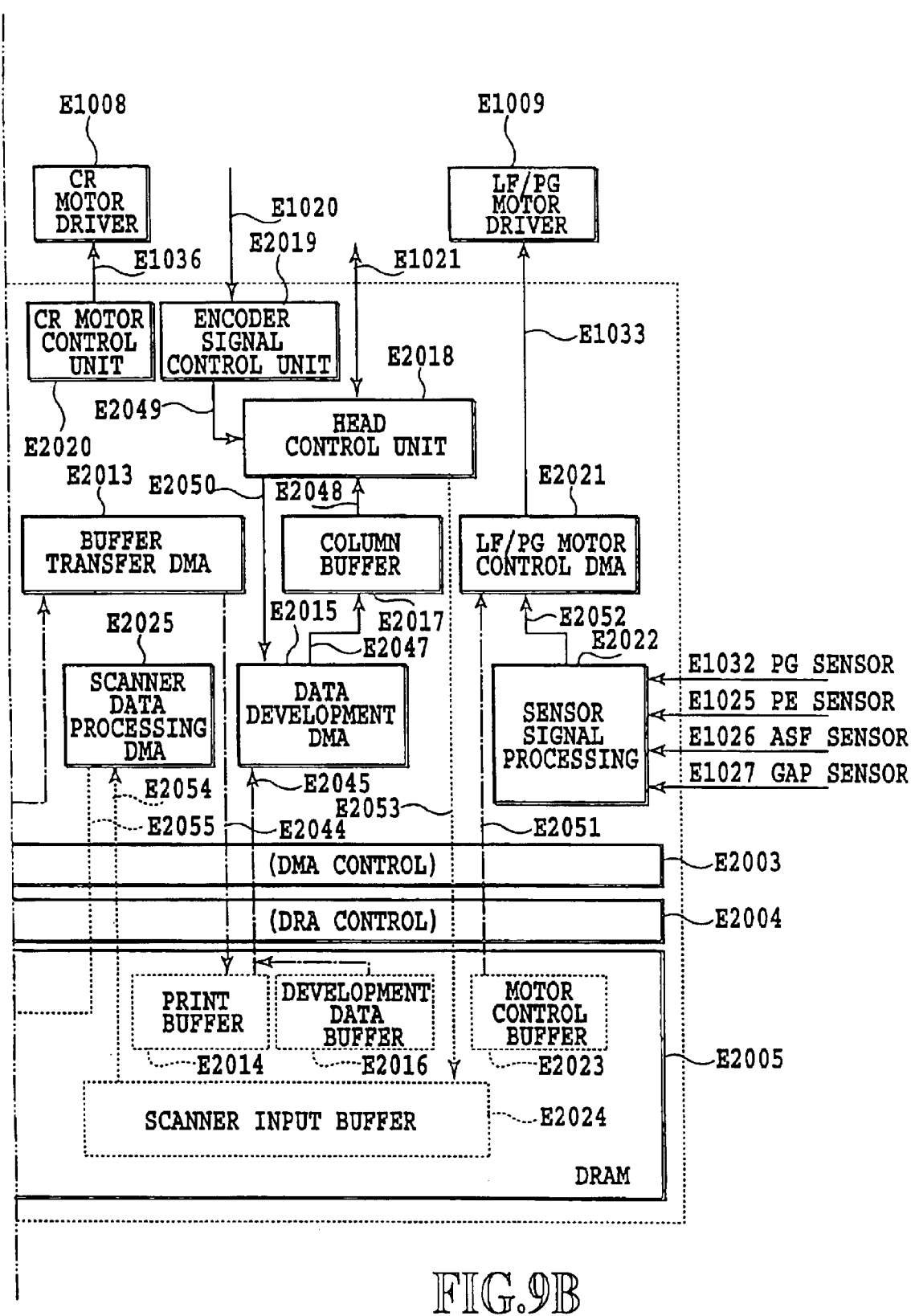

FIG. 9 is a diagram showing the relation between FIGS. 9A and 9B, and FIGS. 9A and 9B are block diagrams showing an example of an internal configuration of the ASIC E1006.

In these figures, only the flow of data, such as print data and motor control data, associated with the control of the head and various mechanical components is shown between each block, and control signals and clock associated with the read/write operation of the registers incorporated in each block and control signals associated with the DMA control are omitted to simplify the drawing.

In the figures, reference number E2002 represents a PLL controller which, based on a clock signal (CLK) E2031 and a PLL control signal (PLLON) E2033 output from the CPU E1001, generates a clock (not shown) to be supplied to the most part of the ASIC E1006.

Denoted E2001 is a CPU interface (CPU I/F) E2001, which controls the read/write operation of register in each block, supplies a clock to some blocks and accepts an interrupt signal (none of these operations are shown) according to a reset signal E1015, a software reset signal (PDWN) E2032 and a clock signal (CLK) E2031 output from the CPU E1001, and control signals from the control bus E1014. The CPU I/F E2001 them outputs an interrupt signal (INT) E2034 to the CPU E1001 to inform it of the occurrence of an interrupt within the ASIC E1006.

E2005 denotes a DRAM which has various areas for storing print data, such as a reception buffer E2010. a work buffer E2011, a print buffer E2014 and a development data buffer E2016. The DRAM E2005 also has a motor control buffer E2023 for motor control and, as buffers used instead of the above print date buffers during the scanner operation made, a scanner input buffer E2024, a scanner data buffer E2026 and an output buffer E2028.

The DRAM E2005 is also used as a work area by the CPU E1001 for its own operation. Designated E2004 is a DRAM control unit E2004 which performs read/write operations on the DRAM E2005 by switching between the DRAM access from the CPU E1001 through the control bus and the DRAM access from a DMA control unit E2003 described later.

The DMA control unit E2003 accepts request signals (not shown) from various blocks and outputs address signals and control signals (not shown) and, in the case of write operation, write data E2038, E2041, E2044, E2053, E2055, E2057 etc. to the DRAM control, unit to make DRAM accesses. In the case of read operation, the DMA control unit E2003 transfers the read data E2040, E2043, E2045, E2051, E2054, E2056, E2058, E2059 from the DRAM control unit E2004 to the requesting blocks.

Denoted 22006 is an IEEE 1284 I/F which functions as a bi-directional communication interface with external host devices, not shown, through the parallel I/F E0016 and is controlled by the CPU E1001 via CPU I/F E2001. During the printing operation, the IEEE 1284 I/F E2006 transfers the receive data (PIP receive data E2036) from the parallel I/F E0016 to a reception control unit E2008 by the DMA processing. During the scanner reading operation, the 1284 I/F E2006 sends the data (1284 transmit data (RDPIF) E2059) stored in the output buffer E2026 in the DRAM E2005 to the parallel I/F E0016 by the DMA processing.

Designated E2007 is a universal serial bus (USB) I/F which offers a bi-directional communication interface with external host devices, not shown, through the serial I/F E0017 and is controlled by the CPU E1001 through the CPU I/F E2001. During the printing operation, the universal serial bus (USE) I/F E2007 transfers received data (USS receive data E2037) from the serial I/F E0017 to the reception control unit E2008 by the DMA processing. During the scanner reading, the universal serial bus (USB) I/F E2007 sends data (USB transmit data (RDUSB) E2058) stored in the output buffer E2028 in the DRAM E2005 to the serial I/F E0017 by the DMA processing. The reception control unit E2006 writes data (WDIF E2038) received from the 1284 I/F E2006 or universal serial bus (USB) I/P E2007, whichever is selected, into a reception buffer write address managed by a reception buffer control unit E22039.

Designated E2009 is a compression/decompression DMA controller which is controlled by the CPU E1001 through the CPU I/F E2001 to read received data (raster data) stored in a reception buffer E2010 from a reception buffer read address managed by the reception buffer control unit E2039, compress or decompress the data (RDWK) E2040 according to a specified mode and write the data as a print code string (WDWK) E2041 into the work buffer area.

Designated E2013 is a print buffer transfer DMA controller which is controlled by the CPU E1001 through the CPU I/F E2001 to read print codes (RDWP) E2043 on the work buffer E2011 and rearrange the print codes onto addresses on the print buffer E2014 that match the sequence of data transfer to the print head cartridge H1000 before transferring the codes (WDWP E2044). Reference number E2012 denotes a work area DMA controller which is controlled by the CPU E1001 through the CPU I/F E2001 to repetitively write specified work fill data (WDWP) E2042 into the area of the work buffer whose data transfer by the print buffer transfer DMA controller E2013 has been completed.

Designated E2015 is a print data development DMA controller E2015, which is controlled by the CPU E1001 through the CPU I/F E2001. Triggered by a data development timing signal E2050 from a head control unit E2018, the print data development DMA controller E2015 reads the print code that was rearranged and written into the print buffer and the development data written into the development data buffer E2016 and writes developed print data (RDHDG) E2045 into the column buffer E2017 as column buffer write data (WDHDG) E2047. The column buffer E2017 is an SRAM. that temporarily stores the transfer data (developed print data) to be sent to the print head cartridge H1000, and is shared and managed by both the print data development DMA CONTROLLER and the head control unit through a handshake signal (not shown).

Designated E2018 is a head control unit E2018 which is controlled by the CPU E1001 through the CPU I/F E2001 to interface with the print head cartridge H1000 or the scanner through the head control, signal. It also outputs a data development timing signal E2050 to the print data development DMA controller according to a head drive timing signal E2049 from the encoder signal processing unit E2019.

During the printing operation, the head control unit E2018, when it receives the head drive timing signal E2049, reads developed print data (RDHD) E2048 from the column buffer and outputs the data to the print head cartridge H1000 an the head control signal E1021.

In the scanner reading made, the head control unit E2015 DMA-transfers the input data (WDHD) E2053 received as the head control signal E1021 to the scanner input buffer E2024 on the DRAM E2005. Designated E2025 is a scanner data processing DMA controller E2025 which is controlled by the CPU E1001 through the CPU I/F E2001 to read input buffer read data (RDAV) E2054 stored in the scanner input buffer E2024 and writes the averaged data (WDAV) E2055 into the scanner data buffer E2026 on the DRAM E2003.

Designated E2027 is a scanner data, compression DMA controller which is controlled by the CPU E1001 through the CPU I/F E2001 to read processed data (RDYC) E2056 on the scanner data buffer E2026, perform data compression and write the compressed data (WDYC) E2057 into the output buffer E2028 for transfer.

Designated E2019 is an encoder signal processing unit which, when it receives an encoder signal (ENC), outputs the head drive timing signal E2049 according to a mode determined by the CPU E1001. The encoder signal processing unit E2019 also stores in a register information on the position and speed of the carriage M4001 obtained from the encoder signal E1020 and presents it to the CPU E1001. Based on this information, the CPU E1001 determines various parameters for the CR motor E0001. Designated E2020 is a CR motor control unit which is controlled by the CPU E1001 through the CPU I/F E2001 to output the CR motor control signal E1036.

Denoted E2022 is a sensor signal processing unit which receives detection signals E1032, E1025, E1026 and E1027 output from the PG sensor E0010, the PE sensor E0007, the ASF sensor E0009 and the gap sensor E0008, respectively, and transfers these sensor information to the CPU E1001 according to the mode determined by the CPU E1001. The sensor signal processing unit E2022 also outputs a sensor detection signal E2052 to a DMA controller E2021 for controlling LF/PG motor.

The DMA controller E2021 for controlling LF/PG motor is controlled by the CPU E1001 through the CPU I/F E2001 to read a pulse motor drive table (RDPM) E2051 from the motor control buffer E2023 on the DRAM E2005 and output a pulse motor control signal E1033. Depending on the operation mode, the controller outputs the pulse motor control signal E1033 upon reception of the sensor detection signal as a control trigger.

Designated E2030 is an LED control unit which is controlled by the CPU E1001 through the CPU I/F E2001 to output an LED drive signal E1038. Further, designated E2029 is a port control unit which is controlled by the CPU E1001 through the CPU I/F E2001 to output the head power ON signal E1022, the motor power ON signal E1023 and the power supply control signal E1024.

5. Operation of Printer

Figure 10:
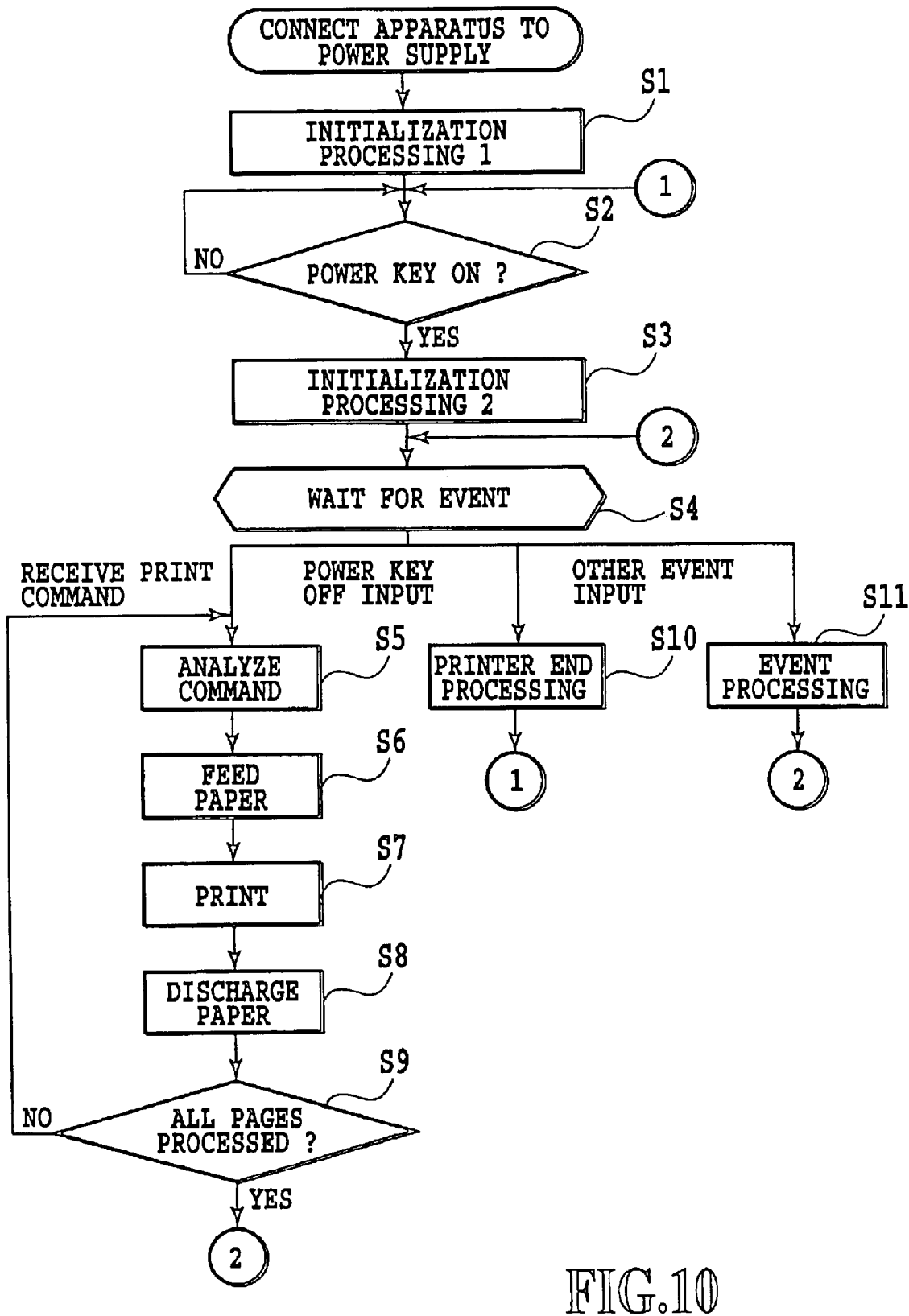
FIG. 10 is a flow chart showing an example of operation of the printer as one embodiment of the present invention.

Next, the operation of the ink jet printing apparatus in this embodiment of the invention with the above configuration will be explained by referring to the flow chart of FIG. 10.

When the printer body M1000 is connected to an AC power supply, a firs initialization is performed at step S1. In this initialization process, the electric circuit system including the ROM and RAM in the apparatus is checked to confirm that the apparatus is electrically operable.

Next, step S2 checks if the power key E0018 on the upper case M1002 of the printer body M1000 is turned on. When it is decided that the power key E0018 is pressed, the processing moves to the next step S3 where a second initialization is performed.

In this second initialization, a check is made of various drive mechanisms and the print head of this apparatus. That is, when various motors are initialized and head information is read, it is checked whether the apparatus is normally operable.

Next, steps S4 waits for an event. That is, this step monitors a demand event from the external I/F, a panel key event from the user operation and an internal control event and, when any of these events occurs, executes the corresponding processing.

When, for example, step S4 receives a print command event from the external I/F, the processing moves to step S5. When a power key event from the user operation occurs at step S4, the processing moves to step S10. If another event occurs, the processing moves to step S11.

Step S5 analyzes the print command from the external I/F, checks a specified paper kind, paper size, print quality, paper feeding method and others, and stores data representing the check result into the DRAM E2005 of the apparatus before proceeding to step S6.

Next, step S6 starts feeding the paper according to the paper feeding method specified by the step S5 until the paper is situated at the print start position. The processing moves to step S7.

At step S7 the printing operation is performed. In this printing operation, the print data sent from the external I/F is stored temporarily in the print buffer. Then, the CR motor E0001 is started to move the carriage M4001 in the main-scanning direction. At the same time, the print data stored in the print buffer E2014 is transferred to the print head H1001 to print one line. When one line of the print data has been printed, the LF motor E0002 is driven to rotate the LF roller M3001 to transport the paper in the subscanning direction. After this, the above operation is executed repetitively until one page of the print data from the external I/F is completely printed, at which time the processing moves to step S8.

At step S8, the LF motor E0002 is driven to rotate the paper discharge roller M2003 to feed the paper until it is decided that the paper is completely fed out of the apparatus, at which time the paper is completely discharged onto the paper discharge tray M1004.

Next at step S9, it is checked whether all the pages that need to be printed have been printed and if there are pages that remain to be printed, the processing returns to step S5 and the steps S5 to S9 are repeated. When all the pages that need to be printed have been printed, the print operation is ended and the processing moves to step S4 waiting for the next event.

Step S10 performs the printing termination processing to stop the operation of the apparatus. That is, to turn off various motors and print head, this step renders the apparatus ready to be cut off from power supply and then turns off power, before moving to step S4 waiting for the next event.

Step S11 performs other event processing. For example, this step performs processing corresponding to the ejection performance recovery command from various panel keys or external I/F and the ejection performance recovery event that occurs internally. After the recovery processing is finished, the printer operation moves to step S4 waiting for the next event.

6. Head Configuration

The construction and arrangement of nozzles in the print head H1001 used in this embodiment will be described.

Figure 11:
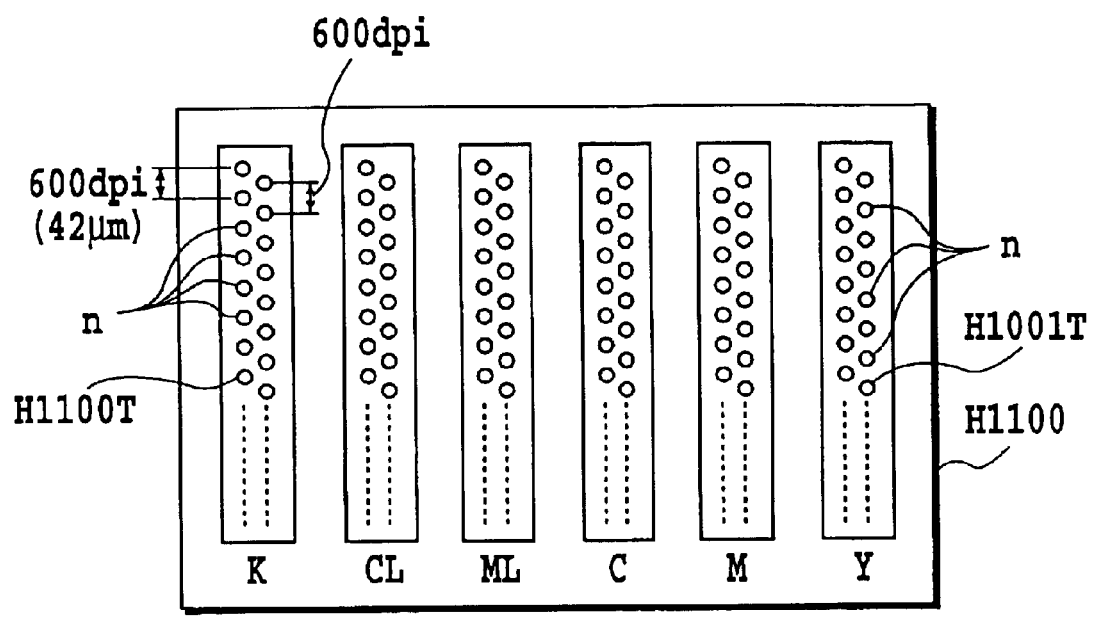
FIG. 11 is a plan view schematically showing a print head in the embodiment of the present invention.

FIG. 11 is a schematic front view of the head used in this embodiment to realize high resolution printing. In this example, two parallel columns each having 128 nozzles are spaced from each other in the main scan direction (carriage scan direction) and staggered or shifted by about 21 $\mu$m from each other in the sub-scan direction (paper feed direction), with the 128 nozzles in each column arranged at a 600-DPI pitch (about 42 $\mu$m pitch). These two nozzle columns are used for each color and therefore a total of 256 nozzles are used to achieve a 1200 DPI resolution for each color. Further, in the example shown, the print head has 12 such nozzle columns integrally arranged side by side in the main scan direction to produce six colors with the 1200 DPI resolution. In the process of manufacture, the columns of two adjoining colors are fabricated simultaneously in one chip and then three such chips are bonded side by side. Hence, the nozzle columns of two adjoining colors in each chip (a set of black (BK) and light cyan (LC), a set of light magenta (LM) and cyan (C) and a set of magenta (M) and yellow(Y)) have more similar driving conditions than other colors. With this construction, simply adjusting the ejection timings of the two adjoining colors can realize the 1200 DPI printing resolution. In the case of 1200 dip, each pixel occupies an area of about 21 μm square on the paper. The ink drop used in this embodiment is 4 pl in volume and forms on the paper a circular dot about 45 μm across.

7. Printing Apparatus and Printing Method

First and second examples of the ink jet printing apparatus and ink jet printing method using the above-described print head will be explained. The ink jet printing apparatus and method in the following examples adopt a multipass printing that completes an image in each print area by executing four main scans (four passes).

Figure 12:
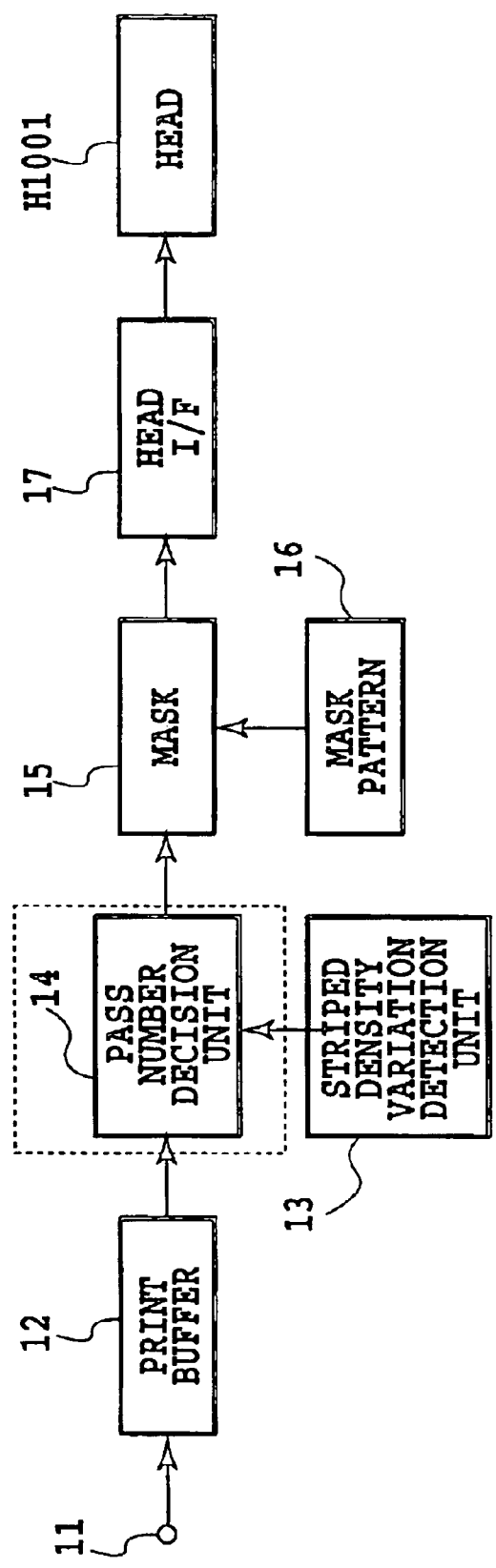
FIG. 12 is a block diagram showing an image processing unit in the embodiment of the present invention.

FIG. 12 is a block diagram schematically showing an image processing unit in this embodiment.

In the figure, reference number 11 represents an input terminal, 12 a print buffer, 13 a density variation (striped density variation) detecting unit, 14 a pass number setting unit, 15 a mask processing unit, 16 a mask pattern table, 17 a head I/F unit, and 18 a print head.

Bit-map data entered from the input terminal 11 is stored at a predetermined address in the print buffer 12 (corresponding to a column buffer E2017 of FIG. 9B) by a print buffer control unit, which includes a printer buffer E2014, a development data buffer E2016, a data development DMA E2015 and a column buffer E2017. The printer buffer 12 has a capacity to store as much bit-map data as one scan and one paper feed and constitutes ring buffers, such as FIFO memories, one for each paper feed. The print buffer control unit controls the print buffer 12 to store the bit-map data for each scan in the print buffer 12, then starts a printer engine, reads the bit-map data from the print buffer 12 according to the positions of the nozzles of the print head, and enters the bit-map data into the pass number setting unit 14. When the bit-map data of the next scan is entered from the input terminal 11, the print buffer control unit controls the print buffer 12 to store the data at a vacant area in the print buffer 12 (a buffer area corresponding to the paper feed for which the printing has been completed).

8. Striped Density Variation Detection and Pass Number Setting

The striped density variation detection unit 13 detects a striped density variation amount of the print head H1001 for each color, e.g., droplet deflection, ejection amount and ejection speed. The striped density variation detection unit 13 may include, for example, a control unit for having the print head print a test image, such as predetermined patches or patterns, a read unit for reading the test image by an optical sensor, a calculation unit for estimating the striped density variation amount of the print head H1001 for each color based on the result of reading, and an EEPROM (memory means) for storing the calculated result. The reading unit may use a scanner M6000 with a construction as shown in FIGS. 6A and 6B. The scanner M6000 may be mounted on the carriage M4001 in place of the print head cartridge H1000 and moved together with the carriage M4001 in the main scan direction to read the test image. It is also possible to install an optical scanner on the paper transport passage in the printing apparatus so as to read the pattern immediately after being printed and to analyze the printed pattern. When the striped density variation amounts for different colors are stored in the striped density variation detection unit 13, they are output to the pass number setting unit 14 along with information stored in the print buffer 12. The pass number setting unit 14 sets the number of passes and outputs it to the mask processing unit 15. The mask pattern table 16 selects a required mask pattern from, for example, prestored 1-, 2- and 4-pass mask pattern tables according to the determined divided pass number and then outputs the selected mask pattern to the mask processing unit 15. The mask processing unit 15 divides the bit-map data stored in the print buffer 12, and the divided bit-map data are rearranged in the order of head driving by the head I/F unit 17 before being transferred to the head 18.

A more detailed example of the pass number setting unit in the image processing unit will be described. The pass number setting unit 14 determines a divided pass number and outputs the number to the mask processing unit 15. The mask pattern table 16 selects according to a determined divided pass number a required mask pattern from prestored mask pattern tables, for example, mask pattern tables for 2-, 4- and 8-pass printing, and outputs the selected mask pattern to the mask processing unit 15. The mask processing unit 15 masks the bit-map data stored in the print buffer 12 with the mask pattern for each pass and outputs the masked data to the head driver. The head driver rearranges the masked bit-map data in the order of use by the print head 18 before transferring them to the print head 18.

Figure 21:
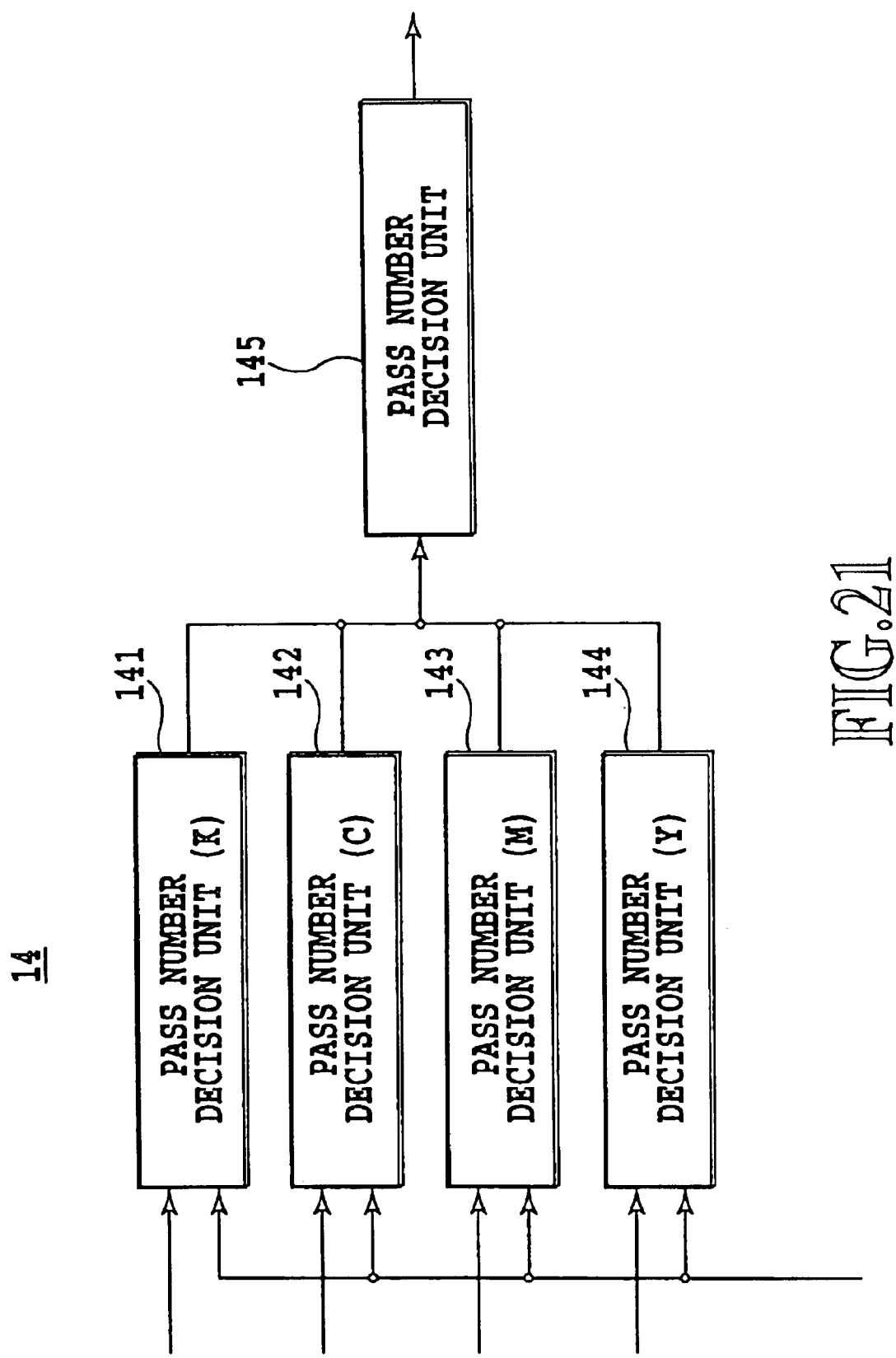
FIG. 21 is a block diagram showing a detailed configuration of a pass number decision unit in the embodiment of the invention.

FIG. 21 is a block diagram showing a detailed configuration of the pass number setting unit 14.

In FIG. 21, denoted 141 is a pass number decision unit that determines the number of passes for the printing of K component print data; 142 a pass number decision unit that determines the number of passes for the printing of C component print data; 143 a pass number decision unit that determines the number of passes for the printing of M component print data; and 144 a pass number decision unit that determines the number of passes for the printing of Y component print data. Designated 145 is a pass number decision unit that detects the largest of the pass numbers determined by the pass number decision unit 141–144 for the printing of each color component.

The striped density variation information for each nozzle detected by the striped density variation detection unit 13 for use in ejecting each color ink, such as a standard deviation, an average and a maximum of ink droplet deflection, an ink ejection amount and an ink ejection speed, is transferred to the pass number decision units 141–144. The bit-map data for each scan and for each color component stored in the print buffer 12 is transferred to the pass number decision units 141–144. Then, the divided pass number is determined for each color component print data.

This decision is made based on various factors contributing to striped density variations detected by the striped density variation detection unit 13. One of these factors is considered, for example, droplet deflection information for each nozzle group that is used for ejecting color inks. Based on this droplet deflection information, a certain threshold value is set. For example, two threshold values, 3 μm and 6 μm, are set for the standard deviation of droplet deflection. The amount of droplet deviation ($\sigma$) is compared with these threshold values. The divided pass number for the bit-map data is preset so that the printing is performed in two passes when $\sigma \leq 3$ μm, in four passes when $3 < \sigma \leq 6$ μm, and in eight passes when $\sigma > 6$ μm.

For each of the remaining factors contributing to the striped density variations, an optimum pass number is determined in a similar manner. These factors are weighted and the pass number decision units 141–144 determine the pass numbers for respective color components and output them to the pass number decision unit 145. The pass number decision unit 145 extracts the largest pass number from the pass numbers for the color components determined by the pass number decision units 141–144 and outputs it to the mask processing unit 15. The mask processing unit 15 selects a mask pattern according to the pass number received and transfers the masked bit-map data to the head driver. When the factors considered are the droplet deflection information, there is not need for weighting.

Next, the process of determining the pass number by applying the above method to an example image recording will be described.

Figure 22:
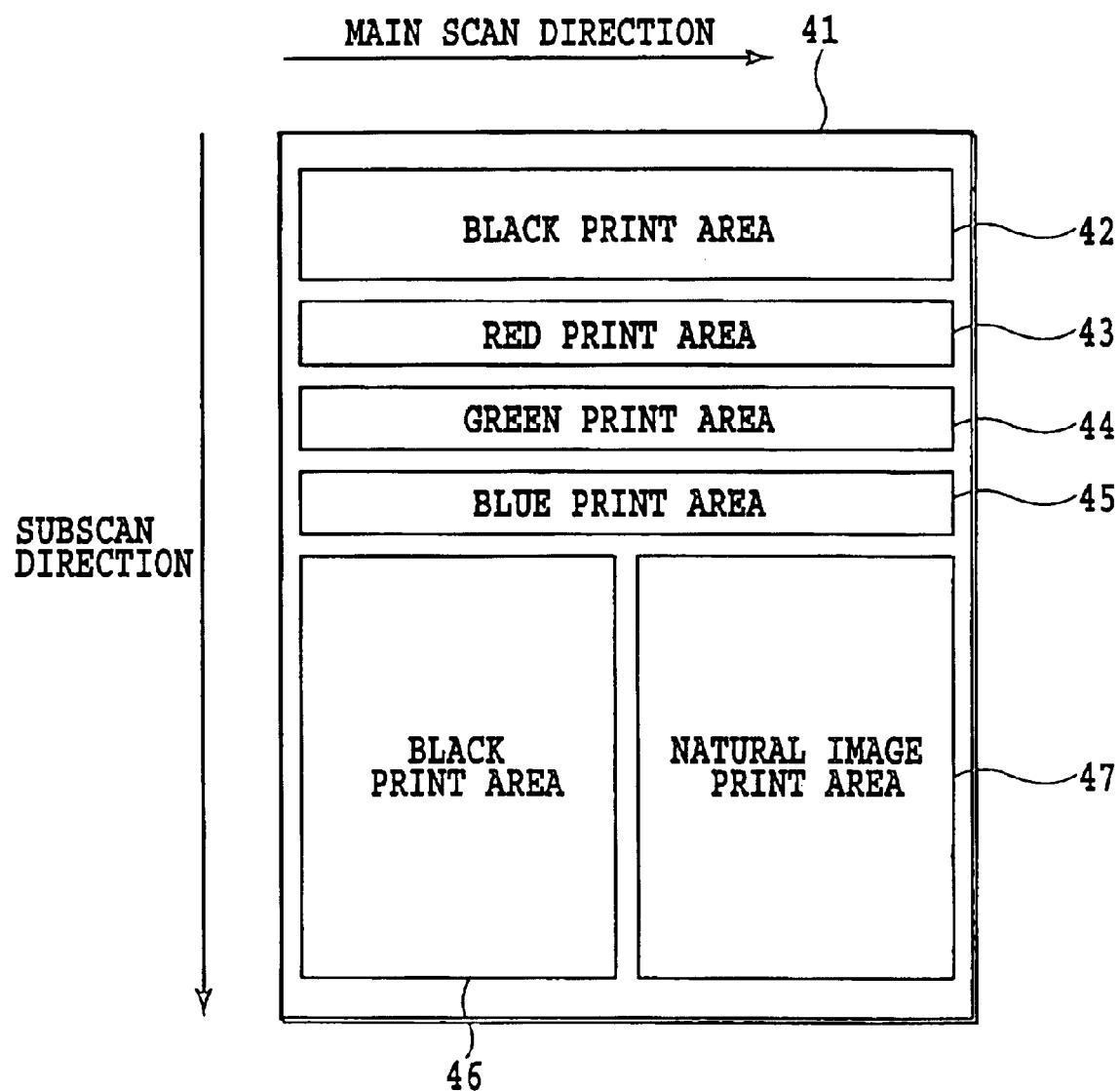
FIG. 22 is a diagram showing an example case where an image made up of a plurality of different color areas is printed on a page of print medium.

FIG. 22 shows an example case of printing an image made up of a plurality of color areas on a page of print medium. In FIG. 22, designated 41 is an effective print area of a print medium (print paper), 42 a black print area, 43 a red print area, 44 a green print area, 45 a blue print area, 46 a black print area, and 47 a natural image print area.

Figure 23:
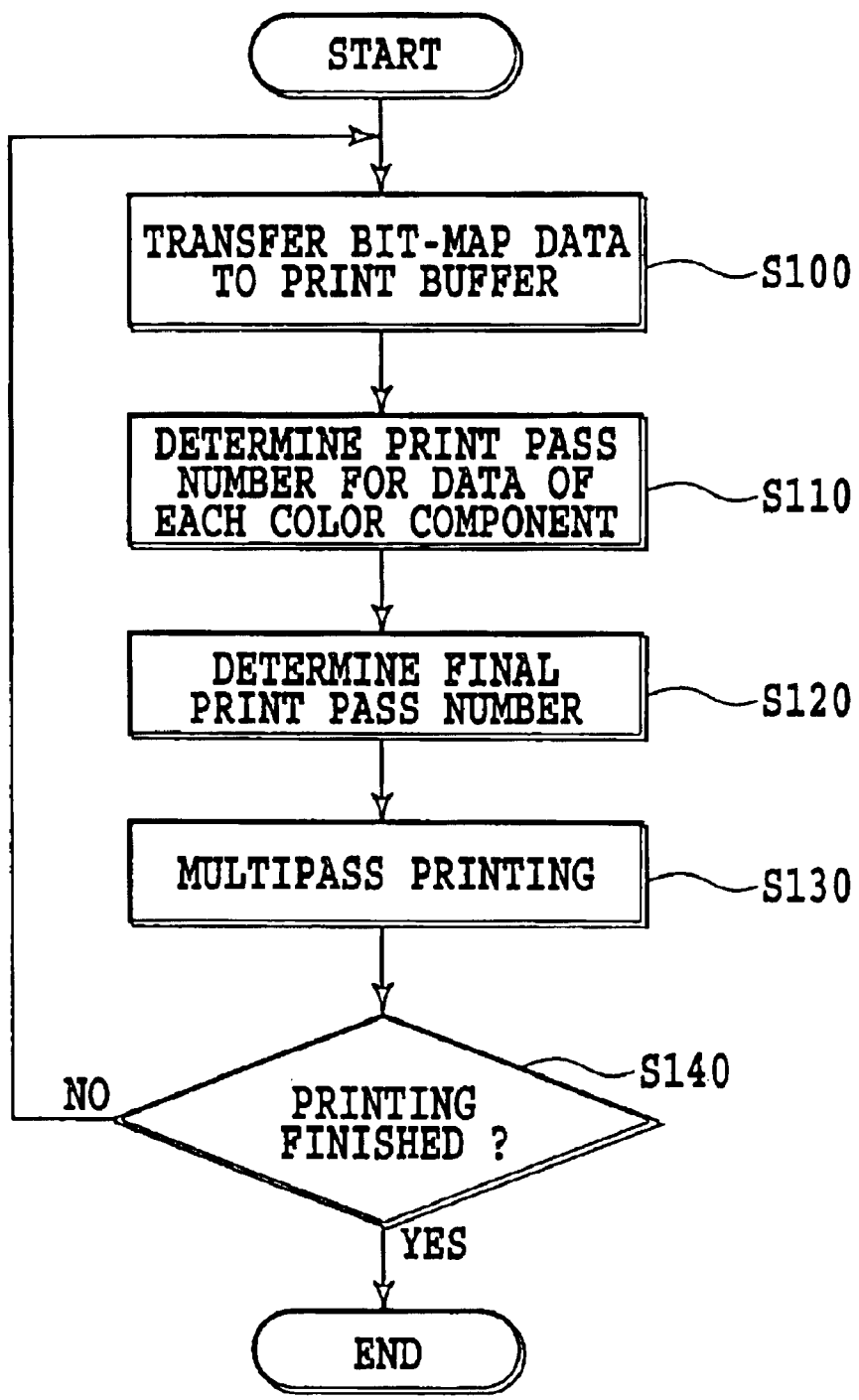
FIG. 23 is a flow chart for deciding the number of passes according to a threshold value determined on the basis of a standard deviation of droplet deflection.

Referring to the flow chart of FIG. 23, we will explain about the process of determining the pass number from the threshold values the two threshold values described above) that were determined based on the standard deviations of droplet deflection, the standard deviations being 1, 2, 3 and 4 $\mu$m for the K, C, M and Y ink nozzles, respectively, of the print head H1001.

First, at step S100, bit-map data for a band printing on the black print area 42 or for one scan of the print head H1001 is transferred to the print buffer 12. The data transferred in this case is K component print data.

Next, at step S110, the pass number decision units 141–144 determine the print pass numbers according to the method described above. Because the printing on the black print area uses only the K component print data, only the pass number decision unit 141 is used and there are no other bit-map data to be used by other pass number decision units 142–144. Because the droplet deflection standard deviation for the K ink nozzle is $\sigma=1$ ($\mu$m), the number of passes used to print the black print area 42 is determined as "2".

Further, at step S120, the pass numbers determined by the pass number decision units 141–144 are transferred to the pass number decision unit 145 which then determines a final pass number.

Then, at step S130, based on the result of decision made by the pass number decision unit 145, a multipass printing is executed. The printing on the black print area 42 reflects only the result of decision made by the pass number decision unit 141 and the 2-pass printing is started.

Finally, at step S140, each time the printing of one scan by the print head H1001 is finished, it is checked whether a series of print operations is completed. When the print operation is to be continued, the processing returns to step S100 and repeats the above sequence of operations. When the sequence of print operations is determined as complete, the processing is ended.

In the case of printing an image shown in FIG. 22, when the printing of the black print area 42 is finished, a red print area 43 starts to be printed.

In the printing of the red print area 43, M component print data and Y component print data are used, so that the step S110 determines the pass numbers for the printing that uses the M component print data and for the printing that uses the Y component print data. Because the droplet deflection standard deviation for the M ink nozzle is $\sigma=3$ ($\mu$m) and the droplet deflection standard deviation for the Y ink nozzle is $\sigma=4$ ($\mu$m) as described above, the pass number for the M ink printing is determined to be "2" and the pass number for the Y ink printing is determined to be "4." It is noted that in this printing there are no bit-map data to be used by the pass number decision units 141, 142 to determine the pass numbers.

Hence, the outputs from the pass number decision units 143, 144 are transferred to the pass number decision unit 145, which then extracts the largest pass number, "4", initiating the 4-pass printing on the red print area 43.

The similar processing is also carried out on the green print area 44 and the blue print area 45.

Next, when an area having the black print area 46 and the natural image print area 47 arranged side by side in the main scan direction is to be printed, because the printing on the black print area 46 uses only the K component print data and the printing on the natural image print area 47 uses the C, M and Y component print data, the bit-map data for the K, C, M and Y components stored in the print buffer 12 are input to the pass number decision units 141–144, which then determines the respective pas numbers to be "2," "2," "4" and "4."

Then these pass numbers are transferred to the pass number decision unit 145 which then extracts the largest value "4," initiating the 4-pass printing.

According to this embodiment, because the pass number is dynamically determined based on the nozzle precision information (droplet deflection information) of the print head H1001 for each color component and on the one-scan print data for each color component, the striped density variations can be reduced while performing high-speed printing.

The optimum pass number may also be determined by similarly setting the threshold values for other factors than the droplet deflection information contributing to the striped density variations and by weighting these factors for overall evaluation.

Figure 24:
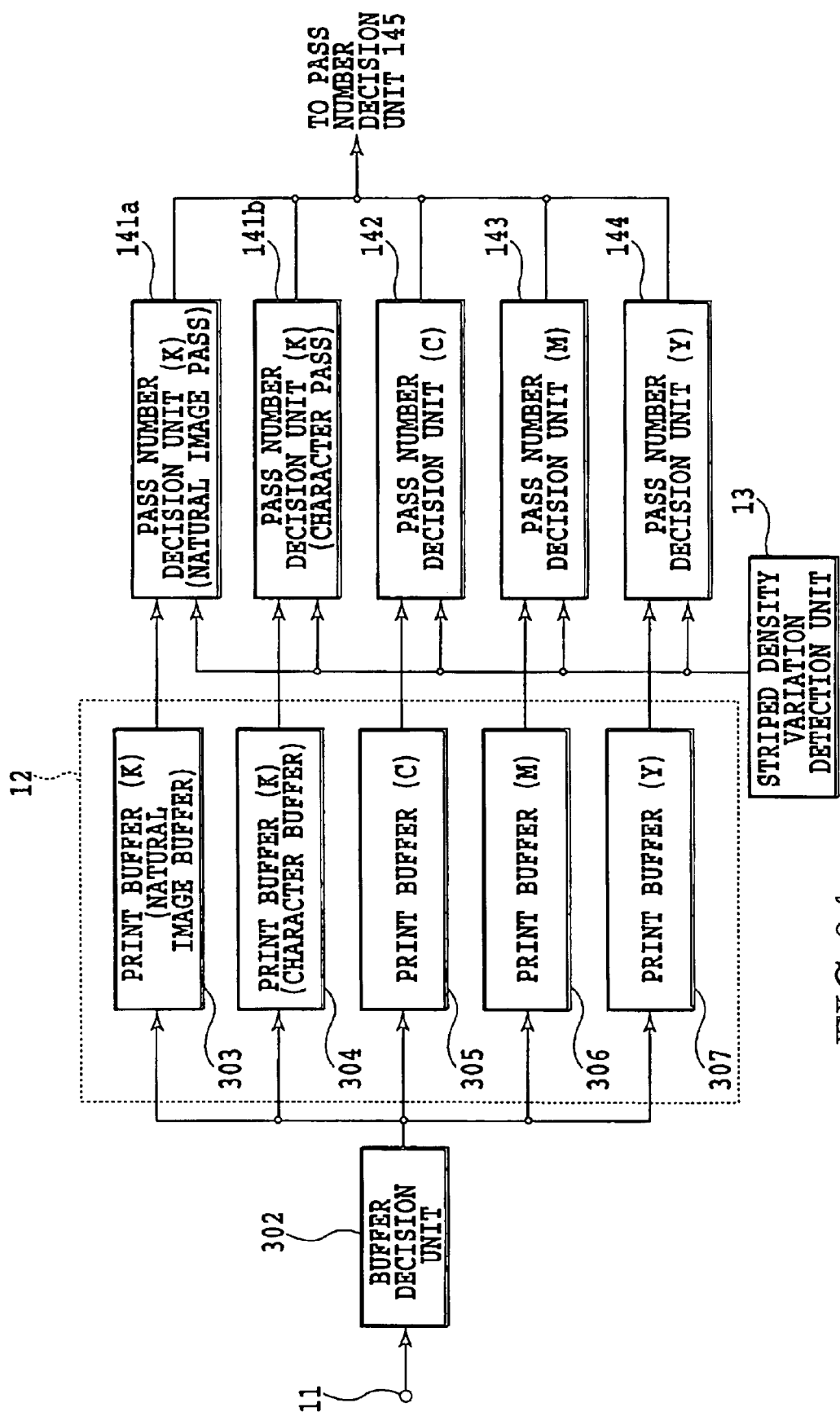
FIG. 24 is a block diagram showing another functional configuration of image processing in the embodiment of the invention.

FIG. 24 is a block diagram showing another functional configuration of the image processing unit.

In FIG. 24, constitutional elements identical with those of FIGS. 21–23 are given like reference numbers and their explanations are omitted. FIG. 24 shows the configuration ranging from the input terminal 11 to the point before the pass number decision unit 145.

As shown in FIG. 24, a buffer decision unit 302 is provided between the print buffer 12 and the input terminal 11. The print buffer 12 has a print buffer 303 for storing K component data of natural images, a print buffer 304 for storing K component data of characters, a print buffer 305 for storing C component data, a print buffer 306 for storing M component data, and a print buffer 307 for storing Y component data.

In this embodiment, the pass number decision unit 141, which has been explained in the embodiment shown in FIGS. 21–23, comprises a pass number decision unit 141a for determining the pass number for the printing that uses the natural image K component data and a pass number decision unit 141b for determining the pass number for the printing that uses the character K component data.

Hence, the buffer decision unit 302, when storing the data received from the input terminal 11 into the print buffer 12, checks whether the data is intended for natural images or for characters. The methods for distinguishing between character data and natural image data include a variety of conventional means, such as one utilizing local characteristics of an image (histogram, frequency measurement, etc.). This invention therefore can employ whatever methods are available as long as the image-character distinction can be made.

Generally, the allowable range of print head variation is wider for the character printing than for the natural image printing. That is, the allowable range for the perception of striped density variations is wide for characters.

Figure 25:
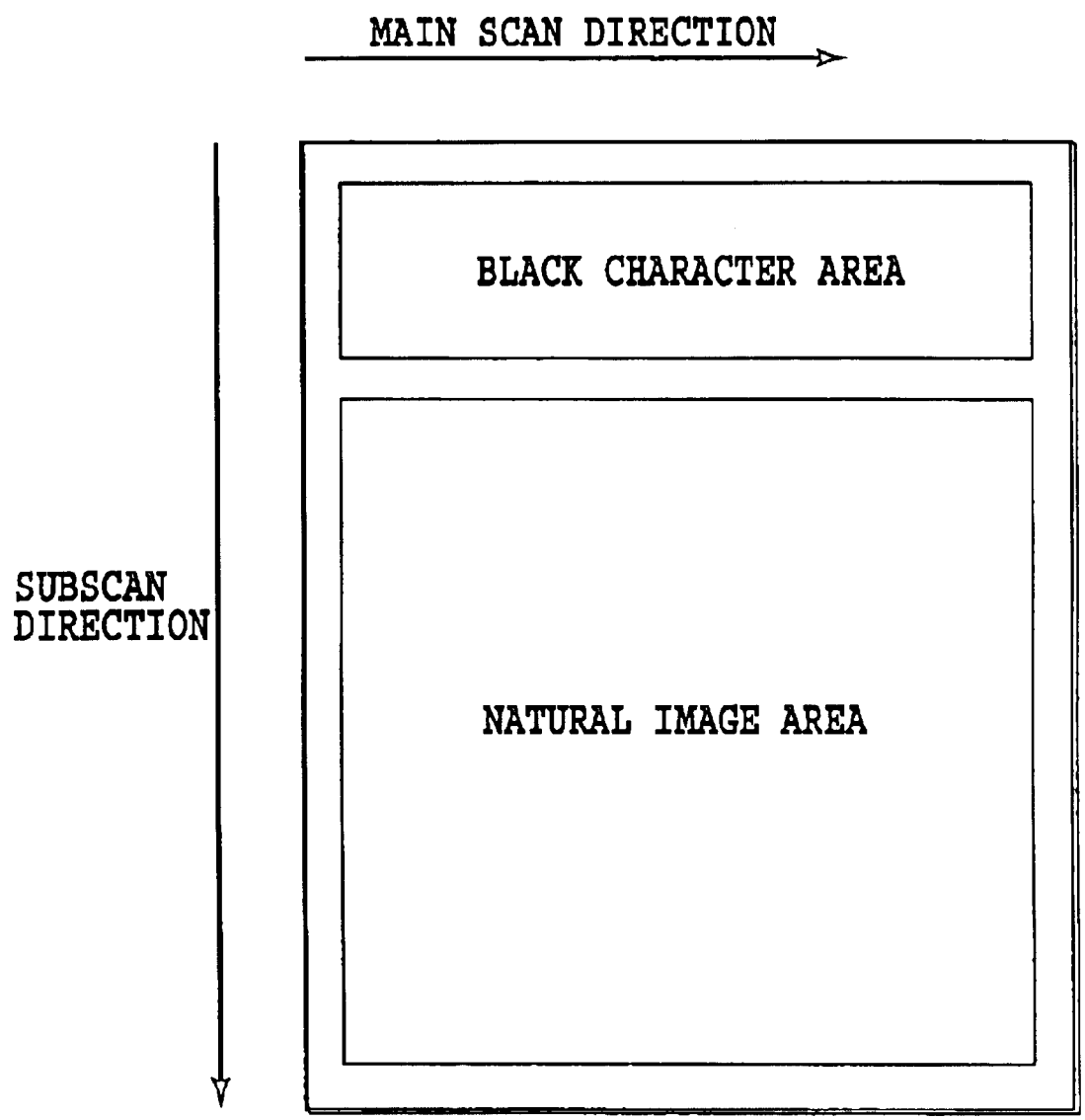
FIG. 25 is a diagram showing an example case where an image printed on a page of print medium has black characters and a natural image.

FIG. 25 shows an example page of a print medium on which black characters and a natural image are mixedly printed. In FIG. 25, reference number 51 represents an effective print area of the print medium, 52 a black character print area, and 53 a natural image print area.

When printing an image as shown in FIG. 25, only the black character area 52 is first printed and therefore all the bit-map data is stored only in the print buffer 304. Hence, when the printing is done using only the K component print data of characters, the pass number decision unit 141*b* moderates the threshold values used for determining the pass number, i.e., lowers the threshold values, that were calculated based on the characteristic information of the print head H1001 obtained by the striped density variation detection unit 13, to ensure that a smaller pass number is chosen.

As explained in the embodiment shown in FIGS. 21–23, when the standard deviation of droplet deflection for the K ink printing is 1 μm, if the threshold value set in the embodiment of FIGS. 21–23 is used, a 2-pass printing is performed regardless of whether the data is used for forming characters or a natural image.

In this embodiment, however, when the buffer decision unit 302 decides that the K component data is used to form a natural image, the bit-map data is transferred to the print buffer 303 and then to the pass number decision unit 141*a*, which in turn determines the number of passes in which the bit-map data is printed. When the K component data is found to be used to form characters, the bit-map data is transferred to the print buffer 304 and then to the pass number decision unit 141*b*, which then determines the number of passes in which the bit-map data is printed.

The pass number decision unit 141*a* determines the pass number in a way similar to that of the embodiment shown in FIGS. 21–23. Because the character forming quality has a large tolerance for the striped density variations, the pass number decision unit 141*b* determines the pass number so that the printing is performed in one pass when the standard deviation (σ) is σ≦3 μm, in two passes when 3<σ≦6 μm, and in four passes when σ>6 μm.

As a result, according to this embodiment, if the standard deviation of droplet deflection is small, it is likely that the black character area 52 may be printed in one pass, increasing the printing speed.

In other print areas, the pass numbers are determined in a manner similar to that of the embodiment shown in FIGS. 21–23, and their explanations are omitted.

In the configuration shown in FIG. 24, the character-natural image distinction is made only for the K component print data. The similar distinction may also be made for color characters by providing a character print buffer and a pass number decision unit for other color component data. This helps realize a faster printing speed.

Figure 26:
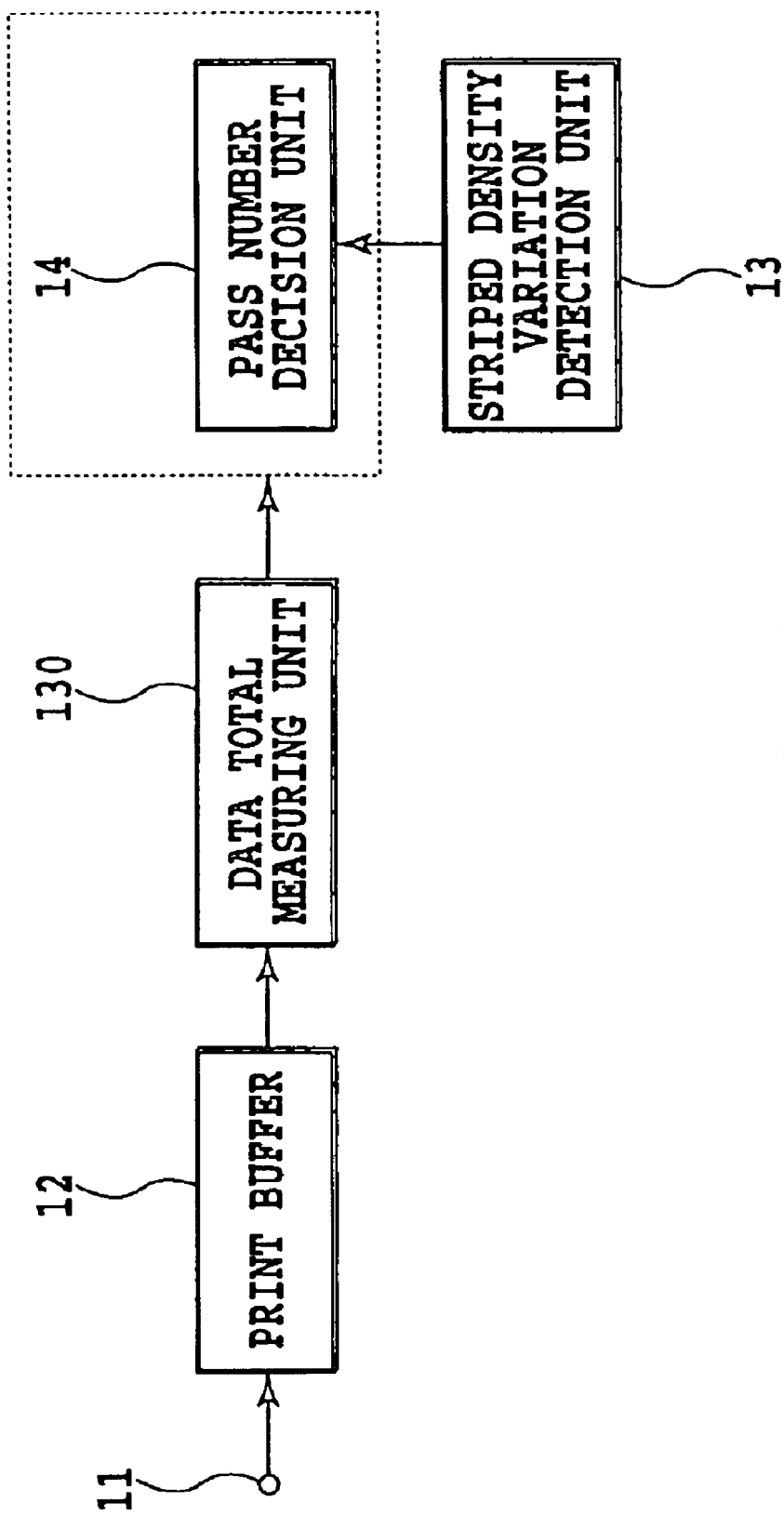
FIG. 26 is a block diagram showing still another functional configuration of image processing in the embodiment of the invention.

FIG. 26 shows still another example of functional configuration of the image processing unit.

In FIG. 26, constitutional elements identical with those of the embodiment shown in FIGS. 21–24 are assigned like reference numerals and their explanations are omitted. FIG. 26 shows the configuration ranging from the input terminal 11 to the pass number decision unit 14.

In FIG. 26, denoted 130 is a data total amount measuring unit.

This embodiment focuses on a change over time of various factors contributing to striped density variations. The characteristics of the print head, including ink ejection amount and ink ejection speed, are known to change with elapse of printing time.

In this embodiment, the data total amount measuring unit 130 counts the total amount of data in each page of the print medium. When a data amount corresponding to a predetermined number of pages is exceeded, this circuit is activated to mitigate the threshold value in the pass number decision unit 14.

For example, suppose the pass number decision unit 14 is going to use "2" as the pass number. When the image being printed according to the print data has exceeded three pages for example, this circuit is activated to perform control so as to increase the pass number, which is determined by comparing, for example, the standard deviation of droplet deflection obtained by the striped density variation detection unit 13 with the threshold value.

In this embodiment the striped density variations are larger than normal (for example, during 2-pass printing) and thus the pass number determined is increased. Because the data total amount measuring unit is provided and the result of measurement is reflected on the determination of the pass number, it is possible to alleviate the influences of variation over time of the print head characteristics, such as ink delivery amount and ink ejection speed, thus enhancing the image printing quality.

9. Setting of Printing Duty

The printing duty for each pass is set by the image processing unit as follows.

When an image is printed in four passes, the printing duty for each pass has conventionally been set at 100/(pass number)=25%. This is a typical example of setting the printing duty for the multipass printing system and is intended to alleviate the image degradation due to density variations such as stripes by increasing the number of passes.

In such a conventional multipass printing system, density variations (hereinafter referred to as banding) are produced due to influences of the ejection precision variations of the print head and the order of ink ejection. Further, because of the influences of the end nozzle droplet deflection described earlier, white stripes appear conspicuously at paper feed pitches and are visually perceived as image degradations. When an image is formed by a bidirectional printing in particular, a change in the order of ink ejection may cause a change in hue, which in turn shows as banding, mixing the image degradation even more conspicuous.

In this embodiment, therefore, unique mask processing is performed to make bandings less visually perceptible. That is, in this embodiment, the same scan area E (pass area) is divided into two areas e1, e2, and the printing duties of the divided areas e1, e2 are differentiated (split duties are set) to make the bandings visually less perceptible.

Figure 15:
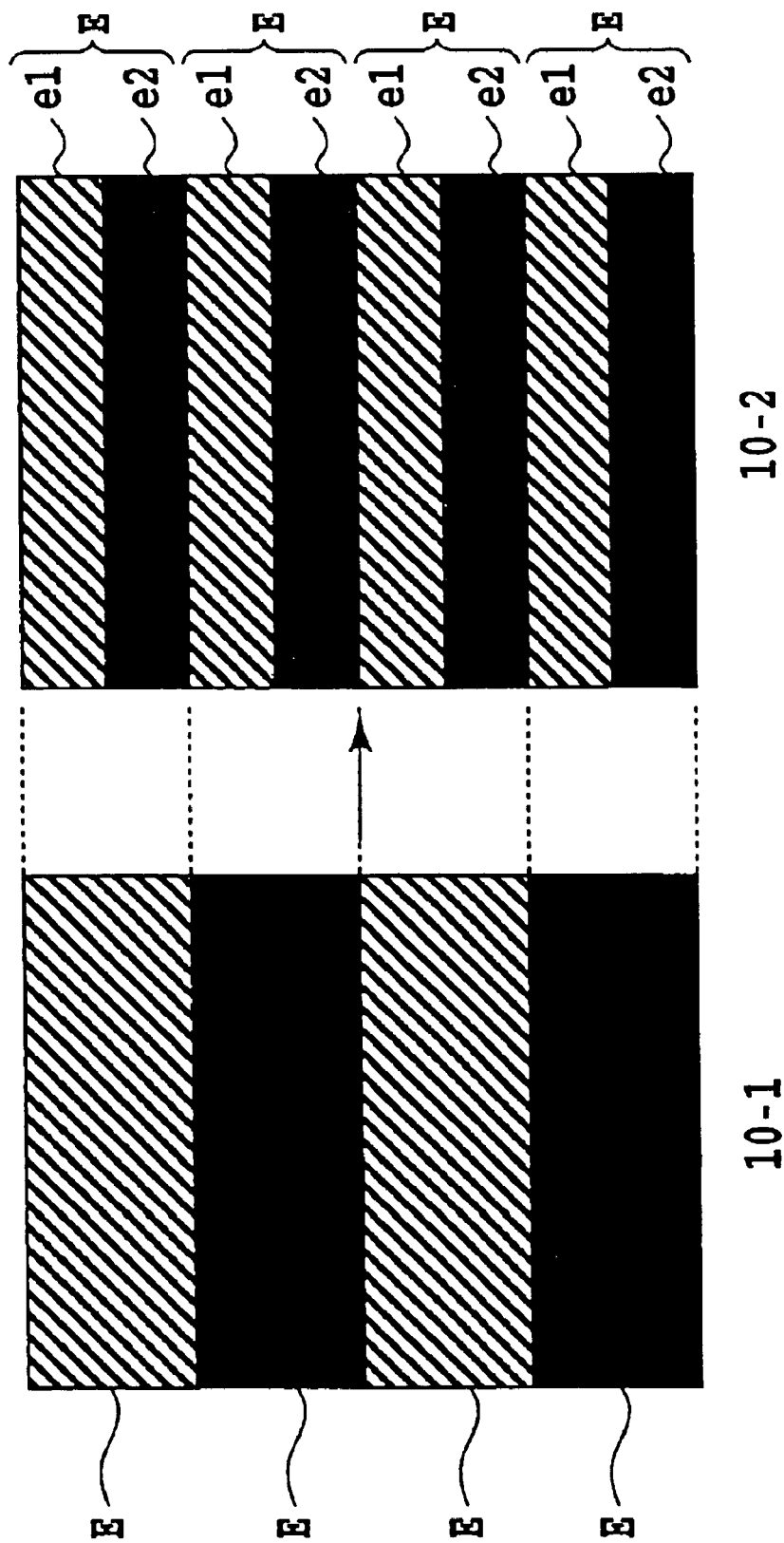
FIG. 15A is a schematic diagram of an image formed by the four-pass printing, with the print area of each pass printed at a uniform duty.
FIG. 15B is a schematic diagram of an image formed by the four-pass printing, with the print area of each pass divided in two and with the subdivided print areas in each pass set at different duties.
Figure 16:
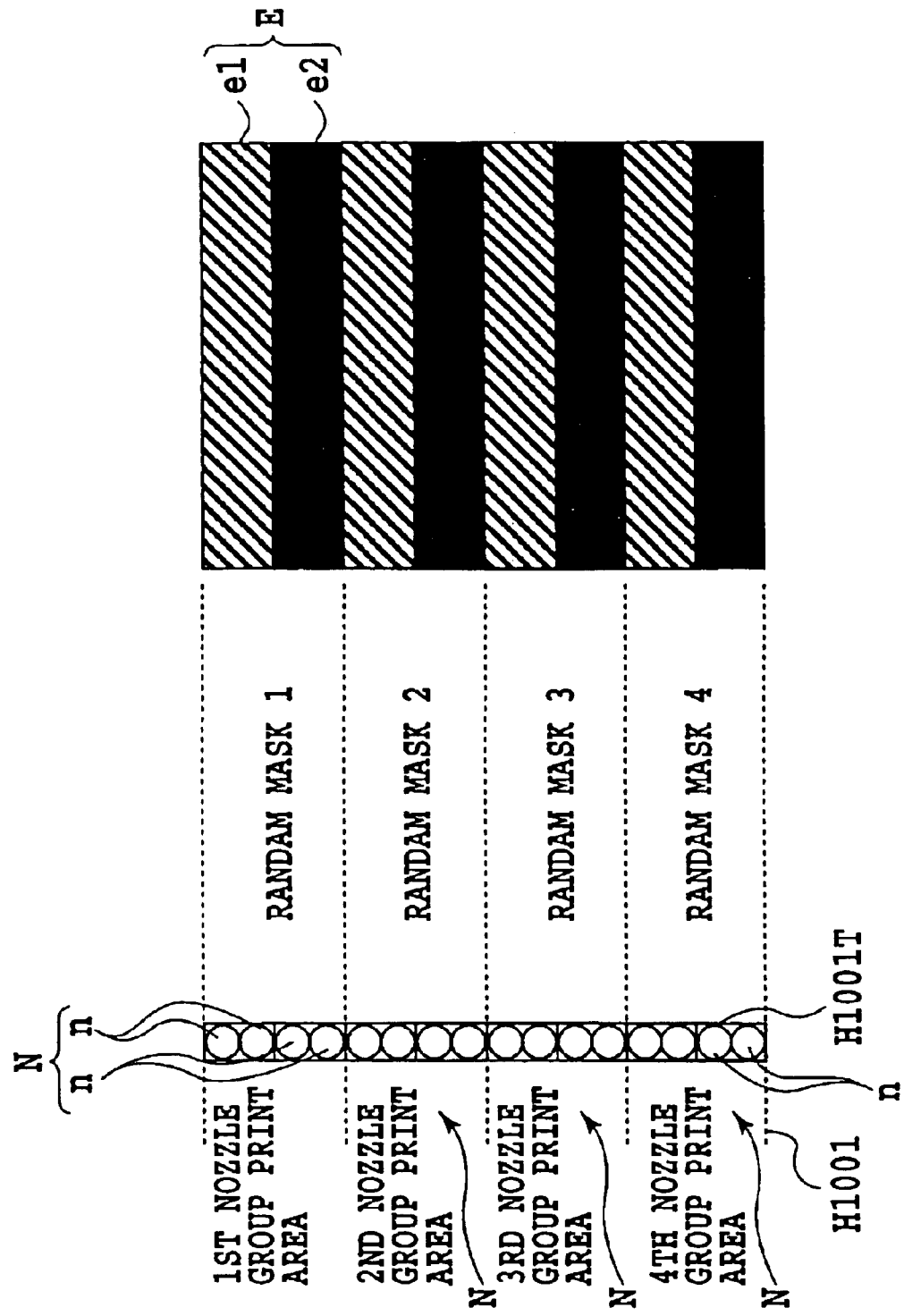
FIG. 16 is a schematic diagram of an image formed by the four-pass printing, with the print area of each pass divided in two and with the subdivided print areas in each pass set at different duties.

FIGS. 13A, 13B, 14A and 14B show example settings of the printing duties for the divided areas e1, e2. FIG. 15A shows an image formed by an ordinary multipass printing with the divided areas e1, e2 set with equal duties. FIG. 15B shows an image formed by using the split duties. In FIG. 16, reference number 1001T represents a plurality of nozzle groups which perform printing on their respective pass areas E, with each nozzle group consisting of n (in the figure, four) nozzles.

Figure 14:
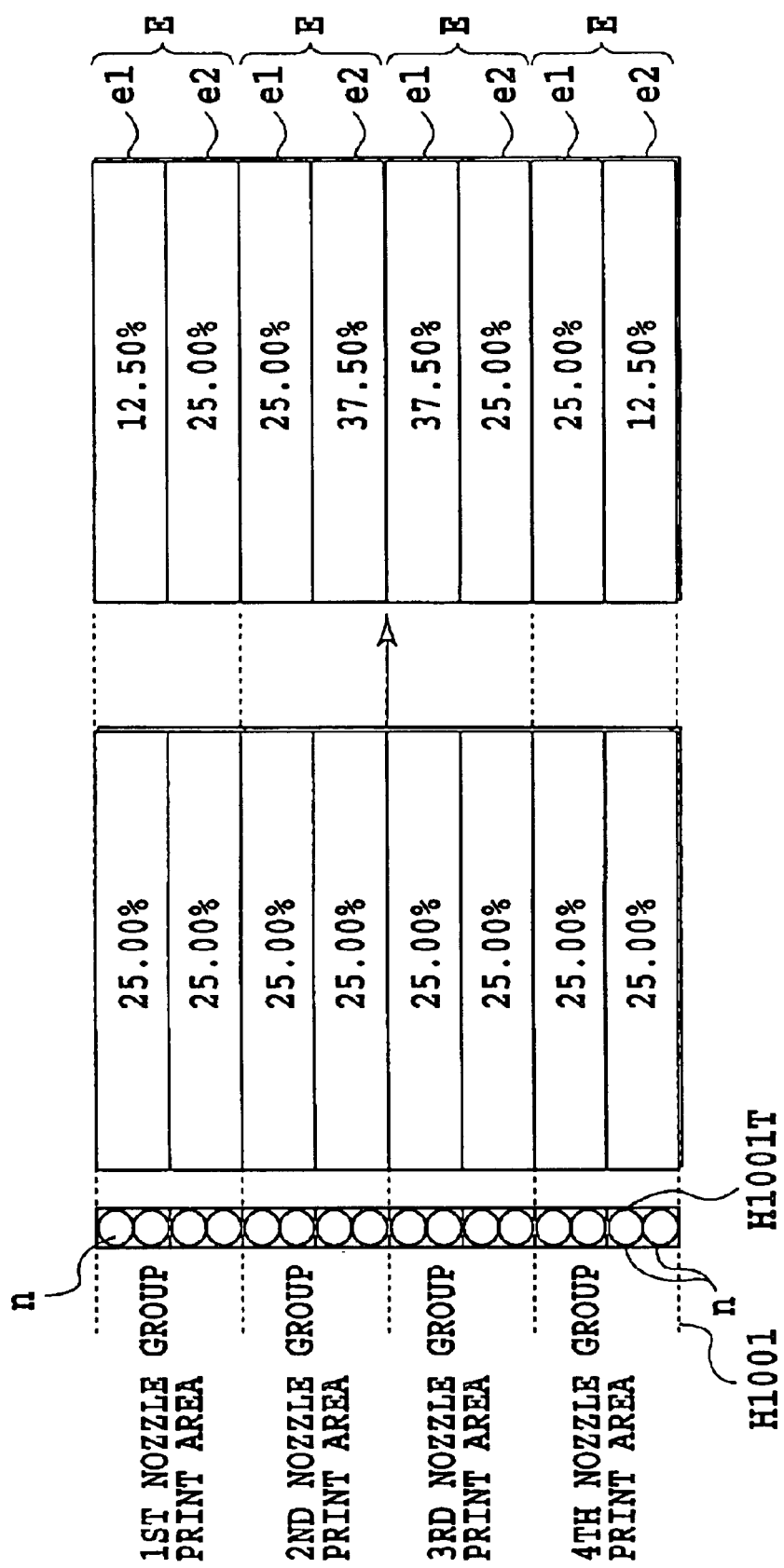
FIG. 14A is a diagram showing print duties of each pass in the four-pass printing, with the subdivided print areas in each pass set at a uniform duty.
FIG. 14B is a diagram showing print duties of each pass in the four-pass printing, with the subdivided print areas in each pass set at different duties.

In the case of an image formed by equal duties shown in FIG. 14A, when a uniform solid pattern is printed for example, a banding occurs at the paper feed pitch. The bandings occurring at around the paper feed pitches are easily perceived because of the visual characteristics and the image quality appears degraded. However, with this embodiment, the bandings occur at half the paper feed pitches. This reduced pitch falls within an allowable pitch range in which the bandings are not visually perceived. Hence, the image does not appear degraded in quality.

The experiments conducted by the inventor of this invention have found that at a 338-μm pitch the density variations (bandings) due to changes in the ejection order cannot easily be perceived visually. It has also been found that a further reduction in the pitch does not produce a corresponding effect. As to the number of divisions, in the 4-pass printing for example, it has been found that dividing each of the pass areas into four has a significant effect of reducing an image degradation.

As described above, where a certain area is printed in multiple passes, it is preferred that in the bidirectional printing system the printing duty setting area be divided into a greater number of split areas as the number of passes decreases. The printing duty may be set by selecting optimum numbers of passes and divisions according to various media characteristics (ink absorbing performance, ink spreading performances, etc.). This can be achieved by storing data in mask tables in advance and reading them as required according to the condition.

10. Other Embodiments

Next, a second embodiment of the ink jet printing apparatus and method according to this invention will be described.

According to the second embodiment, in the same pass area E which is printed in a plurality of the main scans, the divided areas e1, e2 corresponding to the ends of the print head have their printing duties set smaller than those of the divided areas on the inner side of the ends of the print head.

Figures 17A, 17B:
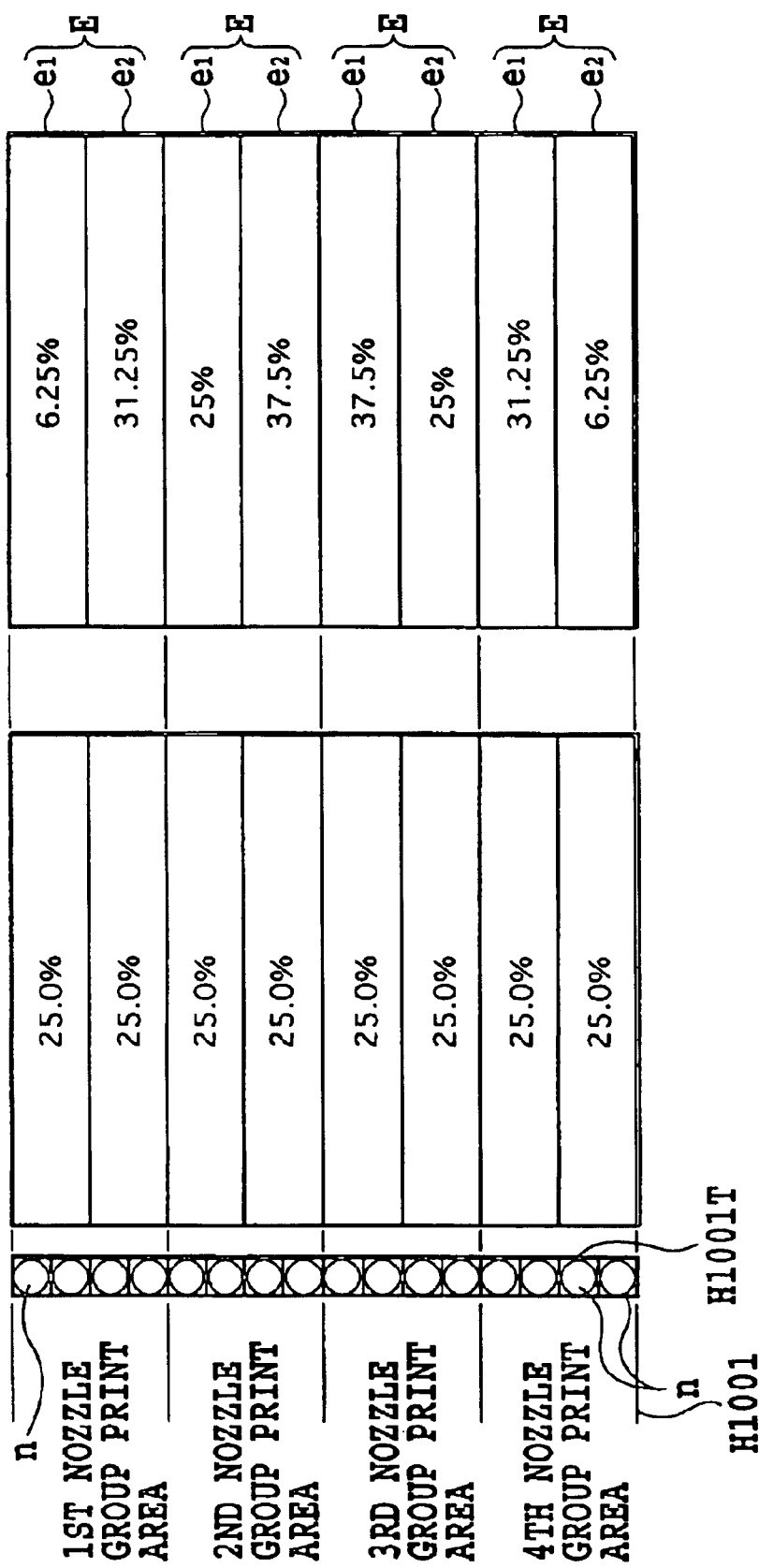
FIG. 17A is a diagram showing print duties of each pass in the four-pass printing, with the subdivided print areas of each pass set at a uniform duty, as in the conventional technique.
FIG. 17B is a diagram showing print duties of each pass in the four-pass printing, with the subdivided print areas in each pass set at different duties.

To describe in more detail, in the conventional ordinary 4-pass printing (division number is 1) each nozzle column is divided into four nozzle groups corresponding to the four pass areas E and the printing duty of each pass area E is set at 25%, as shown in FIG. 17A. In this embodiment, as shown in FIG. 17B, each pass area E is divided into two split areas e1, e2 and the printing duties of the split areas e1, e2 corresponding to the nozzles n at the ends of the print head H1001 are set at lower values (6.25%) than those of other split areas e1, e2. The printing duties in each pass area range from 25% to 37.5%. With the printing duties of the divided areas e1, e2 set in this way, the frequency of use of the nozzles n situated at the ends of the print head is reduced, thus reliably suppressing the number of occurrences of the end nozzle droplet deflection, which in turn reduces the white stripes. The white stripe suppressing effect is obvious when comparing an image formed by the second embodiment (see FIG. 19) and an image formed by the conventional 4-pass printing (FIG. 18).

Figure 18:
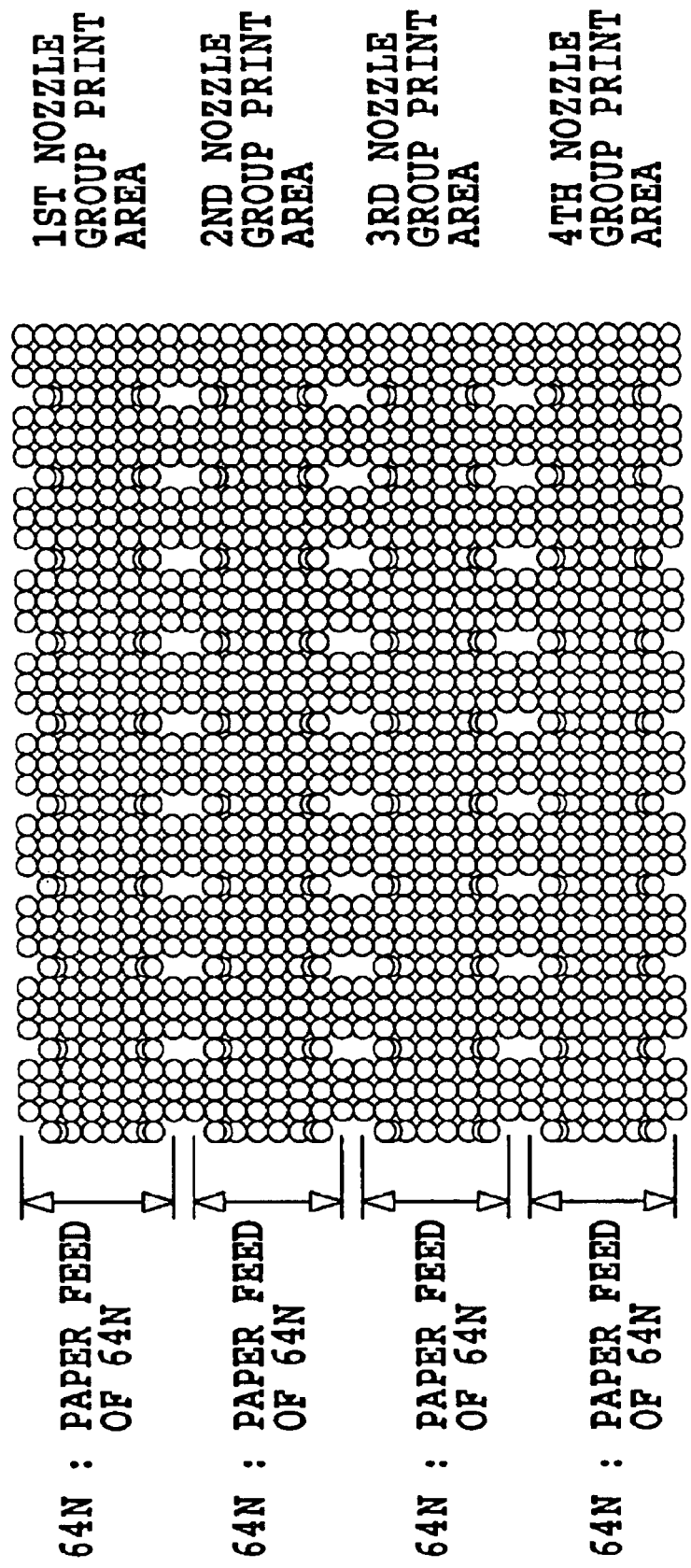
FIG. 18 is a schematic diagram of an image formed by the four-pass printing with the entire print area printed at a print duty of 25%.

FIG. 18 shows an image formed by setting the printing duties of the pass area E at uniform values (25%). In this image, the end nozzle dot deflection occurs once every four dots (25%) as shown. This end nozzle dot deflection, when the number of passes is reduced, becomes even more conspicuous and is clearly perceived as a white stripe.

On the other hand, the second embodiment in the case of 4-pass printing sets the printing duties of the divided areas e1, e2 corresponding to the ends of the print head to 6.25% (¼ the conventional uniform duty) and, in other divided areas, makes duty setting in such a manner that the printing duty increases as the divided area approaches the center of the print head H1001, as shown in FIG. 17B.

With the printing duties at the ends of the print head set at lower values, the end nozzle dot deflection in the image can only occur at a very low frequency of one in 16 dots. As a result, the end nozzle dot deflections are not perceived as a white stripe. Hence, not only can the banding in the image be eliminated as in the first embodiment but the white stripes due to the end nozzle dot deflections can also be eliminated, thus forming an image of higher quality.

Figure 20A:
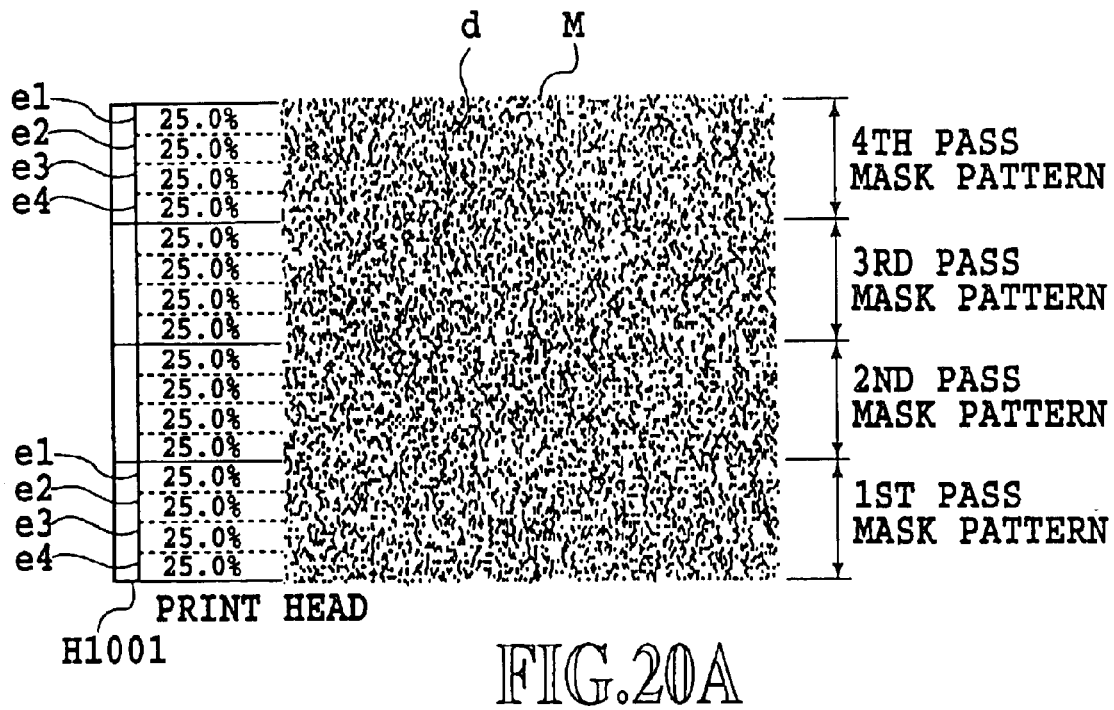
FIG. 20A is a schematic diagram of a random mask pattern used in an ordinary four-pass printing.
Figure 20B:
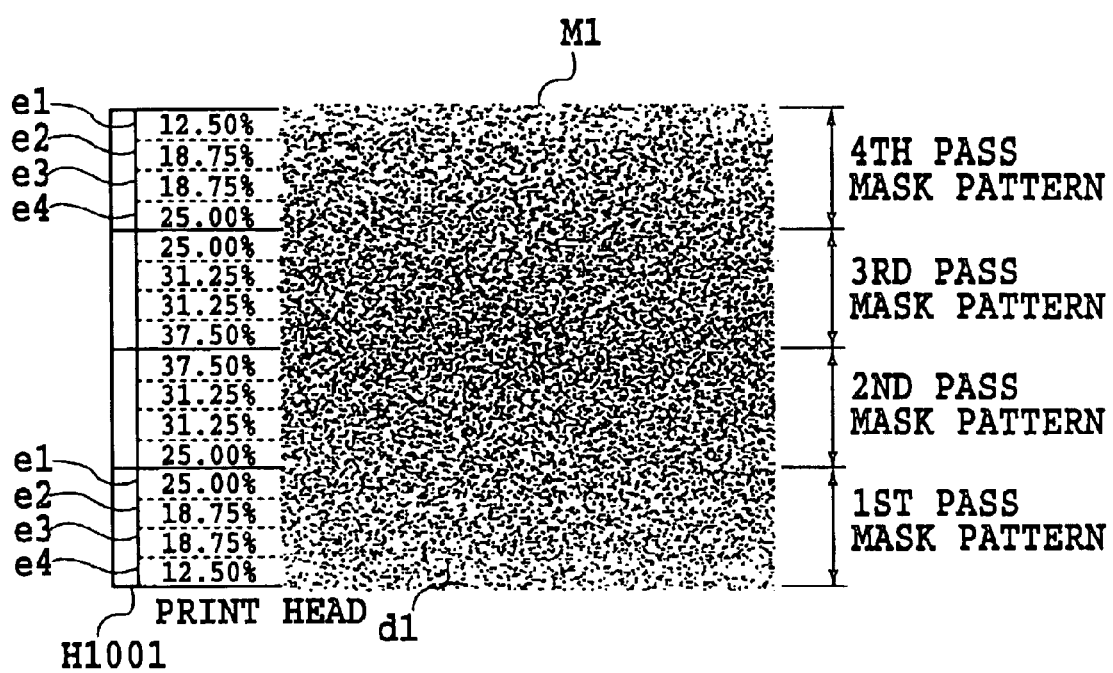
FIG. 20B is a random mask pattern used in the four-pass printing in the embodiment of the invention.

While the second embodiment has been explained by taking up an example case where the pass area E is divided in two, the pass area may be divided into three or more. For example, a single pass area E may be divided into four areas e1, e2, e3, e4 as shown in FIGS. 20A and 20B. In this case, the printing duties of the divided areas e1, e4 at the ends of the print head are set at relatively low values of 12.5%, with the printing duties of other divided areas set to increase progressively as they approach the center of the print head.

In FIG. 20B, M1 schematically represents a random mask pattern for setting the printing duties. Reference symbol M in FIG. 20A schematically represents a random mask pattern when the 4-pass printing is done with uniform duties. As can be seen from the figures, the mask pattern M has concentrated dots d evenly scattered, whereas the mask pattern M1 has concentrated dots d1 more sparsely scattered toward the ends of the pattern.

Next, a third embodiment of the ink jet printing apparatus and method according to the invention will be described.

In the first and second embodiments, when the cycle of random number is short, there is a problem that a repetitive pattern appears on the output image and that when a uniform random number is used, a granularity may deteriorate due to a low frequency component of the random number. To cope with this problem, the present invention according to the third embodiment is characterized by a moving means for moving the print head having a plurality of print elements relative to the print medium. Further, in a printing apparatus in which the print head is divided into a plurality of nozzle groups and one and the same area on the print medium is scanned a plurality of times by the same divided nozzle group or different groups of the print head to form a thinned out image in each scan according to a thinning out pattern to complete an image in that area of the print medium, the invention is also characterized by a pseudo-periodical mask arrangement that provides a visually preferred arrangement of unprinted pixels and printed pixels when the pixels are digitized according to an arbitrary level; by a mask generation means for generating a plurality of mask patterns from the mask arrangement; and by a thinning out means for thinning out print data by using the mask patterns as the thinning out patterns for the nozzle groups.

Figure 27:
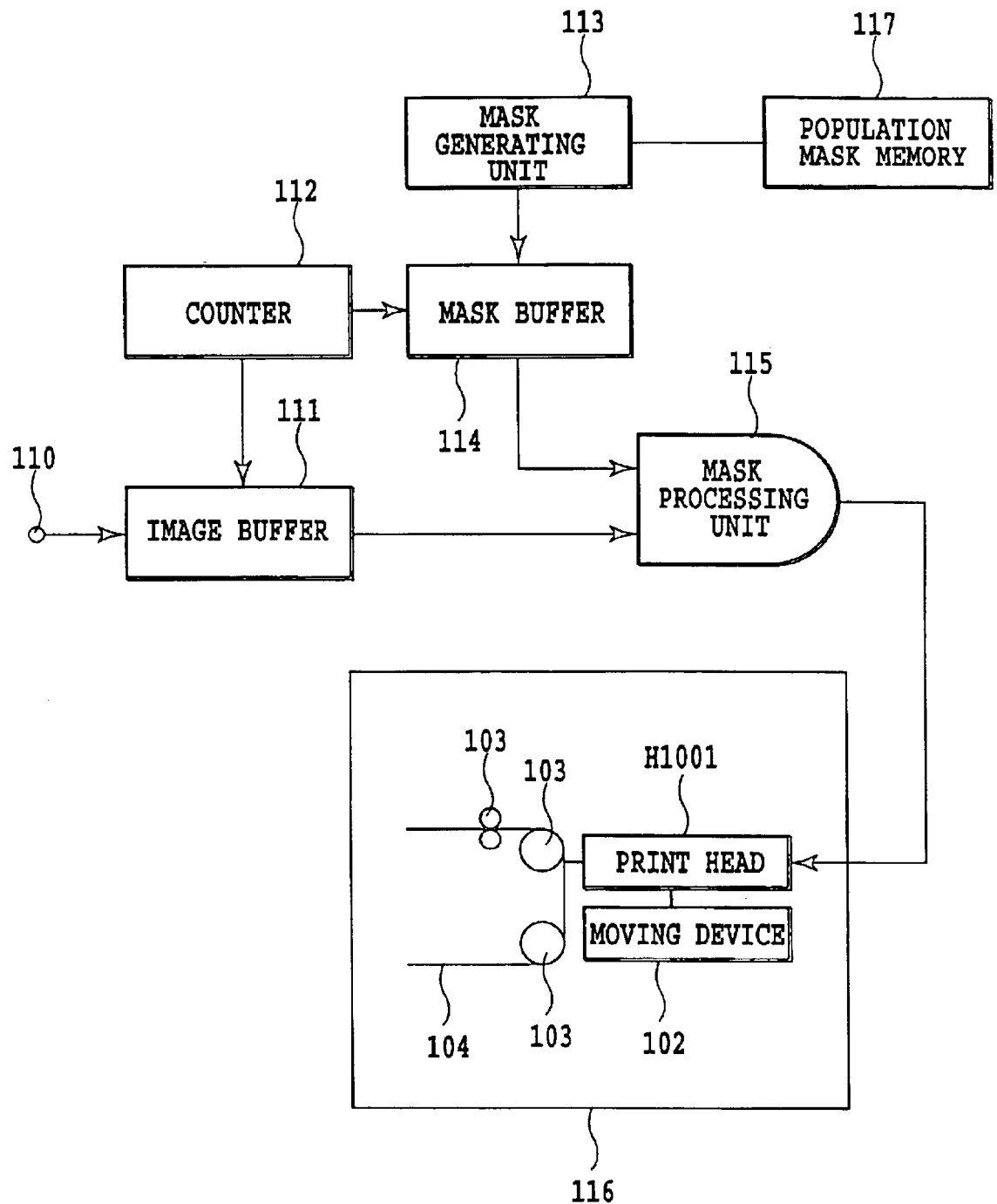
FIG. 27 is a block diagram showing a configuration of a third embodiment of a printing apparatus.

In the above construction, the pseudo-periodical mask arrangement (also referred to as a pseudo-random mask arrangement) has a smaller low-frequency component than the uniform random number, so that it acts to prevent the occurrence of the repetitive pattern and the degradation of granularity. FIG. 27 is a block diagram showing the configuration of the third embodiment of the printing apparatus. Denoted 110 is an input terminal for image data, 111 an image buffer for storing image data to be printed in one scan, 112 an address counter for synchronizing the image data with the mask data, 113 a mask generation unit for generating the mask data, 114 a mask buffer for storing the mask data, 115 a mask processing unit for generating a head drive signal from the image data and the mask data, 116 a printer for forming an image according to the head drive signal, and 117 population mask memory (ROM) for storing population mask data generated in advance by other device.

The printer 116 forms an image on the print medium by moving the print head 101 vertically and horizontally relative to the print medium 104. The print head 101 has a plurality of print elements, each ejecting an ink droplet according to the ink jet system, onto the print medium to form an image. Designated 102 is a head moving unit for moving the print head, and 103 a medium transport unit for advancing the print medium. In such a printer, it is unavoidable that striped density variations occur on the printed image due to variations in the placement and characteristic of the print elements of the print head H1001 or due to mechanical precisions of the head moving unit and the medium transport unit.

Figure 28:
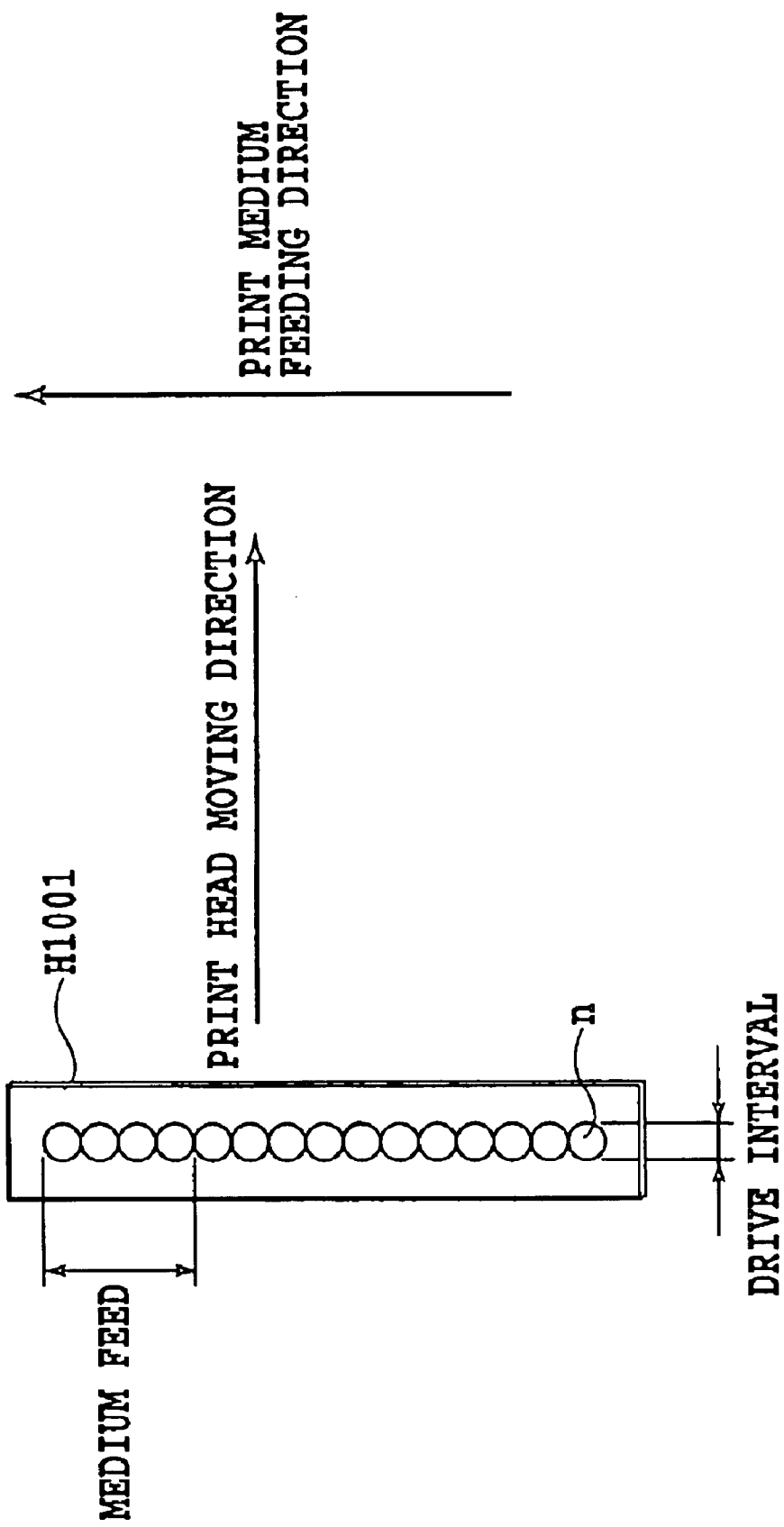
FIG. 28 is a schematic diagram showing a configuration of a print head.

FIG. 28 is a diagram showing an example construction of the print head H1001. Although, in FIG. 28, for simplicity of explanation, the print head shown has print elements (nozzles) arranged in one column in the paper feeding direction, the number and arrangement of print elements are arbitrary. For example, the print elements may be arranged in a plurality of columns or in zigzag. In FIG. 28, n represents print elements which number 16 and are arranged at predetermined intervals in a longitudinal direction.

The print head H1001 moves from left to right relative to the print medium 104 while at the same time driving the print elements at predetermined drive intervals to form an image on the print medium. After one scan is finished, the print head is returned to the left end of the print medium and at the same time the print medium is fed a predetermined distance. This process is repeated to perform the printing of an image.

By setting the distance that the print medium is fed after each scan, the multipass printing is performed. In this embodiment, an example printing operation in which the print medium feed is set to ¼ the number of the print elements will be explained.

FIGS. 29A to 29D show a process of generating a print head control signal from the image buffer 111 and the mask buffer 114 by the mask processing unit 115. The image buffer 111 is a memory capable of storing in the horizontal direction the same number of pixels as the horizontally printable pixels and in the vertical direction the same number of pixels as the print elements of the print head. Although FIGS. 29A to 29D show the image buffer 111 to have 16 horizontally arranged pixels for the sake of simplicity, the actual number of horizontally arranged pixels in the image buffer is equal to the number of pixels that can be printed horizontally on the print medium. For example, if the horizontal width of the printable area on the print medium is 8 inches and the printer has a resolution of 600 dpi, the number of horizontally printable pixels is 4800 pixels and thus the horizontally arranged pixel number in the image buffer is also 4800 pixels. In FIGS. 29A to 29D, squares each correspond to pixels, with blank squares 30 representing pixels not to be printed and black squares 31 representing pixels to be printed. The mask buffer 14 is 16 pixels horizontally wide and 16 pixels, equal to print elements, vertically long.

Figure 29A:
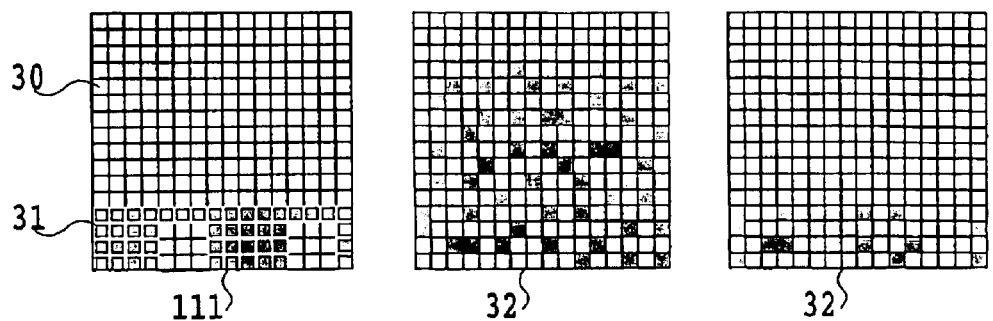
FIG. 29A is a schematic diagram showing a process of generating a print head control signal from an image buffer and a mask buffer by a mask processing unit when the mask processing unit performs mask processing to generate the print head control signal for a first scan.

FIG. 29A shows mask processing to generate a print head control signal for a first scan. In the first scan, image data corresponding to an image area four pixels high from the top of the input image is stored in the image buffer 111 at a lower four-pixel area. Next, a first mask pattern 32 generated by the mask generation unit 113 according to the process described later and the image buffer 111 are ANDed for each pixel to generate a head drive signal. That is, only those print elements are driven that correspond to the pixels for which the image buffer 111 and the mask pattern 32 both dictate printing.

Figure 29B:
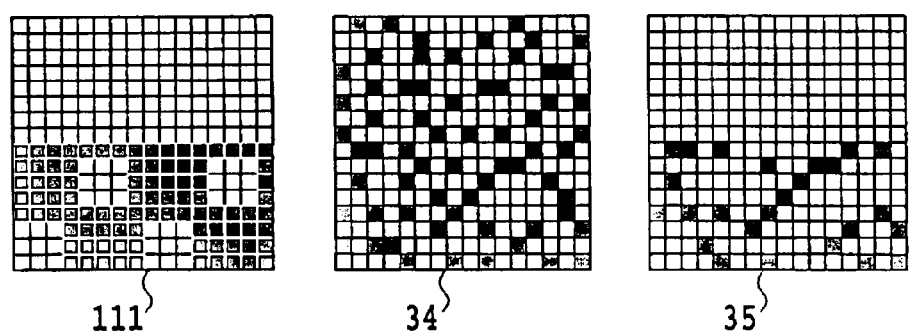
FIG. 29B is a schematic diagram showing a process of generating a print head control signal from the image buffer and the mask buffer by the mask processing unit when the mask processing unit performs mask processing to generate the print head control signal for a second scan.

FIG. 29B shows mask processing to generate a print head control signal for a second scan. After the first scan, paper is fed by the medium transport unit 103 by ¼ the number of the printer elements, which is equal to a distance of four pixels. As a result, the content of the image buffer is also moved up by four pixels and additional 4-pixel data is retrieved from the image data input terminal and stored in the image buffer. Although FIG. 29B shows the image data to be moved for the sake of explanation, if the image buffer is formed as a ring buffer, the movement of the image data within the buffer can be realized by simply changing the address counter. Next, a second mask pattern 34 generated by the mask generation unit 113 according to the procedure described later and the image buffer 111 are ANDed for each pixel to generate a head drive signal.

Figure 29C:
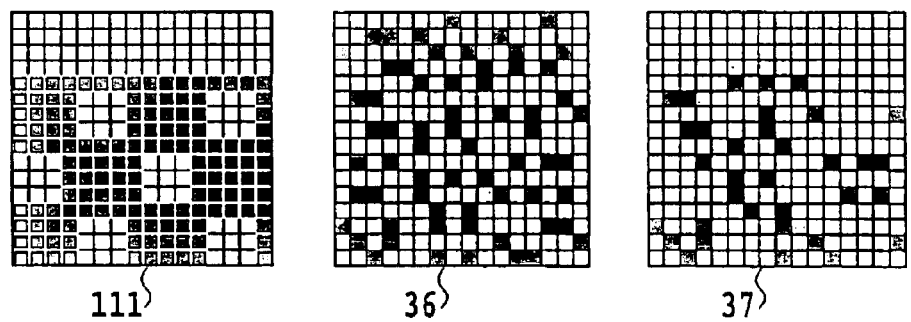
FIG. 29C is a schematic diagram showing a process of generating a print head control signal from the image buffer and the mask buffer by the mask processing unit when the mask processing unit performs mask processing to generate the print head control signal for a third scan.

FIG 29C shows mask processing to generate a print head control signal for a third scan. After the second scan, paper is fed by the medium transport unit 103 by ¼ the number of the print elements, which is equal to a distance of four pixels. As a result, the content of the image buffer is also moved up by four pixels and additional 4-pixel data is retrieved from the image data input terminal and stored in the image buffer. Next, a third mask pattern 36 generated by the mask generation unit 113 according to the procedure described later and the image buffer 111 are ANDed for each pixel to generate a head drive signal.

Figure 29D:
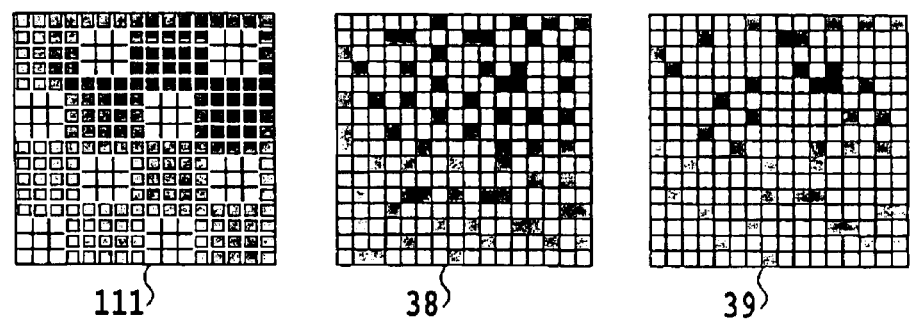
FIG. 29D is a schematic diagram showing a process of generating a print head control signal from the image buffer and the mask buffer by the mask processing unit when the mask processing unit performs mask processing to generate the print head control signal for a fourth scan.

FIG. 29D shows mask processing to generate a print head control signal for a fourth scan. After the third scan, paper is fed by the medium transport unit 103 by ¼ the number of the print elements, which is equal to a distance of four pixels. As a result, the content of the image buffer is also moved up by four pixels and additional 4-pixel data is retrieved from the image data input terminal and stored in the image buffer. Next, a fourth mask pattern 36 generated by the mask generation unit 113 according to the procedure described later and the image buffer 111 are ANDed for each pixel to generate a head drive signal.

With these four scans performed, the printing of a four-pixel-high image area from the top of the image is completed. By repeating the similar process, the entire image is printed. In the fifth scan, because the printing of an image area corresponding to the top four pixels is finished, the data of the top four-pixel area in the image buffer is discarded and additional four-pixel data is stored in a newly available, vacant memory area.

Figure 30:
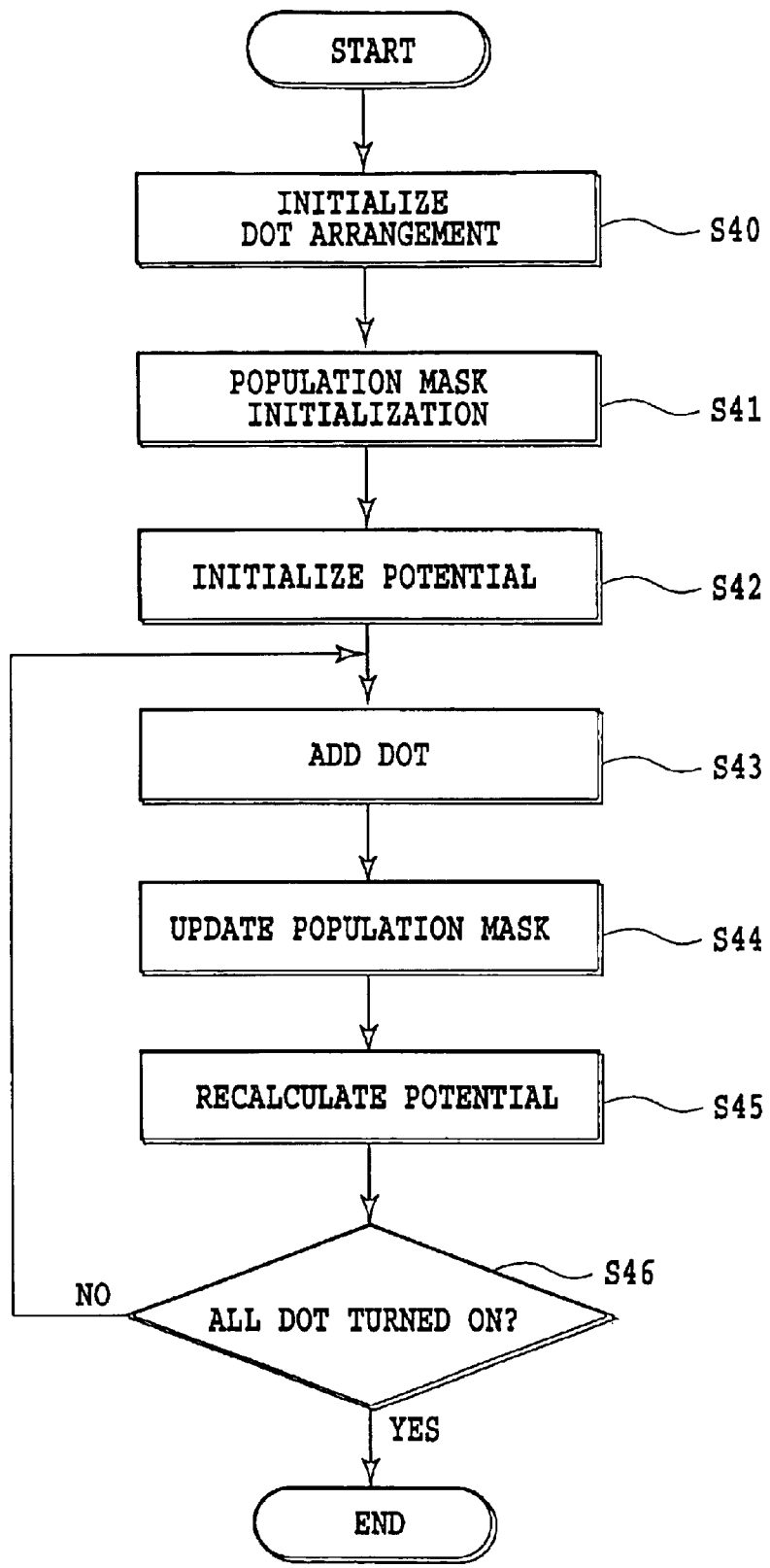
FIG. 30 is a flow chart showing a sequence of steps for generating population mask data.

Next, the procedure for generating the population mask data will be explained by referring to the flow chart of FIG. 30.

In this embodiment, the size of the population mask is 16 pixels wide by 16 pixels high. First, a first-level dot location is randomly determined (step S40). Here, the first dot position is set at (x0, y0). Next, the population mask data is initialized (step S41). That is, the mask value for the first dot position (x0, y0) is set to 254 and the mask values for other dot positions are set to 255. Next, potentials are initialized (step S42). The potential is given by the following function f(r) for a distance r from the dot position.

$f(r) = -0.41r + 1.21$ $(r<2)$ $f(r) = 2.76 \exp(-r)$ $(2 \leq r < 10)$ $f(r) = 0$ $(r \geq 10)$ Hence, the potential P(x, y) at the mask position (x, y) with respect to the dot position (x0, y0) is expressed by:

$$P(x, y) = f\left(\sqrt{\{(x - x0 + 16)\%16\}^2 + \{(y - y0 + 16)\%16\}^2}\right)$$

$x0-10 < x < x0+10$ \hfill (1)

$y0-10 < y - y0+10$

Figure 32:
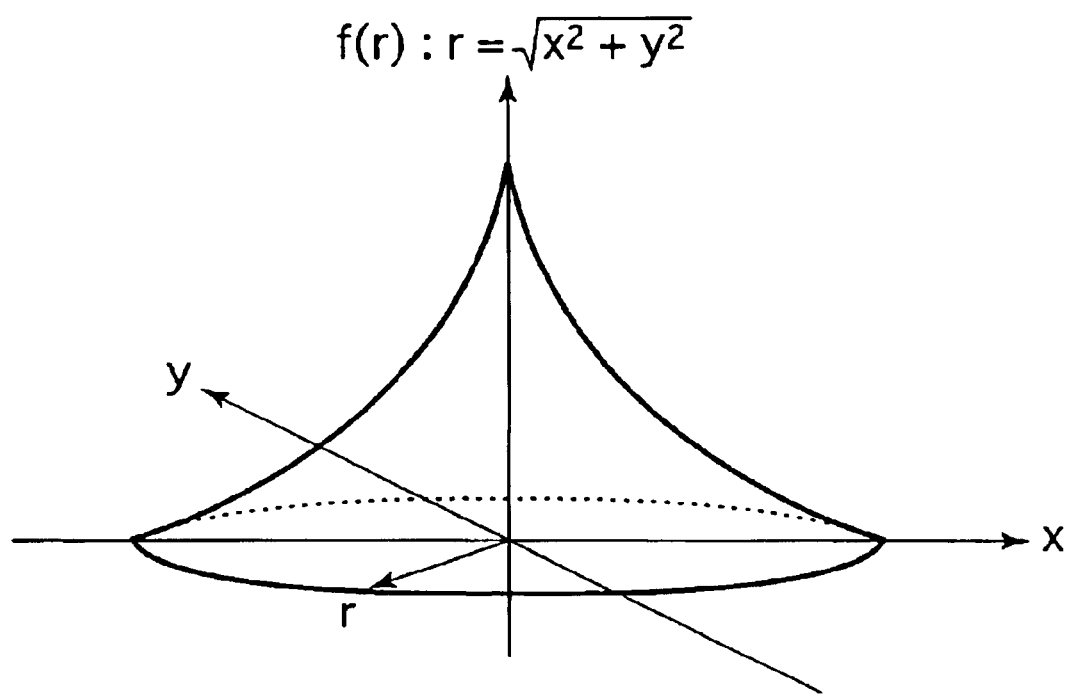
FIG. 32 is a diagram showing a potential at a mask position.
Figure 33:
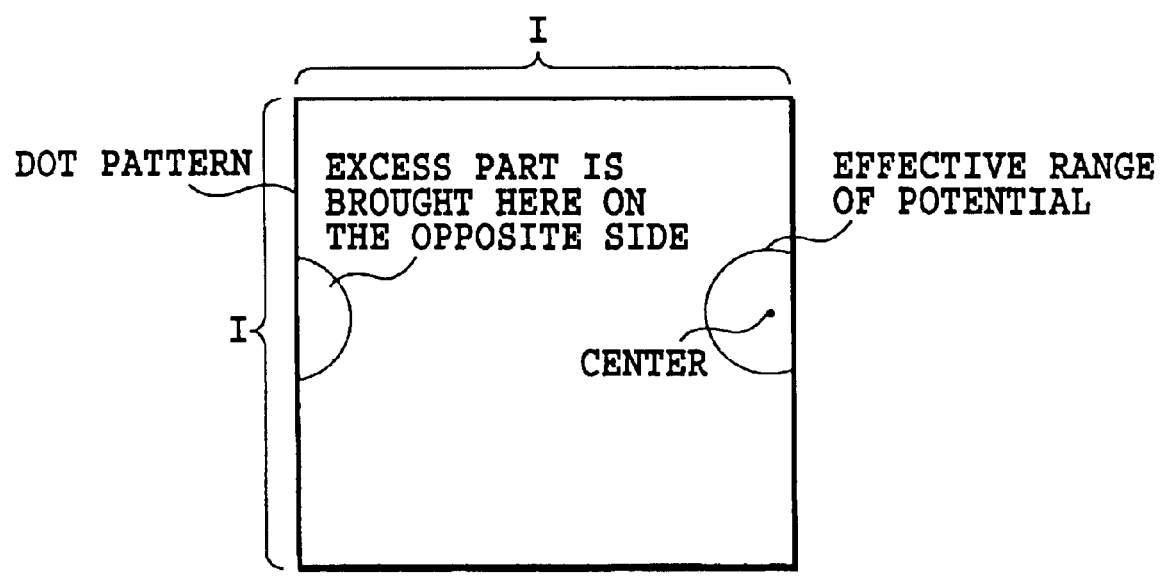
FIG. 33 is an explanatory diagram showing a calculation method when the base of a potential exceeds the mask area.

FIG. 32 shows the geometry of a potential. By giving a repulsion type potential at a dot position, it is possible to prevent a new dot from being formed near an already formed dot. When the base of the potential exceeds the mask area, the part of the potential exceeding the mask area is folded and brought to the opposite side of the same mask area. This is to prevent the dot arrangement from being discontinued at the mask boundary.

Next, a position with the lowest potential is searched and a dot is added to that position (step S43). When there are two or more positions with the minimum potential value, one of these positions is randomly chosen. Next, the mask values for all dot positions including newly added dots are decremented by 1 (step S44). Then, the potential for the additional dot is added (step S45). Assuming the position of the newly added dot is (x1, y1), the new potential can be determined as follows.

$$P(x, y) = f\left(\sqrt{\{(x - x1 + 16)\%16\}^2 + \{(y - y1 + 16)\%16\}^2}\right)$$

$$x1-10 < x < x1+10 \tag{2}$$
$$y1-10 < y - y1+10$$

The above steps S43, S44, S45 are repeated until a dot is added to every pixel position in the population mask. In this way, the population mask is generated. With this process a visually preferred pseudo-periodical mask pattern which has uniformly distributed mask values can be generated. The means for generating the population mask need not be incorporated into the printing apparatus. The population mask data may be generated in advance by a separate mask generation device and only the generated population mask data stored in a population mask memory.

It is noted that the equations applicable in this embodiment are not particularly limited but need only have a similar form to the equations shown above.

Figure 31:
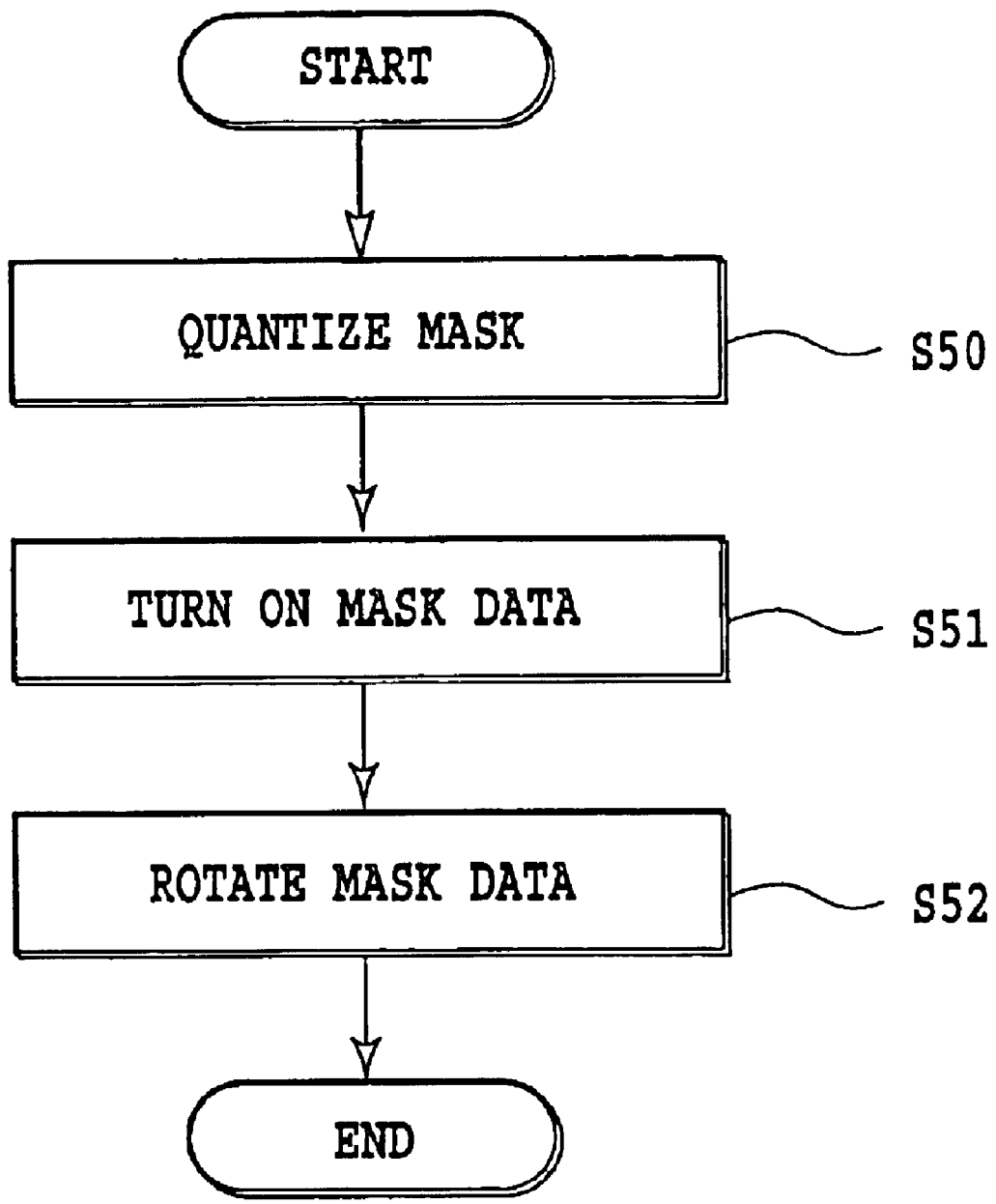
FIG. 31 is a flow chart showing a sequence of steps performed by the mask processing unit in generating mask data to be stored in the mask buffer.

Next, the sequence of operations performed by the mask generation unit 113 to generate mask data 32, 34, 36, 38 to be stored in the mask buffer 114 will be explained by referring to the flow chart of FIG. 31. The population mask has a size of 16 pixels wide 16 pixels high, with each mask value ranging from 0 to 255. First the mask data is quantized into the number of passes (step S50). That is, this embodiment performs multipass printing with four scans, so that mask values from 0 to 63 are allocated to a first pass, mask values from 64 to 127 to a second pass, mask values from 128 to 191 to a third pass, and mask values from 192 to 255 to a fourth pass. Then, pixels of the mask data corresponding to each pass are turned on (step S51). That is, the pixel positions allocated to the first pass of the first-pass mask data 32 are turned on, the pixel positions allocated to the second pass of the second-pass mask data 34 are turned on, the pixel positions allocated to the third pass of the third-pass mask data 36 are turned on, and the pixel positions allocated to the fourth pass of the fourth- pass mask data 38 are turned on. Next, according to the amount of paper feed following each pass, the mask data is rotated (step S52). That is, the mask data 34 is rotated upward by four pixels, the mask data 36 by eight pixels, and the mask data 38 by 12 pixels.

With the above configuration, by using a pseudo-periodical population mask with a high dot dispersion characteristic, it is possible to prevent the formation of a repetitive pattern that would occur when a short-period random number is used, or prevent the degradation of granularity which would occur when a mask with uniform random number is used.

A mask pattern generated by the above means is defined as a pseudo-periodical mask pattern.

Figure 13:
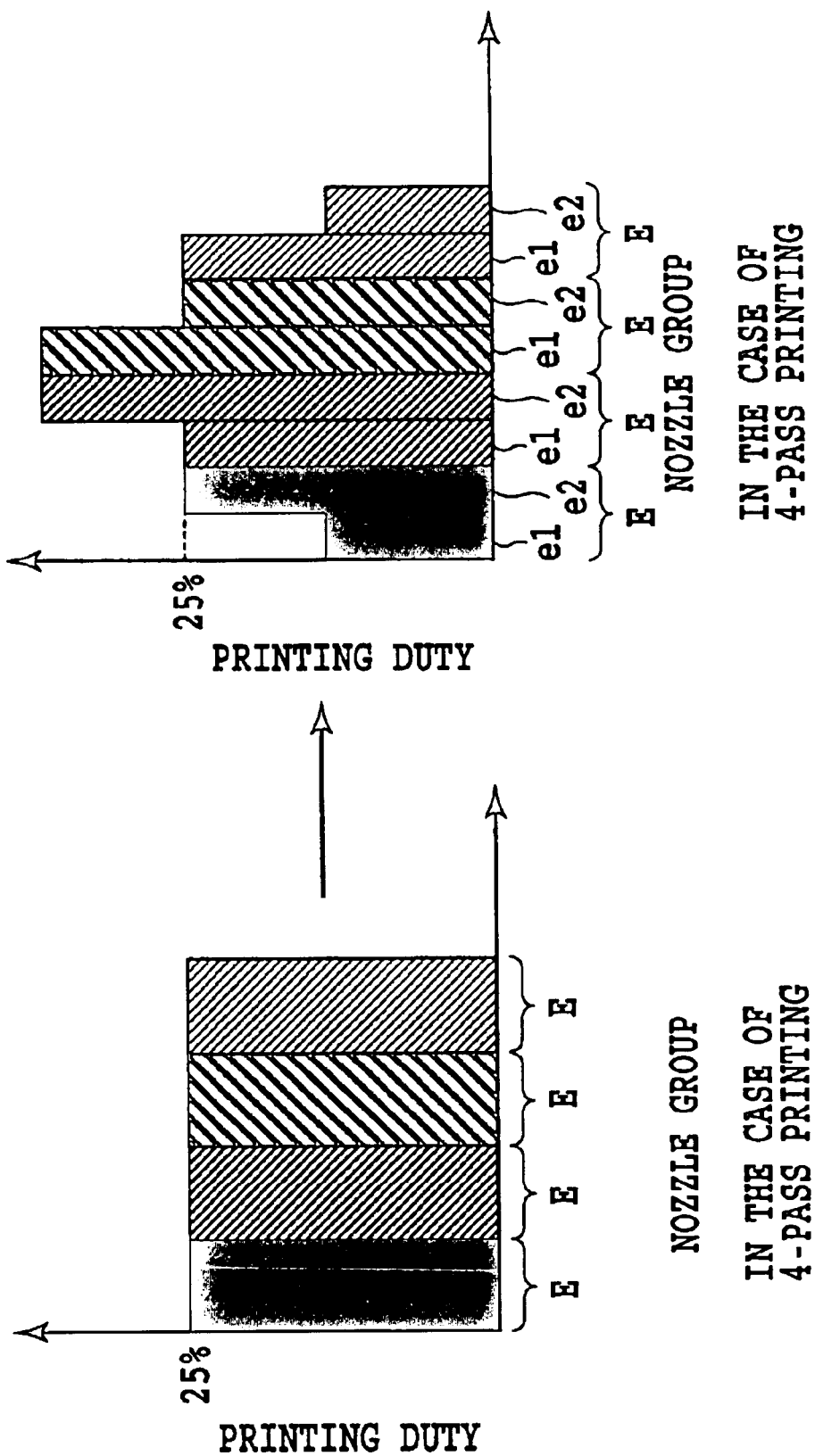
FIG. 13A is a diagram showing a print duty of each pass in a four-pass printing, with the print area in each pass printed at a uniform duty (25%)
FIG. 13B is a diagram showing print duties of each pass in the four-pass printing, with the print area of each pass divided in two and with the subdivided print areas in each pass set at different duties.
Figure 34:
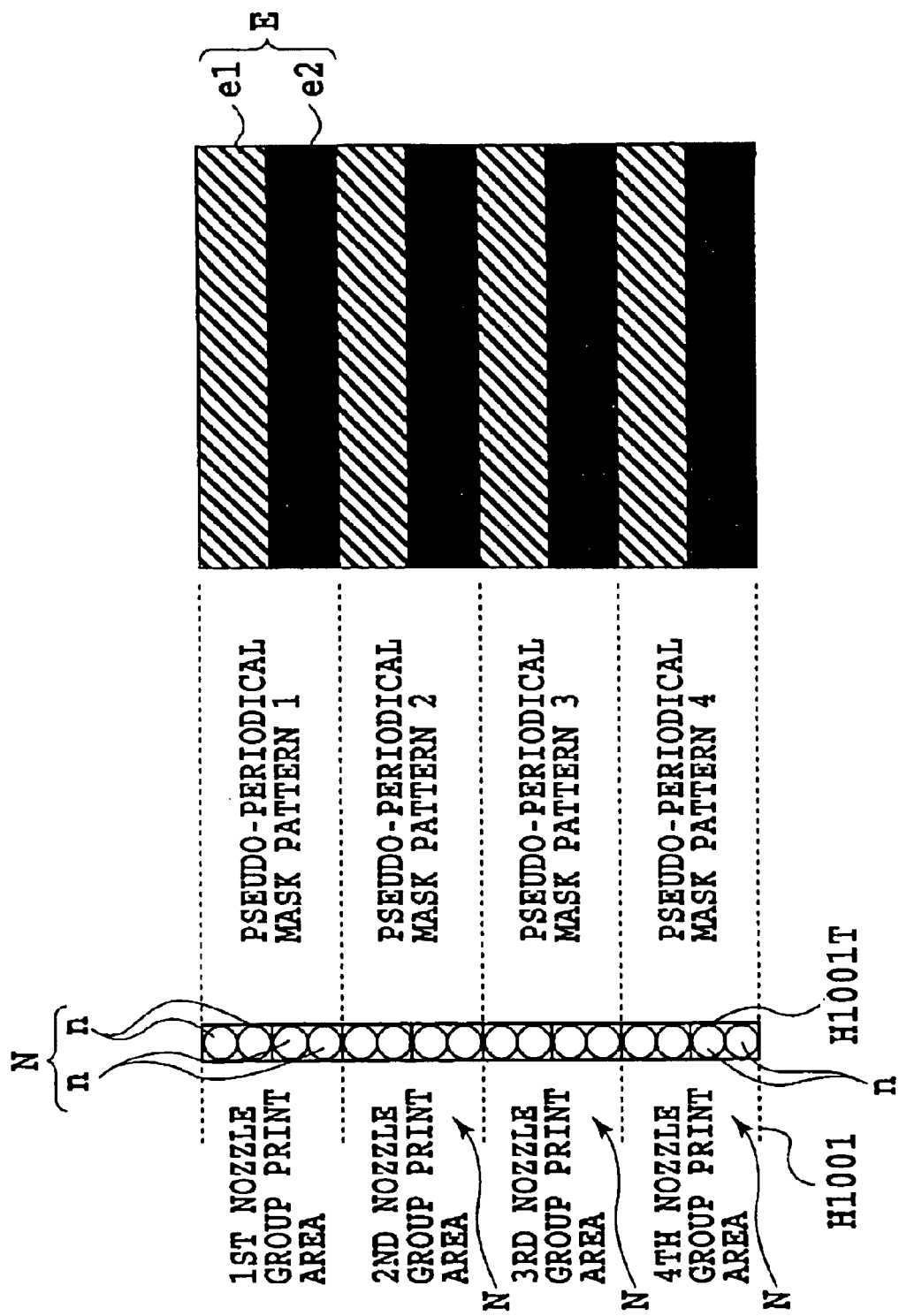
FIG. 34 is a schematic diagram of an image formed by 4-pass printing when each pass area is divided in two and printing duties of the subdivided areas are set to different values by using a pseudo-periodical mask pattern.

Here, we will explain about a case where in the pseudo-periodical mask pattern, the same scan area E (pass area) is divided in two as shown in FIG. 34 and the printing duties of the divided areas e1, e2 are differentiated. Such split duties make the bandings less visually perceptible. FIGS. 13A, 13B and 14B show examples of setting printing duties for the divided areas e1, e2. FIG. 15A shows an image formed by the uniform duties set in the divided areas e1, e2. FIG. 15B shows an image formed by the split duties. When these images are formed by reciprocating the carriage, density variations due to differences in the order of ejection appear conspicuously as shown in the schematic diagrams. In FIG. 34, H1001T represents a plurality of nozzle groups for printing each pass area E, each nozzle group consisting of a plurality of nozzles n (in the case of figure, four nozzles).

In the image of FIG. 14A formed by the uniform duties, when a uniform solid pattern is printed for example, a banding occurs at the paper feed pitch. The bandings occurring at around the paper feed pitches are easily perceived because of the visual characteristics and the image quality appears degraded. However, in this third embodiment, the bandings occur at half the paper feed pitches as in the first and second embodiments. This reduced pitch falls within an allowable pitch range in which the bandings are not visually perceived. Hence, the image does not appear degraded in quality. The experiments conducted by the inverter of this invention has found that at a 338-$\mu$m pitch the density variations (bandings) due to changes in the ejection order cannot easily be perceived visually. It has also been found that a further reduction in the pitch does not produce a corresponding effect. As to the number of divisions, in the 4-pass printing for example, it has been found that dividing each of the pass areas into four has a significant effect of reducing an image degradation.

It is also confirmed that, compared with the mask patterns generated by the conventional random functions, this embodiment has achieved a substantial improvement in the granularity and the mask periodicity (texture).

As described above, where a certain area is printed in multiple passes, it is preferred that in the bidirectional printing system the printing duty setting area by divided into a greater number of split areas as the number of passes decreases. The printing duty may be set by selecting an optimum number of passes and an optimum number of divisions according to various media characteristics (ink absorbing performance, ink spreading performance, etc.). This can be implemented by storing data in mask tables in advance and reading them as required according to the condition.

Next, a fourth embodiment of the ink jet printing apparatus and method according to the present invention will be described. According to the fourth embodiment, in the same pass area E which is printed in a plurality of the main scans, the divided areas e1, e2 corresponding to the ends of the print head have their printing duties set smaller than those of the divided areas on the inner side of the ends of the print head, as in the generations means of the third embodiment.

That is, in the conventional ordinary 4-pass printing (division number is 1) each nozzle column is divided into four nozzle groups corresponding to the four pass areas E and the printing duty of each pass area E is set at 25%, as shown in FIG. 17A. In this embodiment, as shown in FIG. 17B, each pass area E is divided into two split areas e1, e2 and the printing duties of the split areas e1, e2 corresponding to the nozzles n at the ends of the print head H1001 are set at lower values (6.25%) than those of other split areas e1, e2. The printing duties in each pass area range from 25% to 37.5%. With the printing duties of the divided areas e1, e2 set in this way, the frequency of use of the nozzles n situated at the ends of the print head is reduced, this reliably suppressing the number of occurrences of the end nozzle droplet deflection, which in turn reduces the white stripes. The white stripe suppressing effect is obvious when comparing an image formed by the second embodiment (see FIG. 19) and an image formed by the conventional 4-pass printing (FIG. 18).

The image shown in FIG. 18 is formed by setting the printing duties of the pass area E at uniform values (25%). In this image, the end nozzle dot deflection occurs once every four dots (25%) as shown. This end nozzle dot deflection, when the number of passes is reduced, becomes even more conspicuous and is clearly perceived as a white stripe.

Figure 19:
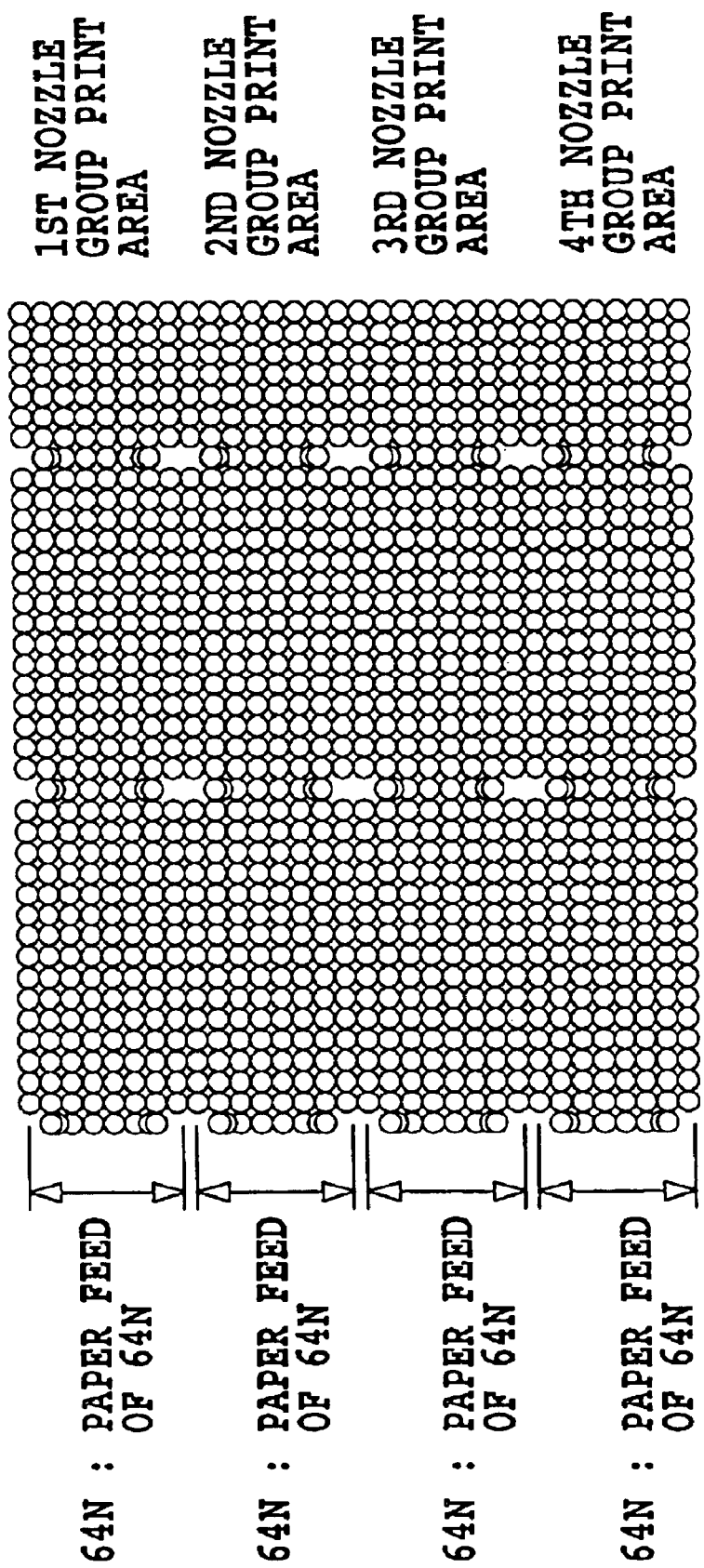
FIG. 19 is a schematic diagram of an image formed by the four-pass printing with only the end portions of the print area printed at a print duty of 6.25%.

On the other hand, the image shown in FIG. 19 is formed in the same 4-pass printing by setting the printing duties of the divided areas e1, e2 corresponding to the ends of the print head to 6.25% (¼ the conventional uniform duty) and, in other divided areas, making duty setting in such a manner that the printing duty increases as the divided area approaches the center of the print head H1001, as shown in FIG. 17B.

With the printing duties at the ends of the print head set at lower values, the end nozzle dot deflection in the image can only occur at a very low frequency of one in 16 dots. As a result, the end nozzle dot deflections are not perceived as a white stripe. Hence, not only can the banding in the image be eliminated as in the first embodiment but the white stripes due to the end nozzle dot deflections can also be eliminated, thus forming an image of higher quality.

Figure 35A:
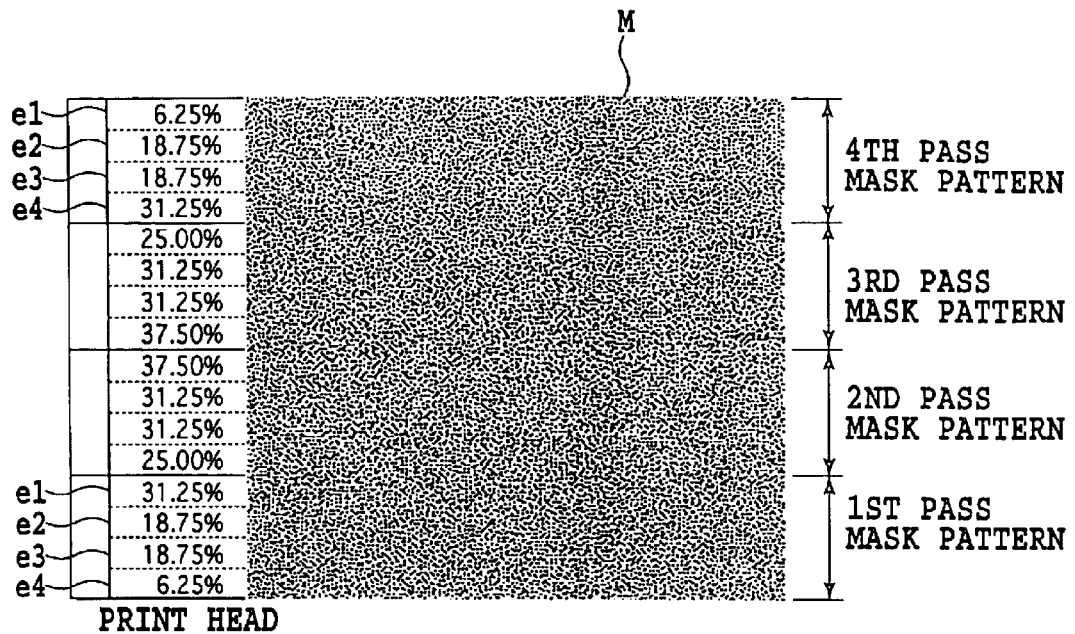
FIG. 35A is a pseudo-periodical mask pattern when one pass area is divided into four and 4-pass printing is done with printing duties of the subdivided areas of each pass set at uniform duties.
Figure 35B:
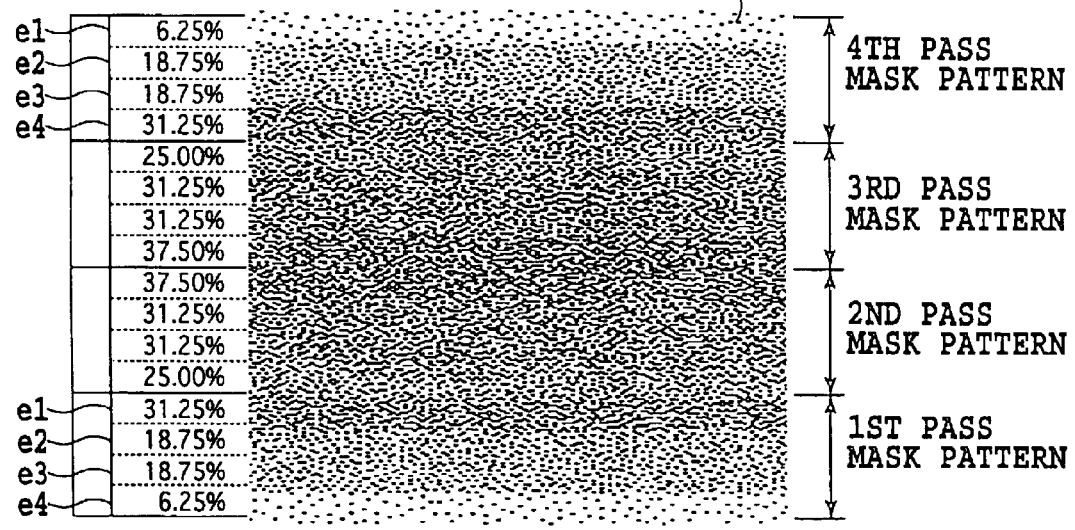
FIG. 35B is a pseudo-periodical mask pattern when one pass area is divided into four and 4-pass printing is done with printing duties of the subdivided areas of each pass set at different duties.
Figure 39A:
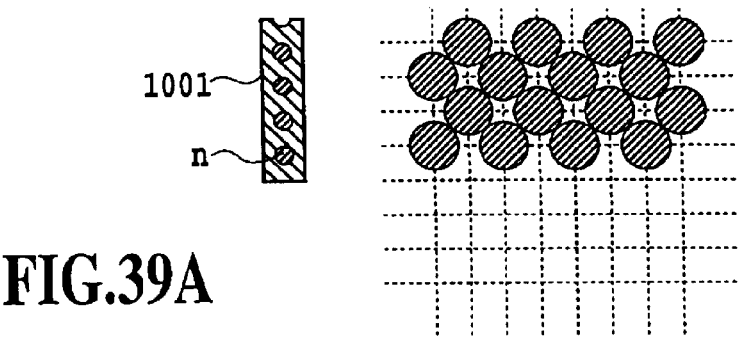
FIG. 39A is an image formed by a first pass during a multipass printing (2-pass printing)
Figure 39B:
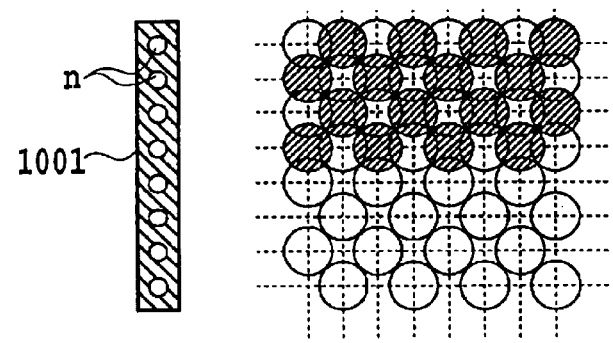
FIG. 39B is an image formed by a second pass during a multipass printing (2-pass printing)
Figure 39C:
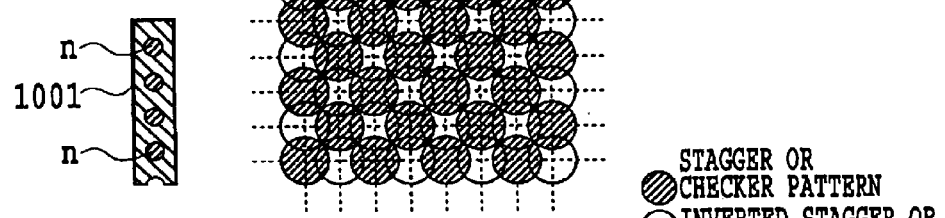
FIG. 39C is an image formed by a third pass during a multipass printing (2-pass printing)
Figure 40:
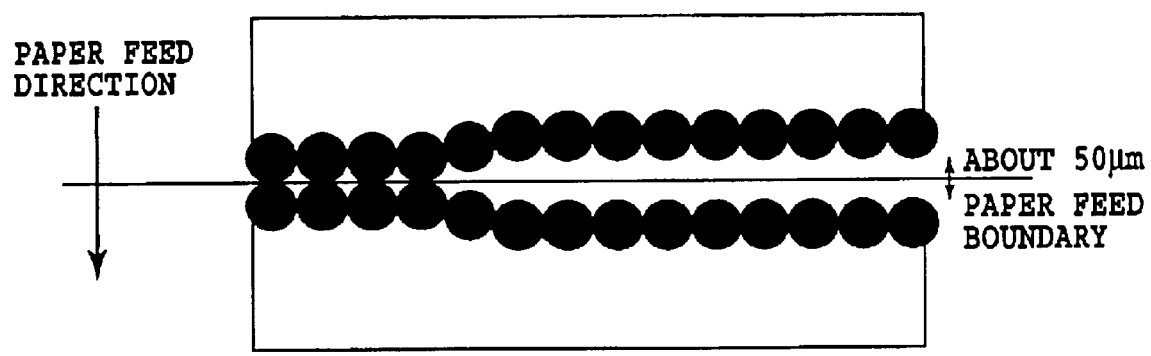
FIG. 40 is a schematic diagram showing a deflection of dots formed by end nozzles of the print head.
Figure 41:
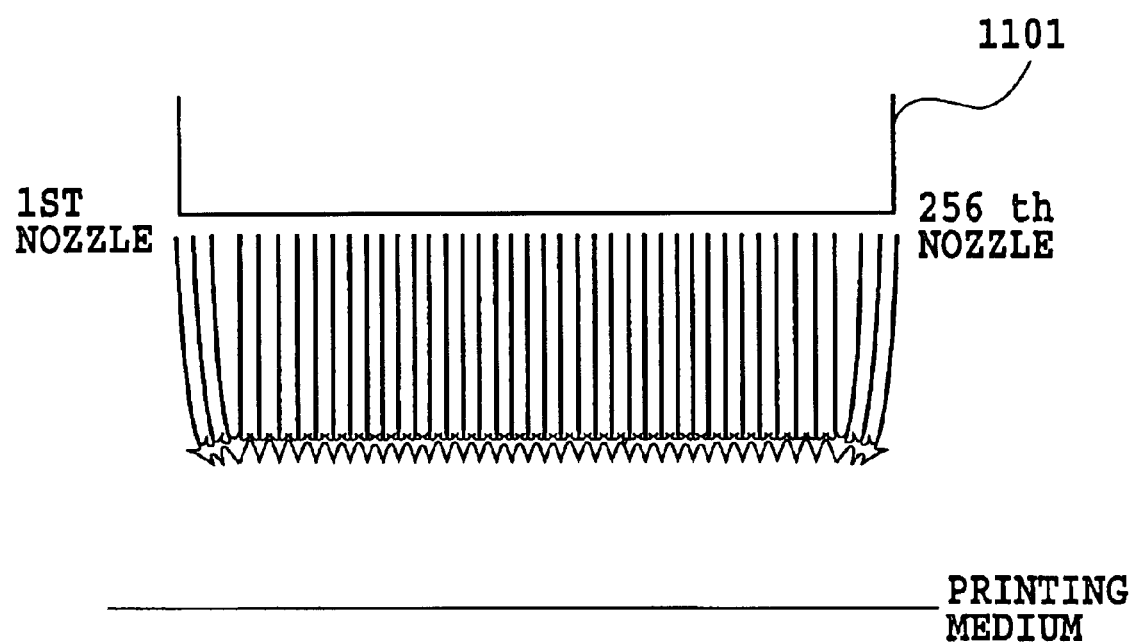
FIG. 41 is a schematic diagram showing a deflection of ink droplets as seen from the print head side.

While the fourth embodiment has been explained by taking up an example case where the pass area E is divided in two, the pass area may be divided into three or more. For example, a single pass area E may be divided into four areas e1, e2, e3, e4 as shown in FIGS. 35A and 35B. In this case, the printing duties of the divided areas e1, e4 at the ends of the print head are set at relatively low values of 6.25%, with the printing duties of other divided areas set to increase progressively as they approach the center of the print head.

In FIG. 35B, M1 schematically represents a pseudo-periodical mask pattern for setting the printing duties. Reference symbol M in FIG. 35A schematically represents a pseudo-periodical mask pattern when the 4-pass printing is done with uniform duties. As can be seen from the figures, the mask pattern M has concentrated dots d evenly scattered, whereas the mask pattern M1 has concentrated dots d1 more sparsely scattered toward the ends of the pattern.

According to the third and fourth embodiments described above, by generating a pseudo-periodical mask pattern which has a visually preferred dot arrangement, the occurrence of a repetitive pattern and granularity can be reduced, compared with those produced by the mask patterns based on random numbers.

An example application is which the present invention can be effectively used is one that utilizes thermal energy generated by the electrothermal transducer to cause film boiling in a liquid and thereby generate a bubble.

As described above, because in this invention one and the same pass area that is printed in a plurality of main scans is split and the printing duties of the split area are differentiated, the pitch of the bandings that are normally perceived at the paper feed pitch can be reduced, producing an excellent effect of improving visual characteristic of the printed image.

Further, of the same pass area formed by a plurality of main scans, the split areas corresponding to the ends of the print head have their printing duties set smaller than those of the split areas on the inner side of the ends of the print head in order to reduce the frequency of use of the nozzles situated at the ends of the print head. This can reduce the number of occurrences of the end nozzle droplet deflection, improving an image quality.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An ink jet printing apparatus for forming an image on a print medium by using a print head, the print head having a plurality of nozzles for printing a same color, the ink jet printing apparatus comprising:

image forming means for performing a plurality of main scans by scanning the print head relative to a same main scan print area of the print medium and for forming the image onto the same main scan print area by using different respective nozzles of the print head in the plurality of main scanning operations, wherein different thinning out mask patterns are used in the plurality of main scanning operations for printing onto the same main scan print area, and thinned out images according to the different thinning out mask patterns are formed onto the same main scan print area by the different respective nozzles during the plurality of main scanning operations; and printing duty determining means for dividing the same main scan print area into a plurality of divided areas in a sub-scan direction different from a main scan direction, and for determining the printing duty of each of the plurality of divided areas, in each of the plurality of main scanning operations, the printing duty being determined by the thinning out mask pattern, wherein the printing duty determining means performs the thinning out process by the thinning out mask pattern such that the printing duty of one of the divided areas and the printing duty of a second one of the divided areas are different from each other in each of the plurality of the main scanning operations, and the printing duty for the same main scan print area in the main scanning operation in which are used nozzles including an end nozzle of the print head is less than the printing duty for the same main scan print area in another main scanning operation in which the end nozzle of the print head is not used.

2. An ink jet printing apparatus according to claim 1, wherein the one of the divided areas is closer to the end nozzle than is the second of the divided areas, and wherein the printing duty determining means determines the respective printing duties of the one and the second divided areas such that the printing duty in the one of the divided areas is less than the printing duty of the second of the divided areas in each of the plurality of the main scanning operations.

3. An ink jet printing apparatus according to claim 1, wherein the thinning out mask pattern has a lower resolution than that of an image being printed.

4. An ink jet printing apparatus according to claim 1, wherein the thinning out mask pattern is a pseudo-periodical mask pattern in which, when pixels are digitized according to an arbitrary level, unprinted pixels and printed pixels are uniformly distributed.

5. An ink jet printing apparatus according to claim 1, wherein the print head has a plurality of nozzle columns corresponding to color inks and ejects ink droplets according to color print data to form a color image.

6. An ink jet printing apparatus according to claim 1, further including a striped density variation amount detection means for detecting an amount of striped density variation occurring in an image formed by the print head, wherein the striped density variation amount detection means has a control unit to cause the print head to print a predetermined test image, a reading unit to read the printed test image by using an optical sensor, a calculation unit to determine the amount of striped density variation of the print head based on the result of the reading, and a register to store the calculated result produced by the calculation unit.

7. An ink jet printing apparatus according to claim 1, wherein an amount of ink ejected from each nozzle of the print head in one ejection operation is 4 pl or less.

8. An ink jet printing apparatus according to claim 1, wherein dots formed by ink ejected from each nozzle of the print head in one ejection operation have an average diameter of 50 µm or less.

9. An ink jet printing apparatus according to claim 1, wherein the print head forms dots at a print density of 600 dpi or higher.

10. An ink jet printing apparatus according to claim 1, wherein the print head generates bubbles in ink by thermal energy and ejects ink by a pressure of the bubbles.

11. An ink jet printing method for forming an image on a print medium by using a print head, the print head having a plurality of nozzles, the ink jet printing method comprising the steps of:

performing a plurality of main scans by scanning the print head relative to a same main scan print area of the print medium and forming the image onto the same main scan print area by using different respective nozzles of the print head in the plurality of main scanning operations, wherein different thinning out mask patterns are used in the plurality of main scanning operations, for printing onto the same main scan print area, and thinned out images according to the different thinning out mask patterns are formed onto the same main scan print area by the different respective nozzles during the plurality of main scanning operations; and dividing the same main scan print area into a plurality of divided areas in a sub-scan direction different from a main scan direction, and determining the printing duty of each of the plurality of divided areas, in each of the plurality of main scanning operations, the printing duty being determined by the thinning out mask pattern, wherein the printing duty of one of the divided areas and the printing duty of a second one of the divided areas are different from each other in each of the plurality of the main scanning operations, and the printing duty for the same main scan print area in the main scanning operation in which are used nozzles including an end nozzle of the print head is less than the printing duty for the same main scan print area in another main scanning operation in which the end nozzle of the print head is not used.

12. An ink jet printing method according to claim 11, wherein, of the same main scan print formed by a plurality of main scans, the divided areas corresponding to the ends of the print head have their printing duties set smaller than those of the divided areas on the inner side of the ends of the print head.

13. An ink jet printing method according to claim 11, wherein the thinning out mask pattern has a lower resolution than that of an image being printed.

14. An ink jet printing method according to claim 11, wherein the thinning out mask pattern is a pseudo-periodical mask pattern in which, when pixels are digitized according to an arbitrary level, unprinted pixels and printed pixels are uniformly distributed.

15. An ink jet printing method according to claim 11, wherein the print head has a plurality of nozzle columns corresponding to color inks and ejects ink droplets according to color print data to form a color image.

16. An ink jet printing method according to claim 11, further including a step of detecting an amount of striped density variation occurring in an image formed by the print head, wherein the striped density variation amount detection step includes a step of causing the print head to print a predetermined test image, a step of reading the printed test image by using an optical sensor, a calculation step of determining the amount of striped density variation of the print head based on the result of the reading, and a step of storing the calculated result produced by the calculation step.

17. An ink jet printing method according to claim 11, wherein the print head generates bubbles in ink by thermal energy and ejects ink by a pressure of the bubbles.

18. A printing control method for an ink jet printing apparatus, the ink jet printing apparatus having a plurality of nozzles for printing a same color, the printing control method comprising the steps of:

providing the printing apparatus;

performing a plurality of main scans by scanning the print head relative to a same main scan print area of the print medium and forming the image onto the same main scan print area by using different respective nozzles of the print head in the plurality of main scanning operations, wherein different thinning out mask patterns are used in the plurality of main scanning operations, for printing onto the same main scan print area, and thinned out images according to the different thinning out mask patterns are formed onto the same main scan print area by the different respective nozzles during the plurality of main scanning operations; and dividing the same main scan print area into a plurality of divided areas in a sub-scan direction different from a main scan direction, and determining the printing duty of each of the plurality of divided areas, in each of the plurality of main scanning operations, the printing duty being determined by the thinning out mask pattern, wherein the printing duty of one of the divided areas and the printing duty of a second one of the divided areas are different from each other in each of the plurality of the main scanning operations, and the printing duty for the same main scan print area in the main scanning operation in which are used nozzles including an end nozzle of the print head is less than the printing duty for the same main scan print area in another main scanning operation in which the end nozzle of the print head is not used.

19. A ink jet printing apparatus for forming an image on a print medium by using a print head, the print head having a plurality of nozzle groups, each having a plurality of nozzles for printing a same color, the ink jet printing apparatus comprising:

image formation means for performing a plurality of main scans by scanning the print head relative to a same main scan print area of the print medium and for forming the image onto the same main scan print area by using different nozzle groups of the print head in the plurality of scanning operations, wherein different thinning out mask patterns are used in the plurality of scanning operations for printing onto the same main scan print area, and a thinned out image according to the different thinning out mask patterns is formed onto the same main scan print area by the different nozzle groups during the plurality of scanning operations; and printing duty determining means for dividing the same scan print area into a plurality of divided areas in a sub-scan direction different from a main scan direction, and for determining the printing duty of each of the plurality of divided areas, the printing duty being determined from the thinning out mask pattern, wherein the printing duty determining means performs the thinning out process by the thinning out mask pattern such that the printing duty of one of the divided area and the printing duty of a second one of the divided areas are different from each other, wherein the thinning out mask pattern is a pseudo-periodical mask pattern in which, when pixels are digitized according to an arbitrary level, unprinted pixels and printed pixels are uniformly distributed.

20. An ink jet printing apparatus for forming an image on a print medium by using a print head, the print head having a plurality of nozzle groups, each having a plurality of nozzles for printing a same color, the ink jet printing apparatus comprising:

image formation means for performing a plurality of main scans by scanning the print head relative to a same main print area of the print medium and for forming the image onto the same main scan print area by using different nozzle groups of the print head in the plurality of scanning operations, wherein different thinning out mask patterns are used in the plurality of scanning operations for printing onto the same main scan print area, and a thinned out image according to the different thinning out mask patterns is formed onto the same main scan print area by the different nozzle groups during the plurality of scanning operations; and printing duty determining means for dividing the same scan print area into a plurality of divided areas in a sub-scan direction different from a main scan direction, and for determining the printing duty of each of the plurality of divided areas, the printing duty being determined from the thinning out mask pattern, wherein the printing duty determining means performs the thinning out process by the thinning out mask pattern such that the printing duty of one of the divided areas and the printing duty of a second one of the divided areas are different from each other, wherein the apparatus further includes a striped density variation amount detection means for detecting an amount of striped density variation occurring in an image formed by the print head, wherein the striped density variation amount detection means has a control unit to cause the print head to print a predetermined test image, a reading unit to read the printed test image by using an optical sensor, a calculation unit to determine the amount of striped density variation of the print head based on the result of the reading, and a register to store the calculated result produced by the calculation unit.

21. An ink jet printing method for forming an image on a print medium by using a print head, the print head having a plurality of nozzle groups, each having a plurality of nozzles, the ink jet printing method comprising the steps of:

performing the plurality of main scans by scanning the print head relative to a same main scan print area of the print medium and forming the image into the same main scan print area by using different nozzle groups of the print head in the plurality of scanning operations, wherein different thinning out mask patterns are used in the plurality of scanning operations for printing onto the same main scan print area, and a thinned out image according to the different thinning out mask patterns is formed onto the same main scan print area by the different nozzle groups during the plurality of scanning operations, and dividing the same scan print area into a plurality of divided areas in a sub-scan direction different from a main scan direction, and determining the printing duty of each of the plurality of divided areas, the printing duty being determined from the thinning out mask pattern, wherein the printing duty of one of the divided areas and the printing duty of a second one of the divided areas are different from each other, and wherein the thinning out mask pattern is a pseudo-periodical mask pattern in which, when pixels are digitized according to an arbitrary level, unprinted pixels and printed pixels are uniformly distributed.

22. An ink jet printing method for forming an image on a print medium by using a print head, the print head having a plurality of nozzle groups, each having a plurality of nozzles, the ink jet printing method comprising the steps of:

performing a plurality of main scans by scanning the print head relative to a same main scan print area of the print medium and forming the image onto the same main scan print area by using different nozzle groups of the print head in the plurality of scanning operations, wherein different thinning out mask patterns are used in the plurality of scanning operations for printing onto the same main scan print area, and a thinned out image according to the different thinning out mask patterns is formed onto the same main scan print area by the different nozzle groups during the plurality of scanning operations, and dividing the same scan print area into a plurality of divided areas in a sub-scan direction different from a main scan direction, and determining the printing duty of each of the plurality of divided areas, the printing duty being determined from the thinning out mask pattern, wherein the printing duty of one of the divided areas and the printing duty of a second one of the divided areas are different from each other, and wherein the method also includes a step of detecting an amount of striped density variation occurring in an image formed by the print head, wherein the striped density variation amount detection step includes a step of causing the print head to print a predetermined test image, a step of reading the printed test image by using an optical sensor, a calculation step of determining the amount of striped density variation of the print head based on the result of the reading, and a step of storing the calculated result produced by the calculation step.

23. An ink jet printing apparatus for forming an image on a print medium by using a print head, the print head having a plurality of nozzle groups, each having a plurality of nozzles for printing a same color, the ink jet printing apparatus comprising:

means for performing a plurality of main scans by scanning the print head relative to a same print area of the print medium; and means for forming thinned out images according to different thinning out mask patterns onto the same print area by using different respective nozzle groups of the print head in the plurality of scanning operations, each of the different thinning out mask patterns being used in each of the plurality of scanning operations for printing onto the same print area, wherein, among the different thinning out mask patterns, a thinning out rate of the thinning out mask pattern to be used when the nozzle group including an end nozzle of the print head performs the main scanning operation onto the same print area is larger than a thinning out rate of the thinning out mask pattern to be used when the nozzle group excluding the end nozzle of the print head performs the main scanning operation onto the same print area, and wherein each of different thinning out mask patterns has a plurality of portions corresponding to each of a plurality of areas obtained by dividing the same print area in a sub-scan direction different from a main scan direction and, among the plurality of portions, a thinning out rate for one portion differs from that for a second portion.

24. A ink jet printing method for forming an image on a print medium by using a print head, the print head having a plurality of nozzle groups, each having a plurality of nozzles for printing a same color, the ink jet printing method comprising the steps of:

performing a plurality of main scans by scanning the print head relative to a same print area of the print medium; and forming thinned out images according to different thinning out mask patterns onto the same print area by using different nozzle groups of the print head in the plurality of scanning operations, each of the different thinning out mask patterns being used in each of the plurality of scanning operations for printing onto the same print area, wherein, among the different thinning out mask patterns, a thinning out rate of the thinning out mask pattern to be used when the nozzle group including an end nozzle of the print head performs the main scanning operation onto the same print area is larger than the thinning out rate of the thinning out mask pattern to be used when the nozzle group excluding the end nozzle performs the main scanning operation onto the same print area, and wherein each of different thinning out mask patterns has a plurality of portions corresponding to each of a plurality of areas obtained by dividing the same print area in a sub-scan direction different from a main scan direction, and, among the plurality of portions, a thinning out rate for one portion differs from that for a second portion.

25. An ink jet printing apparatus for forming an image on a print medium by using a print head having a plurality of nozzles for ejecting ink of a same color, the ink jet printing apparatus comprising:

means for performing a plurality of main scans by scanning the print head relative to a predetermined print area of the print medium; and means for forming thinned out images according to different thinning out masks onto the predetermined print area by using different respective nozzles of the print head in the plurality of main scanning operations, wherein each of the different thinning out masks has a plurality of portions for thinning out image data corresponding to respective ones of a plurality of divided areas obtained by dividing the predetermined print area in a sub-scan direction different from a main scan direction, wherein the plurality of portions includes at least a first portion corresponding to one of the divided areas relatively close to an end nozzle of the print head and a second portion corresponding to another of the divided areas relatively far from the end nozzle of the print head, and a thinning out rate of the first portion is larger than that of the second portion, and wherein, among the different thinning out masks, the thinning out rate of the thinning out mask to be used when the end nozzle of the print head performs the main scanning operation onto the predetermined print area is larger than the thinning out rate of a another thinning out mask to be used when nozzles other than the end nozzle performs the main scanning operation onto the predetermined print area.

26. An ink jet printing apparatus for forming an image on a print medium by using a print head having a plurality of nozzles for ejecting ink of a same color, the ink jet printing apparatus comprising:

means for performing a plurality of main scans by scanning the print head relative to a same print area of the print medium; and means for forming thinned out images according to different thinning out masks onto the same print area by using different respective nozzles of the print head in the plurality of main scanning operations, wherein each of the different thinning out masks is defined so that respective thinning out rates corresponding to respective ones of a plurality of divided areas obtained by dividing the same scan print area in a sub-scan direction different from a main scan direction are different from each other, and the thinning out rate for divided area close to an end nozzle of the print head is larger than that for divided area far from the end nozzle of the print head, and wherein, the thinning out rate of each of the different thinning out masks is defined so that the thinning out rate for the same print area in a main scanning operation in which nozzles including an end nozzle of the print head are used, is larger than the thinning out rate for the same print area in another main scanning operation in which the end nozzle of the print head is not used.

27. A ink jet printing apparatus for forming an image on a print medium by using a print head having the plurality of nozzles for ejecting ink of a same color, the ink jet printing apparatus comprising:

means for performing a plurality of main scans by scanning the print head relative to a same print area of the print medium; and means for forming thinned out images according to different thinning out masks onto the same print area by using different respective nozzles of the print head in the plurality of main scanning operations, wherein each of the different thinning out masks is defined so that respective print duties corresponding to each of a plurality of divided areas obtained by dividing the same print area in a sub-scan direction different from a main scan direction are different from each other, and the print duty for the divided area close to an end nozzle of the print head is less than the print duty for the divided area far from the end nozzle of the print head, and wherein the print duty of each of the different thinning out masks is defined so that the print duty for the same print area in a main scanning operation in which nozzles including an end nozzle of the print head are used, is less than the print duty for the same print area in another main scanning operation in which nozzles excluding the end nozzle are used.

28. A recording apparatus for recording using a recording head having a plurality of recording nozzles, said apparatus comprising:
   a scanning means for scanning the recording head relative to a same record area of a recording medium a plurality of times;
   a setting means for setting a plurality of different thinning-out masks as thinning-out masks used during the plurality of main scans for recording of the same record area;
   a thinning out means for thinning out image data using the plurality of different thinning-out masks set by said setting means, each of the plurality of different thinning-out masks being used during each of the plurality of scans; and
   a record controlling means for recording thinned-out images on the same record area in accordance with the image data thinned out by said thinning-out means, during the plurality of scans, and completing an image to be recorded on the same record area,
   wherein said thinning out means thins image data in accordance with thinning masks which is set in such a manner that respective thinning out rates for the plurality of divided areas obtained by dividing the same record area in a sub-scan direction different from a main scan direction are different from each other, and
   wherein a thinning out rate of the thinning mask to be used when the nozzles including an end nozzle of the print head perform a main scanning operation onto the same record area is larger than a thinning out rate of the thinning mask to be used when the nozzles excluding the end nozzle perform a main scanning operation onto the same record area, and in each of the plurality of the main scanning operations, the thinning out rate for the divided area close to the end nozzle of the print head is larger than the thinning out rate for the divided area far from the end nozzle.

29. A recording apparatus for recording using a recording head having a plurality of recording nozzles, said apparatus comprising:
   a scanning means for scanning the recording head relative to a same record area of a recording medium a plurality of times;
   a setting means for setting a plurality of different thinning-out masks as thinning-out masks used during the plurality of main scans for recording of the same record area;
   a thinning out means for thinning out image data using the plurality of different thinning-out masks set by said setting means, each of the plurality of different thinning-out masks being used during each of the plurality of main scans; and
   a record controlling means for recording thinned-out images on the same record area in accordance with the image data thinned out by said thinning out means, during the plurality of scans, and completing an image to be recorded on the same record area,
   wherein said thinning out means thins image data, on the basis of the thinning-out mask which is defined so that respective print duties corresponding to each of a plurality of divided areas obtained by dividing the same record area in a sub-scan direction different from a main scan direction are different from each other, and
   wherein a print duty for the same record area in a main scanning operation in which nozzles including an end nozzle of the print head are used, is less than that for the same record area in another main scanning operation in which nozzles excluding the end nozzles are used, and in each of the plurality of main scanning operations, the print duty for divided area close to the end nozzle of the print head is less than that for divided area far from the end nozzle.

30. A recording apparatus for recording using a recording head having a plurality of recording nozzles, said apparatus comprising:
   a scanning means for scanning the recording head relative to a same record area of a recording medium a plurality of times;
   a setting means for setting a plurality of different thinning-out masks as thinning-out masks used during the plurality of scans for recording of the same record area;
   a thinning out means for thinning out image data using the plurality of different thinning-out masks set by said setting means, each of the plurality of thinning-out masks being used during each of the plurality of scans; and
   a record controlling means for recording thinned-out images on the same record area in accordance with the image data thinned out by said thinning-out means, during the plurality of scans, and completing an image to be recorded on the same record area,
   wherein each of the different thinning-out masks has a plurality of portions for thinning-out image data corresponding to each of a plurality of divided areas obtained by dividing the same record area in a sub-scan direction different from a main scan direction,
   wherein the thinning out rate for one portion of the plurality of the portions differs from that for a second portion of the plurality of the portions, and
   wherein the thinning out rate of the thinning out mask to be used in a main scanning operation in which the nozzles including an end nozzle of the print head are used, is larger than the thinning out rate for another thinning out mask to be used in a main scanning operation in which the nozzles excluding the end nozzle are used.

31. A recording apparatus for recording using a recording head having a plurality of recording nozzles, said apparatus comprising:
   scanning means for scanning the recording head relative to a same record area of a recording medium a plurality of times;
   setting means for setting a plurality of different thinning-out masks as thinning-out masks used during the plurality of scans for recording of the same record area;
   thinning out means for thinning out image data using the plurality of different thinning-out masks set by said setting means, each of the plurality of thinning-out masks being used during each of the plurality of scans; and
   record controlling means for recording thinned-out images on the same record area in accordance with the image data thinned out by said thinning-out means, during the plurality of scans, and completing an image to be recorded on the same record area,
   wherein each of the different thinning-out masks is defined so that respective print duties corresponding to one divided area differs from that corresponding to a second one of the divided areas in a plurality of divided areas obtained by dividing the same record area in a sub-scan direction different from a main scan direction, and wherein the print duty of the thinning out masks to be used in a main scanning operation in which the nozzles including an end nozzle of the print head are used, is less than the print duty of the thinning out mask to be used in another main scanning operation in which the nozzle excluding the end nozzle are used.

32. An ink jet printing method for forming an image on a print medium by using a print head having a plurality of nozzles for ejecting ink of a same color, the ink jet printing method comprising the following steps:

performing a plurality of main scans by scanning the print head relative to a predetermined print area of the print medium; and forming thinned out images according to different thinning out masks onto the predetermined print area by using different respective nozzles of the print head in the plurality of main scanning operations, wherein each of the different thinning out masks has a plurality of portions for thinning out image data corresponding to each of a plurality of divided area obtained by dividing the predetermined print area in a sub-scan direction different from a main scan direction, wherein the plurality of portions includes at least a first portion corresponding to one of the divided areas relatively close to an end nozzle of the print head and a second portion corresponding to another of the divided areas relatively far from the end nozzle of the print head, and a thinning out rate of the first portion is larger than that of the second portion, and wherein, among the different thinning out masks, the thinning out rate of the thinning out mask to be used when the end nozzle of the print head performs the main scanning operation onto the predetermined print area in larger than the thinning out rate of another thinning out mask to be used when nozzles other than the end nozzle perform the main scanning operation onto the predetermined print area.

33. An ink jet printing method for forming an image on a print medium by using a print head having a plurality of nozzles for ejecting ink of a same color, the ink jet printing method comprising the following steps:

performing a plurality of main scans by scanning the print head relative to a same print area of the print medium; and forming thinned out images according to a different thinning out mask onto the same print area by using a different nozzle of the print head in the plurality of main scanning operations, wherein each of the different thinning out masks is defined so that thinning out rates corresponding to each of a plurality of divided areas obtained by dividing the same scan print area in a sub-scan direction different from a main scan direction are different from each other, and the thinning out rate for divided area close to an end nozzle of the print head is larger than that for divided area far from the end nozzle of the print head, and wherein, thinning out rate of each of the different thinning out masks is defined so that the thinning out rate for the same print area in a main scanning operation in which nozzles including an end nozzle of the print head are used, is larger than the thinning out rate for the same print area in another main scanning operation in which the end nozzle of the print head is not used.

34. An ink jet printing method for forming an image on a print medium by using a print head having a plurality of nozzles for ejecting ink of a same color, the ink jet printing method comprising the following steps:

performing a plurality of main scans by scanning the print head relative to a same print area of the print medium; and forming thinned out images according to different thinning out masks onto the same print area by using different respective nozzles of the print head in the plurality of main scanning operations, wherein each of the different thinning out masks is defined so that respective print duties corresponding to each of the plurality of divided areas obtained by dividing the same print area in a sub-scan direction different from a main scan direction are different from each other, and the print duty for the divided area close to an end nozzle of the print head is less than the print duty for the divided area far from the end nozzle of the print head, and wherein the print duty of each of the different thinning out masks is defined so that the print duty for the same print area in a main scanning operation in which nozzles including an end nozzle of the print head are used, is less than the print duty for the same print area in another main scanning operation in which the end nozzle of the printhead is not used.

35. A recording method for recording using a recording head having a plurality of recording nozzles, said method comprising the following steps:

scanning the recording head relative to a same record area of a recording medium a plurality of times;

setting a plurality of different thinning-out masks as thinning-out masks used during the plurality of main scans for recording of the same record area;

thinning out image data using the plurality of different thinning-out masks set by said setting step, each of the plurality of different thinning-out masks being used during each of the plurality of scans; and recording thinned-out images on the same record area in accordance with the image data thinned out by said thinning-out step, during the plurality of scans, and completing an image to be recorded on the same record area, wherein said thinning out step thins image data in accordance with thinning masks which is set in such a manner that respective thinning out rates for the plurality of divided areas obtained by dividing the same record area in a sub-scan direction different from a main scan direction are different from each other, and wherein a thinning out rate of the thinning mask to be used when the nozzles including an end nozzle of the print head perform a main scanning operation onto the same record area is larger than a thinning out rate of the thinning mask to be used when the nozzles excluding the end nozzle perform a main scanning operation onto the same record area, and in each of the plurality of the main scanning operations, the thinning out rate for the divided area close to the end nozzle of the print head is larger than the thinning out rate for the divided area far from the end nozzle.

36. A recording medium for recording using a recording head having a plurality of recording nozzles, said method comprising the following steps:

scanning the recording head relative to a same record area of a recording medium a plurality of times;

setting a plurality of different thinning-out masks as thinning-out masks used during the plurality of main scans for recording of the same record area;

thinning out image data using the plurality of different thinning-out masks set by said setting step, each of the plurality of different thinning-out masks being used during each of the plurality of main scans; and recording thinned-out images on the same record area in accordance with the image data thinned out by said thinning-out step, during the plurality of scans, and completing an image to be recorded on the same record area, wherein said thinning out step thins image data, on the basis of the thinning-out mask which is defined so that print duties corresponding to each of a plurality of divided areas obtained by dividing the same record area in a sub-scan direction different from a main scan direction are different from each other, and wherein a print duty for the same record area in a main scanning operation in which nozzles including an end nozzle of the print head as used, is less than that for the same record area in another main scanning operation in which the nozzles excluding the end nozzle are used, and in each of the plurality of main scanning operations, the print duty for divided area close to the end nozzle of the print head is less than that for divided area far from the end nozzle.

37. A recording method for recording using a recording head having a plurality of recording nozzles, said method comprising the following steps:

scanning the recording head relative to a same record area of a recording medium a plurality of times;

setting a plurality of different thinning-out masks as thinning-out masks used during the plurality of scans for recording of the same record area;

thinning out image data using the plurality of different thinning-out masks set by said setting step, each of the plurality of thinning-out masks being used during each of the plurality of scans; and recording thinned-out images on the same record area in accordance with the image data thinned out by said thinning-out step, during the plurality of scans, and completing an image to be recorded on the same record area, wherein each of the different thinning-out mask has a plurality of portions for thinning-out image data corresponding to each of a plurality of divided areas obtained by dividing the same record area in a sub-scan direction different from a main scan direction, wherein the thinning out rate for one portion of the plurality of the portions differs from that for a second portion of the plurality of the portions, and wherein the thinning out rate of the thinning out mask to be used in a main scanning operation in which the nozzles including an end nozzle of the print head are used, is larger than the thinning out rate for another thinning out mask to be used in a main scanning operation in which the nozzles excluding the end nozzle are used.

38. A recording method for recording using a recording head having a plurality of recording nozzles, said method comprising the following steps:

scanning the recording head relative to a same record area of a recording medium a plurality of times;

setting a plurality of different thinning-out masks as thinning-out masks used during the plurality of scans for recording of the same record area;

thinning out image data using the plurality of different thinning-out masks set by said setting step, each of the plurality of thinning-out masks being used during each of the plurality of scans; and recording thinned-out images on the same record area in accordance with the image data thinned out by said thinning-out step, during the plurality of scans, and completing an image to be recorded on the same record area, wherein each of the different thinning-out masks is defined so that print duty corresponding to one divided area differs from that corresponding to a second one of the divided areas in a plurality of divided areas obtained by dividing the same main scan print area in a sub-scan direction different from a main scan direction, and wherein the print duty of the thinning out mask to be used in a main scanning operation in which the nozzles including an end nozzle of the print head are used, is less than the print duty of the thinning out mask to be used in another main scanning operation in which the nozzles excluding the end nozzle are used.

39. A recording apparatus for recording using a recording head having a plurality of recording nozzles, said apparatus comprising:

scanning means for scanning the recording head relative to a same record area of a recording medium a plurality of times;

setting means for setting a plurality of different thinning-out mask patterns as thinning-out mask patterns used in the plurality of scans for recording of the same record area;

thinning-out means for thinning out image data using the plurality of different thinning-out mask patterns set by said setting means, each of the plurality of thinning-out mask patterns being used in each of the plurality of scans; and record control means for recording thinning-out images on the same record area in accordance with the image data thinned out by said thinning-out means during each of the plurality of scans, thereby completing an image to be on the same record area, wherein a print duty of the thinning-out mask pattern to be used when the nozzles including an end nozzle of the print head perform a main scan onto the same record area is less than a print duty of the thinning-out mask pattern to be used when the nozzles excluding the end nozzle perform another scan onto the same record area, and wherein each of the different thinning-out mask patterns is defined so that a print duty corresponding to one divided area differs from that corresponding to another divided area in a plurality of divided areas obtained by dividing the same record area in the sub-scan direction different from a main scan direction and print duty corresponding to a divided area close to the end nozzle is less than that corresponding to a divided area far from the end nozzle in a plurality of divided areas.

40. A recording apparatus according to claim 39, wherein a print duty corresponding to a divided area positioned far from an end nozzle in the thinning-out mask patterns to be used when nozzles including the end nozzle of the print head perform a main scan onto the same record area is confined below a print duty corresponding to a divided area positioned close to the end nozzle in the thinning-out mask patterns to be used when nozzles excluding the end nozzle of the recording head perform the main scan onto the same record area.

41. A recording method for recording using a recording head having a plurality of recording nozzles, said method comprising the steps of:

scanning the recording head relative to a same record area of a recording medium a plurality of times;

setting a plurality of different thinning-out mask patterns as thinning-out mask patterns used in the plurality of scans for recording of the same recording area;

thinning out image data using the plurality of different thinning-out masks patterns set in said setting step, each of the plurality of thinning-out mask patterns being used in each of the plurality of scans; and recording thinning-out images on the same record area in accordance with the image data thinned out in said thinning-out step during each of the plurality of scans, thereby completing an image to be on the same record area, wherein a print duty of the thinning-out mask pattern to be used when the nozzles including an end nozzle of the print head perform a main scan onto the same record area is less than a print duty of the thinning-out mask pattern to be used when the nozzles excluding the end nozzle perform another scan onto the same record area, and wherein each of the different thinning-out masks patterns is defined so that a print duty corresponding to one divided area differs from that corresponding to another divided area in a plurality of divided areas obtained by dividing the same record area in the sub-scan direction different from a main scan direction and a print duty corresponding to a divided area close to the end nozzle is less than that corresponding to a divided area far from the end nozzle in a plurality of divided areas.

42. A recording method according to claim 41, wherein a print duty corresponding to a divided area positioned far from an end nozzle in the thinning-out mask pattern to be used when nozzles including the end nozzle of the print head perform a main scan onto the same record area is confined below a print duty corresponding to a divided area positioned close to the end nozzle in the thinning-out mask patterns to be used when nozzles excluding the end nozzle of the recording head perform the main scan onto the scan record area.

* * * * *

UNITED STATES PATENT AND TRADEMARK OFFICE
CERTIFICATE OF CORRECTION

| | |
|---|---|
| PATENT NO. | : 6,874,864 B1 |
| APPLICATION NO. | : 09/629093 |
| DATED | : April 5, 2005 |
| INVENTOR(S) | : Tetsuhiro Maeda et al. |

It is certified that error appears in the above-identified patent and that said Letters Patent is hereby corrected as shown below:

ON COVER PAGE AT (56) FOREIGN PATENT DOCUMENTS

"7052465" should read --7-052465--; and
"8025693" should read --8-025693--.

SHEET 18

FIG. 16, "RANDAM" (all occurrences) should read --RANDOM--.

COLUMN 2

Line 10, "36A," should read --36B,--; and
Line 51, "FIG. 38C to" should read --FIG. 37C to--.

COLUMN 8

Line 42, "such," should read --such--; and
Line 52, "comprises" should read --comprises:--.

COLUMN 9

Line 22, "end" should read --and--;
Line 27, "A1100," should read --H1100,--; and
Line 41, "51301" should read --H1301--.

COLUMN 10

Line 13, "PPC" should read --FPC--;
Line 18, "contract" should read --contact--;
Line 43, "outface" should read --surface--; and
Line 64, "PCS" should read --PCB--.

COLUMN 11

Line 7, "(MCB)" should read --(CRPCB)--;
Line 15, "an the" should read --as the--;
Line 21, "PCS" should read --PCB--; and
Line 53, "signal." should read --signal--.

UNITED STATES PATENT AND TRADEMARK OFFICE
CERTIFICATE OF CORRECTION

PATENT NO. : 6,874,864 B1
APPLICATION NO. : 09/629093
DATED : April 5, 2005
INVENTOR(S) : Tetsuhiro Maeda et al.

It is certified that error appears in the above-identified patent and that said Letters Patent is hereby corrected as shown below:

COLUMN 12

Line 10, "E1014" should read --E1010--;
    Line 17, "E2006." should read --E1006.--;
    Line 18, "serial." should read --serial--;
    Line 34, "sands" should read --sends--;
    Line 44, "addition" should read --addition,--;
    Line 45, "(PBS)" should read --(PES)--;
    Line 46, "ASP" should read --ASF--; and "(ASPS) should read --(ASFS)--.

COLUMN 13

Line 29, "made," should read --mode,--;
    Line 41, "control," should read --control--;
    Line 46, "22006" should read --E2006--;
    Line 51, "(PIP" should read --(PIF--; and
    Line 55, "E2026" should read --E2028--.

COLUMN 14

Line 2, "E2006" should read --E2008--;
    Line 4, "E22039." should read --E2039.--;
    Line 11, "mode" should read --mode,--;
    Line 35, "SRAM." should read --SRAM--;
    Line 43, "control," should read --control--;
    Line 61, "E2003." should read --E2005.--; and
    Line 62, "data," should read --data--.

COLUMN 15

Line 41, "firs" should read --first--; and
    Line 56, "steps" should read --step--.

COLUMN 16

Line 16, "subscanning" should read --sub-scanning--.

UNITED STATES PATENT AND TRADEMARK OFFICE
CERTIFICATE OF CORRECTION

PATENT NO.         : 6,874,864 B1
APPLICATION NO. : 09/629093
DATED                 : April 5, 2005
INVENTOR(S)       : Tetsuhiro Maeda et al.

It is certified that error appears in the above-identified patent and that said Letters Patent is hereby corrected as shown below:

COLUMN 18

Line 34, "unit" should read --units--.

COLUMN 24

Line 56, "other" should read --another--.

COLUMN 25

Line 44, "14" should read --114--.

COLUMN 26

Line 55, "$P(x,y) = f(\sqrt{|(x-x0+16)\%16|^2 + \{(y-y0+16)\%16\}^2})$" should read
--$P(x,y) = f(\sqrt{\{(x-x0+16)\%16\}^2 + \{(y-y0+16)\%16\}^2})$ --.

COLUMN 27

Line 38, "wide" should read --wide by--.

COLUMN 28

Line 25, "inverter" should read --inventor--.

COLUMN 29

Line 2, "this" should read --thus--; and
　　Line 61, "area" should read --areas--.

COLUMN 31

Line 60, "print" should read --print area--.

COLUMN 32

Line 57, "A ink" should read --An ink--.

UNITED STATES PATENT AND TRADEMARK OFFICE
CERTIFICATE OF CORRECTION

PATENT NO. : 6,874,864 B1
APPLICATION NO. : 09/629093
DATED : April 5, 2005
INVENTOR(S) : Tetsuhiro Maeda et al.

It is certified that error appears in the above-identified patent and that said Letters Patent is hereby corrected as shown below:

COLUMN 33

Line 17, "area" should read --areas--;
Line 18, "other," should read --other, and--;
Line 28, "main" should read --main scan--; and
Line 49, "other," should read --other, and--.

COLUMN 35

Line 14, "different" should read --the different--; and
Line 43, "different" should read --the different--.

COLUMN 39

Line 40, "in" should read --is--.

COLUMN 44

Line 5, "masks" should read --mask--.

Signed and Sealed this

Eighteenth Day of December, 2007

JON W. DUDAS
*Director of the United States Patent and Trademark Office*